(12) United States Patent
Lee et al.

(10) Patent No.: US 10,630,661 B2
(45) Date of Patent: Apr. 21, 2020

(54) TECHNIQUES FOR SECURELY COMMUNICATING A DATA PACKET VIA AT LEAST ONE RELAY USER EQUIPMENT

(71) Applicant: QUALCOMM Incorporated, San Diego, CA (US)

(72) Inventors: Soo Bum Lee, San Diego, CA (US); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 15/705,786

(22) Filed: Sep. 15, 2017

(65) Prior Publication Data

US 2018/0227282 A1    Aug. 9, 2018

Related U.S. Application Data

(60) Provisional application No. 62/454,678, filed on Feb. 3, 2017.

(51) Int. Cl.
*H04L 29/06* (2006.01)
*H04W 88/04* (2009.01)
(Continued)

(52) U.S. Cl.
CPC ........ *H04L 63/061* (2013.01); *H04L 63/0869* (2013.01); *H04L 63/123* (2013.01);
(Continued)

(58) Field of Classification Search
CPC . H04L 63/061; H04L 63/123; H04L 63/0869; H04L 63/0428; H04W 88/04;
(Continued)

(56) References Cited

U.S. PATENT DOCUMENTS 8,560,849 B2 * 10/2013 Machani ............... H04L 9/0637
380/229
8,605,904 B2 * 12/2013 Lin ....................... H04W 12/06
380/270

(Continued)

OTHER PUBLICATIONS

ISR/WO, International Search Report and Written Opinion of the International Searching Authority, Int'l Appl. No. PCT/US2018/014486, May 15, 2018, European Patent Office, Rijswijk, Netherlands, 15pgs.

(Continued)

*Primary Examiner* — David J Pearson
*Assistant Examiner* — Badri Narayanan Champakesan
(74) *Attorney, Agent, or Firm* — Holland & Hart LLP

(57) ABSTRACT

Techniques are described for wireless communication. A method of wireless communication at a transmitting wireless device includes generating a first Message Authentication Code (MAC) for a data packet based at least in part on a first security key used to communicate with a receiving wireless device; generating a second MAC for the data packet based at least in part on a second security key used to communicate with a relay user equipment (UE), in which the relay UE is included in a data routing path between the transmitting wireless device and the receiving wireless device; and transmitting the data packet to the relay UE with at least the first MAC and the second MAC.

30 Claims, 34 Drawing Sheets

(51) Int. Cl.
*H04W 40/22* (2009.01)
*H04W 12/10* (2009.01)
*H04W 52/46* (2009.01)
*H04W 12/04* (2009.01)
*H04W 12/06* (2009.01)
*H04W 76/14* (2018.01)
*H04W 12/02* (2009.01)

(52) U.S. Cl.
CPC .......... *H04W 12/04* (2013.01); *H04W 12/06* (2013.01); *H04W 12/10* (2013.01); *H04W 40/22* (2013.01); *H04W 52/46* (2013.01); *H04W 88/04* (2013.01); *H04L 63/0428* (2013.01); *H04W 12/02* (2013.01); *H04W 76/14* (2018.02)

(58) Field of Classification Search
CPC ..... H04W 52/46; H04W 40/22; H04W 12/10; H04W 12/04; H04W 12/06; H04W 76/14; H04W 12/02
USPC ........................................................ 713/171
See application file for complete search history.

(56) References Cited

U.S. PATENT DOCUMENTS

| | | | | |
|---|---|---|---|---|
| 8,867,428 | B2* | 10/2014 | Ulupinar | H04B 7/2606 370/315 |
| 8,904,167 | B2* | 12/2014 | Escott | H04B 7/155 713/153 |
| 9,660,809 | B2* | 5/2017 | Krapf | H04L 9/3234 |
| 2008/0076392 | A1* | 3/2008 | Khetawat | H04L 63/123 455/411 |
| 2008/0104397 | A1* | 5/2008 | Paddon | H04L 9/3242 713/168 |
| 2011/0173450 | A1* | 7/2011 | Knobbe | H04L 63/061 713/171 |
| 2016/0065362 | A1* | 3/2016 | Choyi | H04L 63/065 380/279 |
| 2016/0191969 | A1* | 6/2016 | Johan | H04N 21/25816 726/4 |
| 2016/0192439 | A1* | 6/2016 | Phuyal | H04L 5/0048 370/315 |
| 2016/0205555 | A1* | 7/2016 | Agiwal | H04W 12/04 713/168 |
| 2016/0295496 | A1* | 10/2016 | Atarius | H04W 76/14 |
| 2016/0323275 | A1* | 11/2016 | Choi | H04L 63/0869 |
| 2016/0323777 | A1* | 11/2016 | Pan | H04W 76/14 |
| 2017/0054694 | A1* | 2/2017 | Fujikami | H04L 9/08 |
| 2017/0257762 | A1* | 9/2017 | Ginzboorg | G06F 21/35 |
| 2017/0272251 | A1* | 9/2017 | Osheter | H04L 63/061 |

OTHER PUBLICATIONS

ZTE Corporation, Supplement of the security requirements between MME and DeNB, 3GPP TSG-SA3 (Security) SA3#61, Nov. 15-19; Sorrento, Italy, 3pgs., S3-101343.
Ericsson, UE-to-network relay security for ProSe, 3GPP TSG-SA WG3 Meeting #78 Sorrento, Italy, Jan. 26-30, 2015, 6pgs., S3-151186.

* cited by examiner

TECHNIQUES FOR SECURELY COMMUNICATING A DATA PACKET VIA AT LEAST ONE RELAY USER EQUIPMENT

CROSS REFERENCES

The present Application for patent claims priority to U.S. Provisional Patent Application No. 62/454,678 by Lee, et al., entitled "TECHNIQUES FOR SECURELY TRANSMITTING A DATA PACKET VIA AT LEAST ONE RELAY USER EQUIPMENT," filed Feb. 3, 2017, assigned to the assignee hereof.

BACKGROUND

Field of the Disclosure

The present disclosure, for example, relates to wireless communication systems, and more particularly to techniques for use in securely communicating a data packet via at least one relay user equipment (UE).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, new radio (NR), millimeter wave (mmW), or 5G network, a network access device may take the form of a smart radio head (or radio head (RH)) or access node controller (ANC), with a set of smart radio heads in communication with an ANC defining a gNodeB (gNB). A network access device may communicate with a set of UEs on downlink channels (e.g., for transmissions from a network access device to a UE) and uplink channels (e.g., for transmissions from a UE to a network access device).

In some cases, a UE may experience poor communication with a network access device, and the network access device may configure the UE to connect to, and route communications through, a relay node.

SUMMARY

In one example, a method of wireless communication at a transmitting wireless device is described. The method may include generating a first Message Authentication Code (MAC) for a data packet based at least in part on a first security key used to communicate with a receiving wireless device; generating a second MAC for the data packet based at least in part on a second security key used to communicate with a relay UE, in which the relay UE is included in a data routing path between the transmitting wireless device and the receiving wireless device; and transmitting the data packet to the relay UE with at least the first MAC and the second MAC. It should be noted that the MAC as described in the specification and claims is distinct from a Media Access Control (MAC) layer or address, which are generally related to providing addressing and channel control mechanisms for one or more network nodes to communicate in a network.

In one example, an apparatus for wireless communication at a transmitting wireless device is described. The apparatus may include means for generating a first MAC for a data packet based at least in part on a first security key used to communicate with a receiving wireless device; means for generating a second MAC for the data packet based at least in part on a second security key used to communicate with a relay UE, in which the relay UE is included in a data routing path between the transmitting wireless device and the receiving wireless device; and means for transmitting the data packet to the relay UE with at least the first MAC and the second MAC.

In one example, another apparatus for wireless communication at a transmitting wireless device is described. The apparatus may include a processor, and memory in electronic communication with the processor. The processor and the memory may be configured to generate a first MAC for a data packet based at least in part on a first security key used to communicate with a receiving wireless device; generate a second MAC for the data packet based at least in part on a second security key used to communicate with a relay UE, in which the relay UE is included in a data routing path between the transmitting wireless device and the receiving wireless device; and transmit the data packet to the relay UE with at least the first MAC and the second MAC.

In one example, a non-transitory computer-readable medium storing computer-executable code for wireless communication at a transmitting wireless device is described. The code may be executable by a processor to generate a first MAC for a data packet based at least in part on a first security key used to communicate with a receiving wireless device; generate a second MAC for the data packet based at least in part on a second security key used to communicate with a relay UE, in which the relay UE is included in a data routing path between the transmitting wireless device and the receiving wireless device; and transmit the data packet to the relay UE with at least the first MAC and the second MAC.

In one example, a method of wireless communication at a relay UE is described. The method may include receiving a data packet associated with at least a first MAC and a second MAC; determining, based at least in part on a first security key used to communicate with an upstream wireless device for which the relay UE is configured to relay data, that the second MAC was generated at least in part by the upstream wireless device; generating, based at least in part on the determination that the second MAC was generated at least in part by the upstream wireless device, a third MAC for the data packet based at least in part on a second security key used to communicate with a downstream wireless device; and transmitting the data packet to the downstream wireless device with at least an indication of the first MAC and the third MAC.

In one example, an apparatus of wireless communication at a relay UE is described. The apparatus may include means for receiving a data packet associated with at least a first MAC and a second MAC; means for determining, based at least in part on a first security key used to communicate with an upstream wireless device for which the relay UE is configured to relay data, that the second MAC was generated at least in part by the upstream wireless device; means for generating, based at least in part on the determination that the second MAC was generated at least in part by the upstream wireless device, a third MAC for the data packet based at least in part on a second security key used to communicate with a downstream wireless device; and means for transmitting the data packet to the downstream wireless device with at least an indication of the first MAC and the third MAC.

In one example, another apparatus of wireless communication at a relay UE is described. The apparatus may include a processor, and memory in electronic communication with the processor. The processor and the memory may be configured to receive a data packet associated with at least a first MAC and a second MAC; determine, based at least in part on a first security key used to communicate with an upstream wireless device for which the relay UE is configured to relay data, that the second MAC was generated at least in part by the upstream wireless device; generate, based at least in part on the determination that the second MAC was generated at least in part by the upstream wireless device, a third MAC for the data packet based at least in part on a second security key used to communicate with a downstream wireless device; and transmit the data packet to the downstream wireless device with at least an indication of the first MAC and the third MAC.

In one example, a non-transitory computer-readable medium storing computer-executable code for wireless communication at a relay UE is described. The code may be executable by a processor to receive a data packet associated with at least a first MAC and a second MAC; determine, based at least in part on a first security key used to communicate with an upstream wireless device for which the relay UE is configured to relay data, that the second MAC was generated at least in part by the upstream wireless device; generate, based at least in part on the determination that the second MAC was generated at least in part by the upstream wireless device, a third MAC for the data packet based at least in part on a second security key used to communicate with a downstream wireless device; and transmit the data packet to the downstream wireless device with at least an indication of the first MAC and the third MAC.

In one example, a method of wireless communication at a receiving wireless device is described. The method may include receiving a data packet associated with an indication of a first MAC and a second MAC; determining, based at least in part on a first security key used to communicate with a transmitting wireless device, that the first MAC was generated at least in part by the transmitting wireless device; determining, based at least in part on a second security key used to communicate with a relay UE configured to relay data from the transmitting wireless device to the receiving wireless device via a data routing path, that the second MAC was generated at least in part by the relay UE; and processing the data packet as received from the transmitting wireless device based at least in part on the determinations that the first MAC was generated at least in part by the transmitting wireless device and the second MAC was generated at least in part by the relay UE.

In one example, an apparatus for wireless communication at a receiving wireless device is described. The apparatus may include means for receiving a data packet associated with an indication of a first MAC and a second MAC; means for determining, based at least in part on a first security key used to communicate with a transmitting wireless device, that the first MAC was generated at least in part by the transmitting wireless device; means for determining, based at least in part on a second security key used to communicate with a relay UE configured to relay data from the transmitting wireless device to the receiving wireless device via a data routing path, that the second MAC was generated at least in part by the relay UE; and means for processing the data packet as received from the transmitting wireless device based at least in part on the determinations that the first MAC was generated at least in part by the transmitting wireless device and the second MAC was generated at least in part by the relay UE.

In one example, another apparatus for wireless communication at a receiving wireless device is described. The apparatus may include a processor, and memory in electronic communication with the processor, The processor and the memory may be configured to receive a data packet associated with an indication of a first MAC and a second MAC; determine, based at least in part on a first security key used to communicate with a transmitting wireless device, that the first MAC was generated at least in part by the transmitting wireless device; determine, based at least in part on a second security key used to communicate with a relay UE configured to relay data from the transmitting wireless device to the receiving wireless device via a data routing path, that the second MAC was generated at least in part by the relay UE; and process the data packet as received from the transmitting wireless device based at least in part on the determinations that the first MAC was generated at least in part by the transmitting wireless device and the second MAC was generated at least in part by the relay UE.

In one example, a non-transitory computer-readable medium storing computer-executable code for wireless communication at a receiving wireless device is described. The code may be executable by a processor to receive a data packet associated with an indication of a first MAC and a second MAC; determine, based at least in part on a first security key used to communicate with a transmitting wireless device, that the first MAC was generated at least in part by the transmitting wireless device; determine, based at least in part on a second security key used to communicate with a relay UE configured to relay data from the transmitting wireless device to the receiving wireless device via a data routing path, that the second MAC was generated at least in part by the relay UE; and process the data packet as received from the transmitting wireless device based at least in part on the determinations that the first MAC was generated at least in part by the transmitting wireless device and the second MAC was generated at least in part by the relay UE.

In one example, a method of wireless communication at a UE is described. The method may include establishing a first connection with a network access device; receiving, from the network access device via the first connection, a first indication of an available relay UE and a second indication of a DRB configuration to use when communicating with the relay UE; establishing a second connection with the relay UE using the DRB configuration; and communicating with the network access device through the relay UE.

In one example, an apparatus for wireless communication at a UE is described. The apparatus may include means for establishing a first connection with a network access device; means for receiving, from the network access device via the first connection, a first indication of an available relay UE and a second indication of a DRB configuration to use when communicating with the relay UE; means for establishing a second connection with the relay UE using the DRB configuration; and means for communicating with the network access device through the relay UE.

In one example, another apparatus for wireless communication at a UE is described. The apparatus may include a processor, and memory in electronic communication with the processor. The processor and the memory may be configured to establish a first connection with a network access device; receive, from the network access device via the first connection, a first indication of an available relay UE and a second indication of a DRB configuration to use when communicating with the relay UE; establish a second connection with the relay UE using the DRB configuration; and communicate with the network access device through the relay UE.

In one example, a non-transitory computer-readable medium storing computer-executable code for wireless communication at a UE is described. The code may be executable by a processor to establish a first connection with a network access device; receive, from the network access device via the first connection, a first indication of an available relay UE and a second indication of a DRB configuration to use when communicating with the relay UE; establish a second connection with the relay UE using the DRB configuration; and communicate with the network access device through the relay UE.

In one example, a method of wireless communication at a UE is described. The method may include establishing a first connection with a network access device; indicating, to the network access device, an ability of the UE to provide relay services; receiving, from the network access device, a first indication of a first DRB configuration to use for communication with a downstream wireless device for which the UE is configured to relay data, and a second indication of a second DRB configuration to use for communication with an upstream wireless device; and forwarding the data between the downstream wireless device and the upstream wireless device using a first DRB based at least in part on the first DRB configuration and a second DRB based at least in part on the second DRB configuration.

In one example, an apparatus for wireless communication at a UE is described. The apparatus may include means for establishing a first connection with a network access device; means for indicating, to the network access device, an ability of the UE to provide relay services; means for receiving, from the network access device, a first indication of a first DRB configuration to use for communication with a downstream wireless device for which the UE is configured to relay data, and a second indication of a second DRB configuration to use for communication with an upstream wireless device; and means for forwarding the data between the downstream wireless device and the upstream wireless device using a first DRB based at least in part on the first DRB configuration and a second DRB based at least in part on the second DRB configuration.

In one example, another apparatus for wireless communication at a UE is described. The apparatus may include a processor, and memory in electronic communication with the processor. The processor and the memory may be configured to establish a first connection with a network access device; indicate, to the network access device, an ability of the UE to provide relay services; receive, from the network access device, a first indication of a first DRB configuration to use for communication with a downstream wireless device for which the UE is configured to relay data, and a second indication of a second DRB configuration to use for communication with an upstream wireless device; and forward the data between the downstream wireless device and the upstream wireless device using a first DRB based at least in part on the first DRB configuration and a second DRB based at least in part on the second DRB configuration.

In one example, a non-transitory computer-readable medium storing computer-executable code for wireless communication at a UE is described. The code may be executable by a processor to establish a first connection with a network access device; indicate, to the network access device, an ability of the UE to provide relay services; receive, from the network access device, a first indication of a first DRB configuration to use for communication with a downstream wireless device for which the UE is configured to relay data, and a second indication of a second DRB configuration to use for communication with an upstream wireless device; and forward the data between the downstream wireless device and the upstream wireless device using a first DRB based at least in part on the first DRB configuration and a second DRB based at least in part on the second DRB configuration.

In one example, a method of wireless communication at a network access device is described. The method may include establishing a first connection with a first UE; identifying a data routing path between the network access device and the first UE, the data routing path including at least a second UE and a DRB configuration; transmitting an indication of at least a first portion of the data routing path to the first UE via the first connection; transmitting an indication of at least a second portion of the data routing path to the second UE; and communicating with the first UE based at least in part on a forwarding of data over the data routing path.

In one example, an apparatus for wireless communication at a network access device is described. The apparatus may include means for establishing a first connection with a first UE; means for identifying a data routing path between the network access device and the first UE, the data routing path including at least a second UE and a DRB configuration; means for transmitting an indication of at least a first portion of the data routing path to the first UE via the first connection; means for transmitting an indication of at least a second portion of the data routing path to the second UE; and means for communicating with the first UE based at least in part on a forwarding of data over the data routing path.

In one example, another apparatus for wireless communication at a network access device is described. The apparatus may include a processor, and memory in electronic communication with the processor. The processor and the memory may be configured to establish a first connection with a first UE; identify a data routing path between the network access device and the first UE, the data routing path including at least a second UE and a DRB configuration; transmit an indication of at least a first portion of the data routing path to the first UE via the first connection; transmit an indication of at least a second portion of the data routing path to the second UE; and communicate with the first UE based at least in part on a forwarding of data over the data routing path.

In one example, a non-transitory computer-readable medium storing computer-executable code for wireless communication at a network access device is described. The code may be executable by a processor to establish a first connection with a first UE; identify a data routing path between the network access device and the first UE, the data routing path including at least a second UE and a DRB configuration; transmit an indication of at least a first portion of the data routing path to the first UE via the first connection; transmit an indication of at least a second portion of the data routing path to the second UE; and communicate with the first UE based at least in part on a forwarding of data over the data routing path.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for securely transmitting a data packet between a remote UE and a network access device via at least one relay UE. In the relay architecture described in 3GPP TR 36.806, Release 10, a data routing path between a UE and a Donor eNodeB (DeNB) may include a single network operator-deployed relay node (RN) that is transparent to the UE, with the RN terminating the radio protocols of the E-UTRA radio interface and creating an S1-AP interface (for the control plane) and an S1-U interface (for the user plane) with the DeNB. In such a relay architecture, security is provided in a hop-by-hop manner (e.g., between the UE and the RN, and between the RN and the DeNB). In a relay architecture based on relay UEs, a relay UE may not be as inherently trusted as a RN by a network operator, and communications routed through the relay UEs may be encrypted. However, because a network access device may want to verify whether a data packet (e.g., a message) has originated from a remote UE, or because a remote UE may want to verify whether a data packet has originated from a network access device, a relay architecture based on relay UEs may be provided with end-to-end security between the remote UE and the network access device, in combination with hop-by-hop security between the remote UE and a first or only relay UE, between relay UEs (when a data routing path includes more than one relay UE), and between a last or only relay UE and the network access device. In the case of multiple relay UEs, path security may also be provided. Path security allows a wireless device at an end of a data routing path (e.g., a network access device or UE) to verify that a data packet has been routed through nodes along the data routing path that do not neighbor the wireless device at the end of the data routing path.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples.

Figure 1:
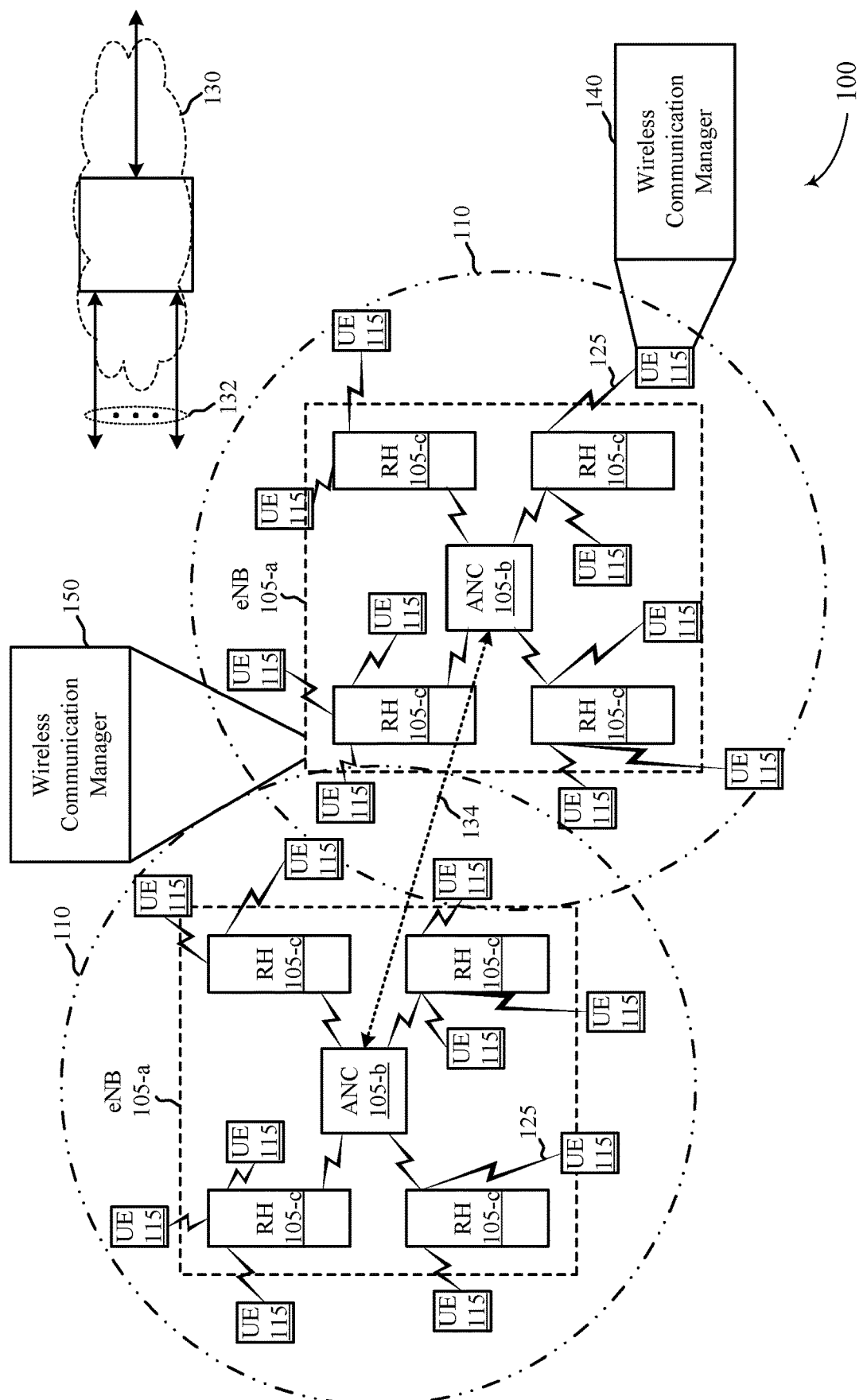
FIG. 1 shows an example of a wireless communication system, in accordance with one or more aspects of the present disclosure.

FIG. 1 shows an example of a wireless communication system 100, in accordance with one or more aspects of the present disclosure. The wireless communication system 100 may include network access devices 105 (e.g., gNBs 105-a, ANCs 105-b, and/or RHs 105-c), UEs 115, and a core network 130. The core network 130 may provide user authentication, access authorization, tracking, IP connectivity, and other access, routing, or mobility functions. At least some of the network access devices 105 (e.g., gNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (e.g., RHs 105-c). In an alternative configuration of the wireless communication system 100, the functionality of an ANC 105-b may be provided by a radio head 105-c or distributed across the radio heads 105-c of an gNB 105-a. In another alternative configuration of the wireless communication system 100 (e.g., an LTE/LTE-A configuration), the radio heads 105-c may be replaced with base stations, and the ANCs 105-b may be replaced by base station controllers (or links to the core network 130). In some examples, the wireless communication system 100 may include a mix of radio heads 105-c, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell may cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communication system 100 may support synchronous or asynchronous operation. For synchronous operation, the gNBs 105-a and/or radio heads 105-c may have similar frame timing, and transmissions from different gNBs 105-a and/or radio heads 105-c may be approximately aligned in time. For asynchronous operation, the gNBs 105-a and/or radio heads 105-c may have different frame timings, and transmissions from different gNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or PDCP layer may be IP-based. A RLC layer may in some cases perform packet segmentation and reassembly to communicate over logical channels. A MAC layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of gNBs 105-a, radio heads 105-c, base stations, access points, or other network access devices, including macro gNBs, small cell gNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a radio head 105-c, and/or downlinks (DLs), from a radio head 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., radio heads 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, a UE 115 may include a wireless communication manager 140. In some examples, the wireless communication manager 140 may include the apparatus described with reference to FIG. 7, 8, 9, 11, 12, 13, or 14, or may perform the method described with reference to FIG. 18, 19, 24, 25, 26, 27, 30, 31, 32, or 33.

In some examples, a network access device 105 may include a wireless communication manager 150. In some examples, the wireless communication manager 150 may include the apparatus described with reference to FIG. 7, 8, 10, 13, or 15, or may perform the method described with reference to FIG. 18, 20, 21, 22, 23, 27, 28, 29, or 34.

A 5G network may have a wide spectrum and include sub-6 Gigahertz (GHz) (Sub-6G) and mmW (e.g., 30-300 GHz) bands. The Sub-6G band (or bands) currently has wider cell coverage, but the mmW band (or bands) has larger bandwidth. To fully leverage the benefits of the 5G mmW band(s), a dense cell deployment may be necessary (e.g., because mmW devices typically require line-of-sight positioning for communication). One way to achieve a dense cell deployment is by deploying a large number of small cells. However, such a deployment may be costly, and may be difficult for an operator to justify in areas that do not have a large number of users (i.e., UEs). An alternative to deploying a large number of small cells is to enlist UEs as communication relays. To encourage users of UEs to allow their UEs to be used as relay UEs, an operator may offer a reward (i.e., compensation) to users that allow their UEs to be enlisted as relay UEs. The reward for allowing a UE to be used as a relay UE may be based, for example, on fees paid by other users who are willing to pay for network access via relay UEs, and may be weighed (by the operator) against the cost of deploying and managing small cells.

Figure 2:
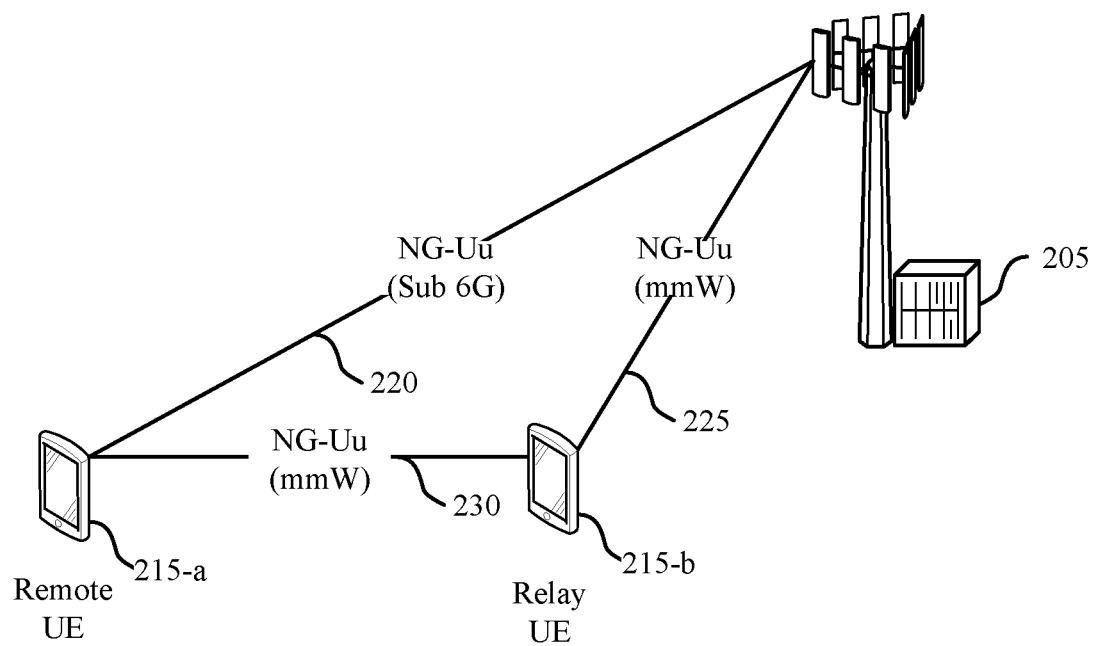
FIG. 2 shows an example of a wireless communication system, in accordance with one or more aspects of the present disclosure.

FIG. 2 shows an example of a wireless communication system 200, in accordance with one or more aspects of the present disclosure. The wireless communication system 200 may be an example of aspects of the wireless communication system 100, and may include a network access device 205 and UEs 215 (e.g., a first UE 215-a and a second UE 215-b). The network access device 205 and UEs 215 may be examples of aspects of the network access devices 105 and UEs 115 described with reference to FIG. 1.

The first UE 215-a may be near the edge of a coverage area of the network access device 205, or may be experiencing communication delays when communicating directly with the network access device 205, or may establish a direct connection 220 with the network access device 205 using a lower frequency or slower communication technology or frequency band (e.g., Sub-6G). As a result, the first UE 215-*a* may indicate a desire to use (or enroll in) relay services managed by an operator of the network access device 205.

The second UE 215-*b* may be closer to the network access device 205 than the first UE 215-*a*, or may achieve a better quality of service (QoS) than the first UE 215-*a* for its communications with the network access device 205, or may establish a direct connection with the network access device 205 using a higher frequency, greater throughput, or faster communication technology or frequency band (e.g., mmW) than the first UE 215-*a*. A user of the second UE 215-*b* may also allow the second UE 215-*b* to advertise that it is available to provide relay service.

Upon determining that the second UE 215-*b* is available to provide relay service (e.g., from a broadcast of the second UE advertising that it is available to provide relay service), the first UE 215-*a* may perform measurements on transmissions received from the second UE 215-*b* and report the identity of the second UE 215-*b* and corresponding measurements for the second UE 215-*b* to the network access device 205. The first UE 215-*a* may also report the identities and corresponding measurements for other neighboring nodes (e.g., a neighboring node list with measurements). In some examples, the first UE 215-*a* may broadcast a request for neighboring nodes to transmit measurement signals, and may measure the measurement signals.

The network access device 205 may evaluate measurements performed on the connections between the network access device 205 and the UEs 215 and/or measurements received from one or both of the UEs 215, and determine whether communicating with the first UE 215-*a* through the second UE 215-*b* is likely to provide a better quality of communication or greater throughput than direct communication with the first UE 215-*a*. If the network access device 205 determines that communication with the first UE 215-*a* through the second UE 215-*b* is likely to provide a better quality of communication or greater throughput for the first UE 215-*a*, the network access device 205 may configure a data routing path for the first UE 215-*a* through the second UE 215-*b*. Configuration of the data routing path may include an identification of one or more relay nodes (e.g., relay UEs) and a data radio bearer (DRB) configuration (e.g., for a first connection between the first UE 215-*a* and the second UE 215-*b*, and for a second connection between the second UE 215-*b* and the network access device 205). The network access device 205 may transmit an indication of at least a first portion of the data routing path to the first UE 215-*a*, and may transmit an indication of at least a second portion of the data routing path to the second UE 215-*b* (the relay UE). The indication of the first portion of the data routing path may include a first indication of the second UE 215-*b*, and a second indication of a DRB configuration to use when communicating with the second UE 215-*b*. These indications may be transmitted to the first UE 215-*a* using the direct connection 220 between the network access device 205 and the first UE 215-*a*. The indication of the second portion of the data routing path may include a first indication of a DRB configuration to use when communicating with the network access device 205, and a second indication of a DRB configuration to use when communicating with the first UE 215-*a*. These indications may be transmitted to the second UE 215-*b* using a direct connection 225 between the network access device 205 and the second UE 215-*b*.

In some examples, the network access device 205 may configure data routing paths for multiple relay UEs, and may transmit a list of available relay UEs and/or data routing paths to the first UE 215-*a*.

After receiving the indication of at least the first portion of the data routing path, the first UE 215-*a* may initiate a connection 230 (or perform a random access procedure) with the second UE 215-*b*.

In some examples, only DRBs may be configured for communication between the first UE 215-*a* and the network access device 205 via the second UE 215-*b*, and signaling radio bearers (SRBs) and DRBs may be configured for direct communication between the first UE 215-*a* and the network access device 205 (and for direct communication between the second UE 215-*b* and the network access device 205). In some examples, all of the SRBs and DRBs may be configured over RRC, over the direct connection between the first UE 215-*a* and network access device 205. The direction connection between the first UE 215-*a* and the network access device 205 may be the first UE's primary connection with the network access device 205, and in some cases may be a Sub-6 GHz connection (or mmW connection). The relay connection between the first UE 215-*a* and the network access device 205 (i.e., the connection through the second UE 215-*b*) may provide a secondary connection between the first UE 215-*a* and the network access device 205, and in some cases may be a mmW connection (or a Sub-6 GHz connection). In some examples, the primary and secondary connections of the first UE 215-*a* may be maintained while the first UE 215-*a* is operating in a dual connectivity mode.

In some examples, the network access device 205 may configure a DRB pair (i.e., a DRB mapping) for a relay UE. A DRB pair for the second UE 215-*b* may include a first UE 215-*a* to second UE 215-*b* DRB, and a second UE 215-*b* to network access device 205 DRB. In some examples, a DRB between a relay UE and a network access device may be associated with multiple DRBs between the relay UE and a set of UEs that may need relay service (or between the relay UE and other relay UEs in the case of a multiple relay hop data routing path). If a DRB between a relay UE and a network access device is associated with multiple other DRBs, each data packet forwarded through the relay UE may include a flow identifier in its header, such as an enhanced Packet Data Convergence Protocol (enhanced PDCP or ePDCP) header, a security header, or a L2 header. Flow identifiers may be assigned by the network access device, to UEs that may need relay service.

In some examples, a relay UE may forward a data packet to a downstream wireless device (e.g., another relay UE or a wireless device (e.g., a network access device or UE) at an end of a data routing path) based on a DRB pair unique to a UE that transmits or receives the data packet. A relay UE may be configured to use different unique DRB pairs to forward data packets for different UEs for which relay service is provided. In other examples, a relay UE may forward a data packet to a downstream wireless device based on a label (e.g., a flow identifier) included in the data packet. In either case, a network access device may configure the unique DRB pairs or flow identifiers. In some cases, different DRB pairs or flow identifiers may be configured for a UE (e.g., the first UE 215-*a*) uplink and downlink traffic.

In some examples, the first UE 215-*a* may select a DRB on which to transmit a data packet (e.g., a DRB associated with the direct connection 220 with the network access device 205 or a DRB associated with the connection 230 with the second UE 215-*b*) based on a criteria such as channel condition, quality of service (QoS), application type, etc. Similarly, the network access device 205 may select a DRB on which to transmit a data packet (e.g., a DRB associated with the direction connection 220 with the first UE 215-*a* or a DRB associated with the connection 225 with the second UE 215-*b*) based on a criteria such as channel condition, QoS, application type, pricing, etc.

In some examples, the second UE 215-*b* may operate in a dual or multi-connectivity mode, with a primary connection with the network access device 205 operating as a master gNB (MgNB), an optional secondary connection with the network access device 205 operating as a secondary gNB (SgNB), and a tertiary connection with the first UE 215-*a*. For the primary and optional secondary connections, the network access device 205 may configure SRBs and DRBs. For the tertiary connection, the network access device 205 may configure DRBs. In some examples, the SRBs and DRBs for all connections may be configured over RRC, over the first connection or optional second connection.

In some examples, a Uu interface may be used for all of the connections 220, 225, 230 shown in FIG. 2, including the relay connections between the first UE 215-*a* and the second UE 215-*b*, and between the second UE 215-*b* and the network access device 205. In such a configuration, the second UE 215-*b* does not have to implement a Un interface, and does not have to implement the S1AP protocol or GTP-U protocol. The first UE 215-*a* may implement its dual Uu interfaces in a dual connectivity mode. From the first UE 215-*a* perspective, the second UE 215-*b* functions similarly to a SgNB.

Figure 3:
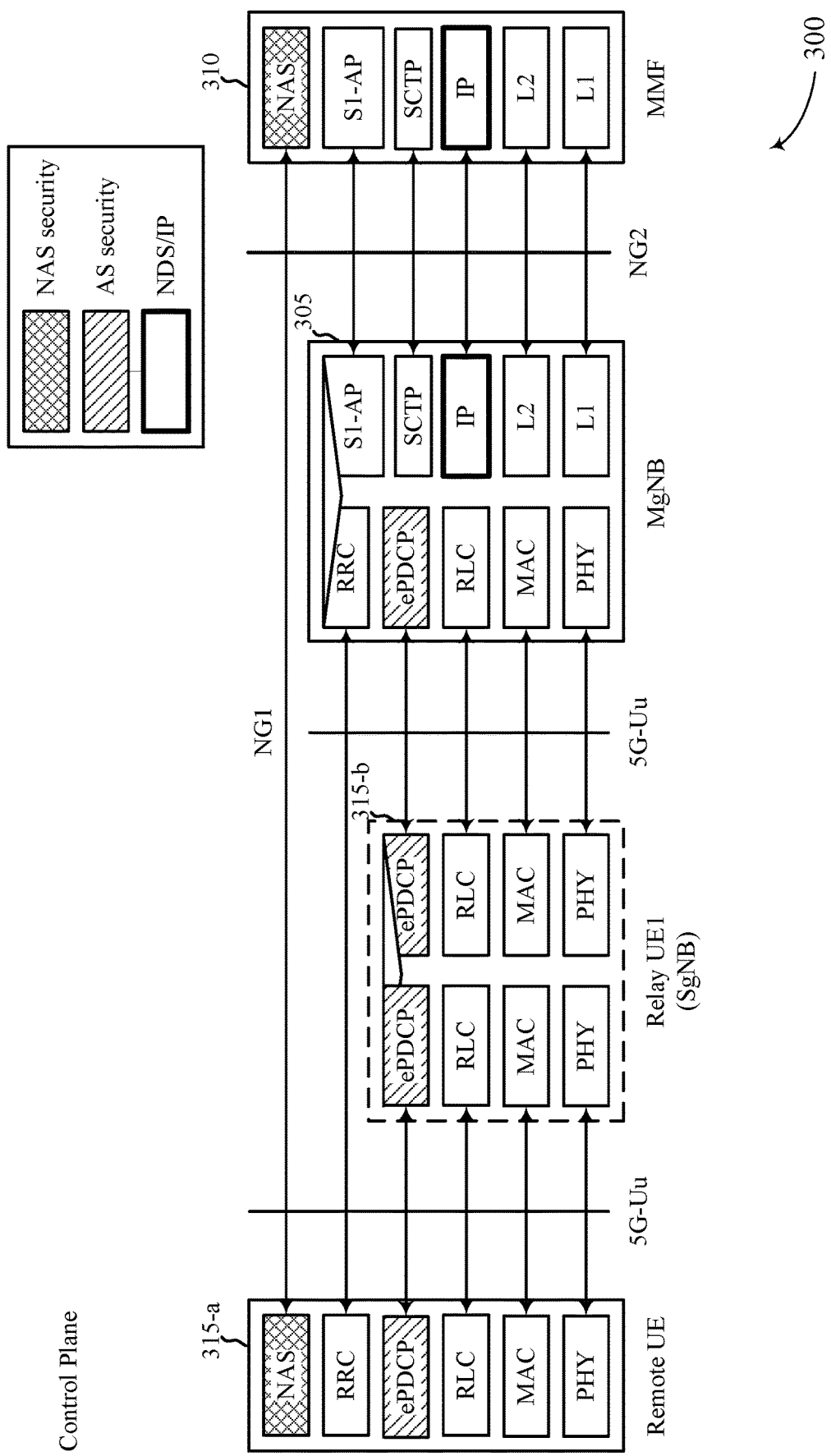
FIG. 3 shows example protocol stacks of a remote UE, a relay UE, a MgNB, and a mobility management function (MMF), and illustrates example control plane connections to facilitate a data routing path between the remote UE and the MgNB via the relay UE, in accordance with various aspects of the present disclosure.

FIG. 3 shows example protocol stacks 300 of a remote UE 315-*a*, a relay UE 315-*b*, a MgNB 305, and a mobility management function (MMF) 310, and illustrates example control plane connections to facilitate a data routing path between the remote UE 315-*a* and the MgNB 305 via the relay UE 315-*b*, in accordance with various aspects of the present disclosure. The UEs 315 may be examples of aspects of the UEs described with reference to FIGS. 1 and 2. The relay UE 315-*b* may be an example of aspects of the second UE described with reference to FIG. 2. The MgNB 305 may be an example of aspects of the network access devices described with reference to FIGS. 1 and 2.

The remote UE 315-*a* may include a relay UE/network-facing protocol stack including a PHY layer, a Medium Access Control (MAC) layer, a radio link control (RLC) layer, an ePDCP layer, a RRC layer, and a non-access stratum (NAS) layer. The relay UE 315-*b* may include a UE-facing protocol stack including a PHY layer, a MAC layer, a RLC layer, and an ePDCP layer, and a MgNB-facing protocol stack including a PHY layer, a MAC layer, a RLC layer, and an ePDCP layer. The MgNB 305 may include a UE-facing protocol stack including a PHY layer, a MAC layer, a RLC layer, an ePDCP layer, and a RRC layer, and a network-facing protocol stack including a L1 layer, a L2 layer, an IP layer, a Stream Control Transmission Protocol (SCTP) layer, and a S1 application protocol (S1-AP) layer. The MMF may include a MgNB/UE-facing protocol stack including a L1 layer, a L2 layer, an IP layer, a SCTP layer, a S1-AP layer, and a NAS layer. It should be noted that the MAC as described in the specification and claims is distinct from the Media Access Control (MAC) layer described above, which is generally related to providing addressing and channel control mechanisms for one or more network nodes to communicate in a network.

In some examples, NAS security may be provided at the NAS layer, between the remote UE 315-*a* and the MMF 310; access stratum (AS) security may be provided at the ePDCP layer, between the remote UE 315-*a* and the relay UE 315-*b*, between the relay UE 315-*b* and the MgNB 305 (and between relay UEs in the case of multiple relay UEs (not shown)); and network domain security (NDS) and IP security may be provided at the IP layer between the MgNB 305 and MMF 310. When security has been configured, RRC messages may be sent over DRBs established with the relay UE 315-*b*.

The ePDCP layer may be implemented as a 5G PDCP layer with dual Message Authentication Code (MAC) scheme. Examples of a dual MAC scheme are described with reference to FIG. 6. A dual MAC scheme may be used to provide end-to-end security between the remote UE 315-*a* and MgNB 305, hop-by-hop security between the remote UE 315-*a* and relay UE 315-*b*, and between the relay UE 315-*b* and the MgNB 305, and in some cases path security. Path security may enable the MgNB 305 and/or remote UE 315-*a* to verify whether a data packet has passed through one or more non-neighboring nodes (e.g., when a data routing path includes multiple relay UEs, and one or more of the relay UEs do not neighbor the MgNB 305 or remote UE 315-*a*).

Figure 4:
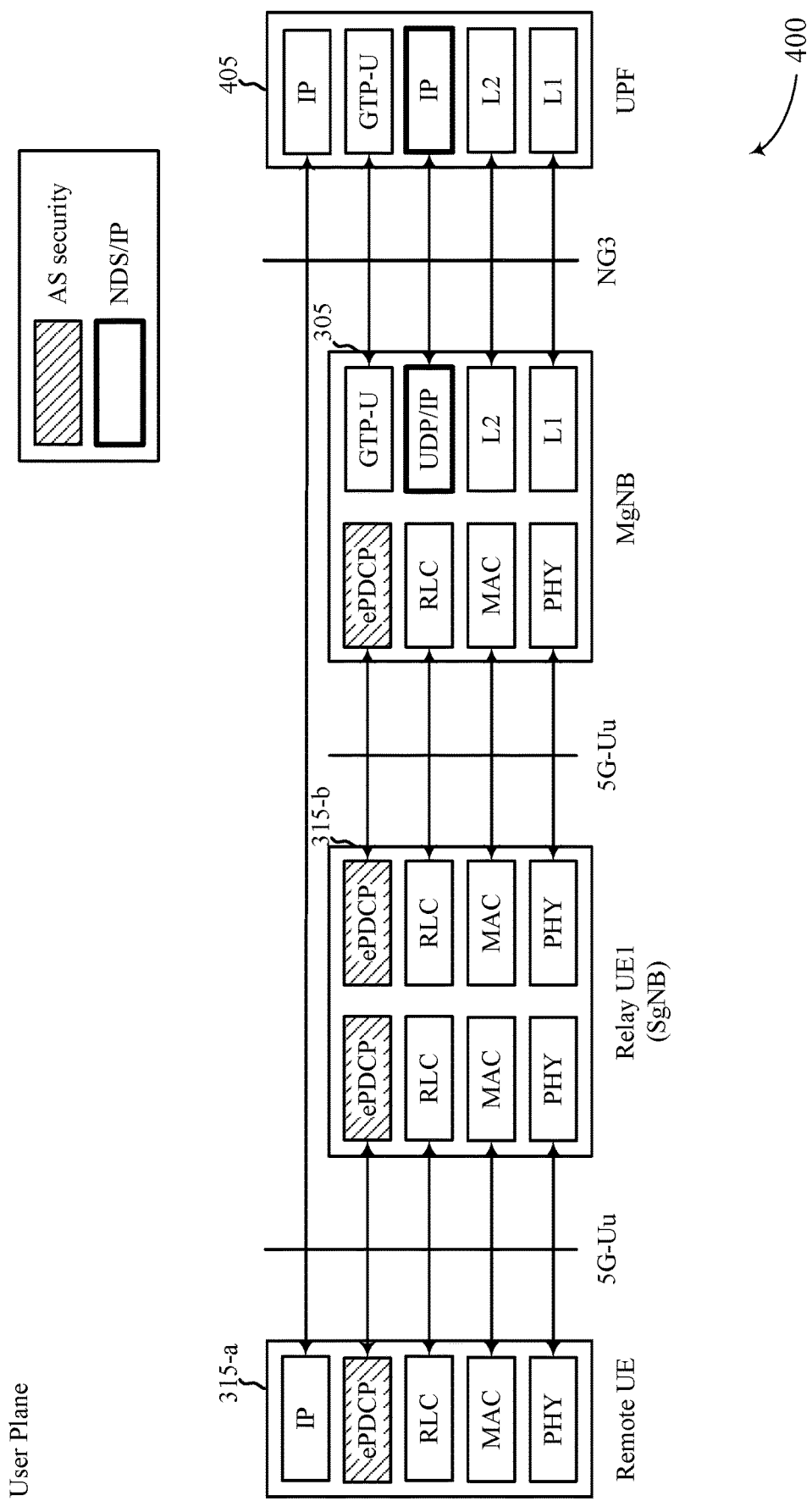
FIG. 4 shows example protocol stacks of the remote UE, the relay UE, the MgNB, and a user plane function (UPF), and illustrates example user plane connections to facilitate a data routing path between the remote UE and the MgNB via the relay UE, in accordance with various aspects of the present disclosure.

FIG. 4 shows example protocol stacks 400 of the remote UE 315-*a*, the relay UE 315-*b*, the MgNB 305, and a user plane function (UPF) 405, and illustrates example user plane connections to facilitate a data routing path between the remote UE 315-*a* and the MgNB 305 via the relay UE 315-*b*, in accordance with various aspects of the present disclosure.

The remote UE 315-*a* may include a relay UE/network-facing protocol stack including a PHY layer, a MAC layer, a RLC layer, an ePDCP layer, and an IP layer. The relay UE 315-*b* may include a UE-facing protocol stack including a PHY layer, a MAC layer, a RLC layer, and an ePDCP layer, and a MgNB-facing protocol stack including a PHY layer, a MAC layer, a RLC layer, and an ePDCP layer. The MgNB 305 may include a UE-facing protocol stack including a PHY layer, a MAC layer, a RLC layer, and an ePDCP layer, and a network-facing protocol stack including a L1 layer, a L2 layer, a user datagram protocol/IP (UDP/IP) layer, and a GPRS tunneling protocol user plane (GTP-U) layer. The UPF 405 may include a MgNB/UE-facing protocol stack including a L1 layer, a L2 layer, a UDP/IP layer, a GTP-U layer, and an IP layer.

In some examples, AS security may be provided at the ePDCP layer, between the remote UE 315-*a* and the relay UE 315-*b*, between the relay UE 315-*b* and the MgNB 305 (and between relay UEs in the case of multiple relay UEs (not shown)); and NDS/IP security may be provided at the UDP/IP layer, between the MgNB 305 and UPF 405.

Figure 5:
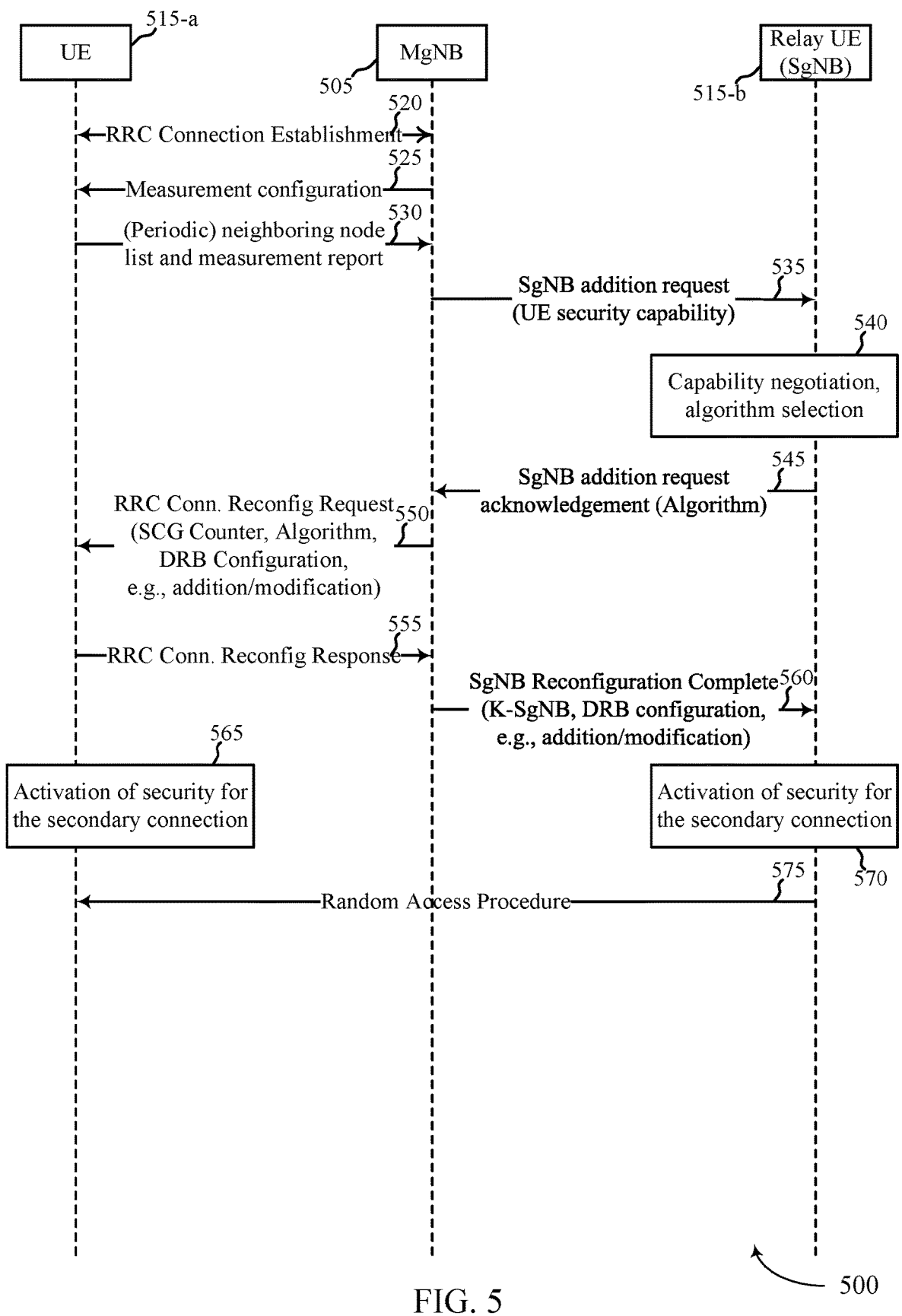
FIG. 5 shows an example message flow between a remote UE, a MgNB, and a relay UE, in accordance with various aspects of the present disclosure.

FIG. 5 shows an example message flow 500 between a remote UE 515-*a*, a MgNB 505, and a relay UE 515-*b*, in accordance with various aspects of the present disclosure. The UEs 515 may be examples of aspects of the UEs described with reference to FIGS. 1-4. The relay UE 515-*b* may be an example of aspects of the second UE described with reference to FIG. 2 or the relay UE described with reference to FIGS. 3 and 4. The MgNB 505 may be an example of aspects of the network access devices described with reference to FIGS. 1-4.

The remote UE 515-*a* may attach to a network via the MgNB 505, and at 520 may establish a secure connection with the MgNB (including a RRC connection). The remote UE 515-*a* may be allocated a temporary ID from the MgNB 505. The temporary ID may uniquely identify the remote UE 515-*a*, and may be a cell radio network temporary identifier (C-RNTI) associated with the MgNB 505. At 525, the MgNB 505 may configure the remote UE 515-*a* to perform measurements of neighboring node transmissions. At 530 (and in some cases on a periodic basis), the remote UE 515-*a* may transmit a neighboring node list, with measurements (e.g., a measurement report), to the MgNB 505.

The relay UE 515-*b* may also attach to the network via the MgNB 505, and may report an ability (or capability) to serve as a relay UE to the network. Although not shown in FIG. 5, the relay UE 515-*b* may establish a secure connection with the MgNB similarly to the remote UE 515-*a*, and may be allocated a temporary ID from the MgNB 505. The temporary ID may uniquely identify the relay UE 515-*b*, and may be a C-RNTI associated with the MgNB 505.

At 535, and based on the measurement report(s) received from the remote UE 515-*a*, the MgNB 505 may transmit a SgNB addition request (i.e., a relay add request) to the relay UE 515-*b*. The SgNB addition request may include a UE security capability indication. In response to receiving the SgNB addition request, and at 540, the relay UE 515-*b* may perform capability negotiation and select a security algorithm. At 545, the relay UE 515-*b* may respond to the MgNB 505 with a SgNB addition request acknowledgement and a security algorithm indication.

At 550, the MgNB 505 may transmit a RRC connection reconfiguration request to the remote UE 515-*a* (e.g., to configure the relay UE 515-*b* as a secondary connection (or SgNB) for the remote UE 515-1). The RRC connection reconfiguration request may include a secondary cell group (SCG) counter, an indication of a security algorithm, and a DRB configuration used to communicate with the MgNB 505 via the relay UE 515-*b*. The remote UE 515-*a* may return a RRC connection reconfiguration response to the MgNB 505 at 555.

At 560, the MgNB 505 may transmit a SgNB reconfiguration complete message to the relay UE 515-*b*. The SgNB configuration complete message may include a security key (K-SgNB) for communicating with the MgNB 505, and a DRB configuration used to communicate with the remote UE 515-*a* and the MgNB 505. The MgNB 505 may transmit the security key K-SgNB to the relay UE 515-*b* at 560, instead of at 535, to ensure that both the relay UE 515-*b* and the remote UE 515-*a* have acknowledged their acceptance of the relay relationship proposed by the MgNB 505.

At 565 and 570, the remote UE 515-*a* and relay UE 515-*b* may activate security for the secondary connection between the remote UE 515-*a* and relay UE 515-*b*; and at 575, the remote UE 515-*a* may initiate a random access procedure with the relay UE 515-*b*. After performing the random access procedure, the remote UE 515-*a* may communicate with the MgNB 505 via the relay UE 515-*b*.

In the relay architecture described in 3GPP TR 36.806, Release 10, a data routing path includes a single network operator-deployed RN that is transparent to a UE that communicates with a DeNB via the RN, and the RN terminates the radio protocols of the E-UTRA radio interface and creates an S1-AP interface (for the control plane) and an S1-U interfaces (for the user plane) with the DeNB. In such a relay architecture, security is provided in a hop-by-hop manner (i.e., between the UE and the RN, and between the RN and the DeNB). In a relay architecture based on relay UEs, the relay UEs may not be as inherently trusted as a RN by a network operator, and communications routed through the relay UEs may be encrypted. However, a MgNB (equivalent to a DeNB) may want to verify whether a data packet (e.g., a message) has originated from a remote UE, or a remote UE may want to verify whether a data packet has originated from a MgNB. Such verifications are not supported using the hop-by-hop security described in 3GPP TR 36.806, Release 10. To avoid a need for relay UEs to decrypt communications between a remote UE and MgNB, while also enabling a MgNB to verify whether a data packet has originated from a remote UE (and enabling the remote UE to verify whether a data packet has originated from the MgNB), end-to-end security between the remote UE and MgNB may be deployed in combination with hop-by-hop security between the remote UE and a first or only relay UE, between relay UEs (when a data routing path includes more than one relay UE), and between a last or only relay UE and the MgNB.

In some examples, end-to-end security between a remote UE and a MgNB, via one or more relay UEs, may be provided at an RRC layer (for control plane communications), and at an ePDCP layer (for user plane communications). For both control plane and user plane communications, end-to-end security may provide ciphering and integrity protection. User plane integrity protection can prevent relay UEs from misusing the DRBs of a data routing path allocated for communications between a remote UE and MgNB (e.g., to deliver traffic of the relay UE that is not transmitted from the remote UE to the MgNB or from the MgNB to the remote UE). If data packets (e.g., protocol data unit (PDUs)) are not integrity protected by a remote UE, a MgNB cannot verify the origin of the data packets.

In some examples, hop-by-hop security between a remote UE and a relay UE, between relay UEs (when a data routing path includes more than one relay UE), and between a relay UE and a MgNB, may provide integrity protection for user plane communications. Ciphering may be provided for user plane communications using end-to-end security (between the remote UE and the MgNB). Hop-by-hop integrity protection of data packets can prevent false data injection or false relay (and reward) claims by relay UEs. In the absence of hop-by-hop integrity protection for data packets, a relay UE may forward (e.g., to a remote UE or MgNB) communications forged by an attacker.

Figure 6:
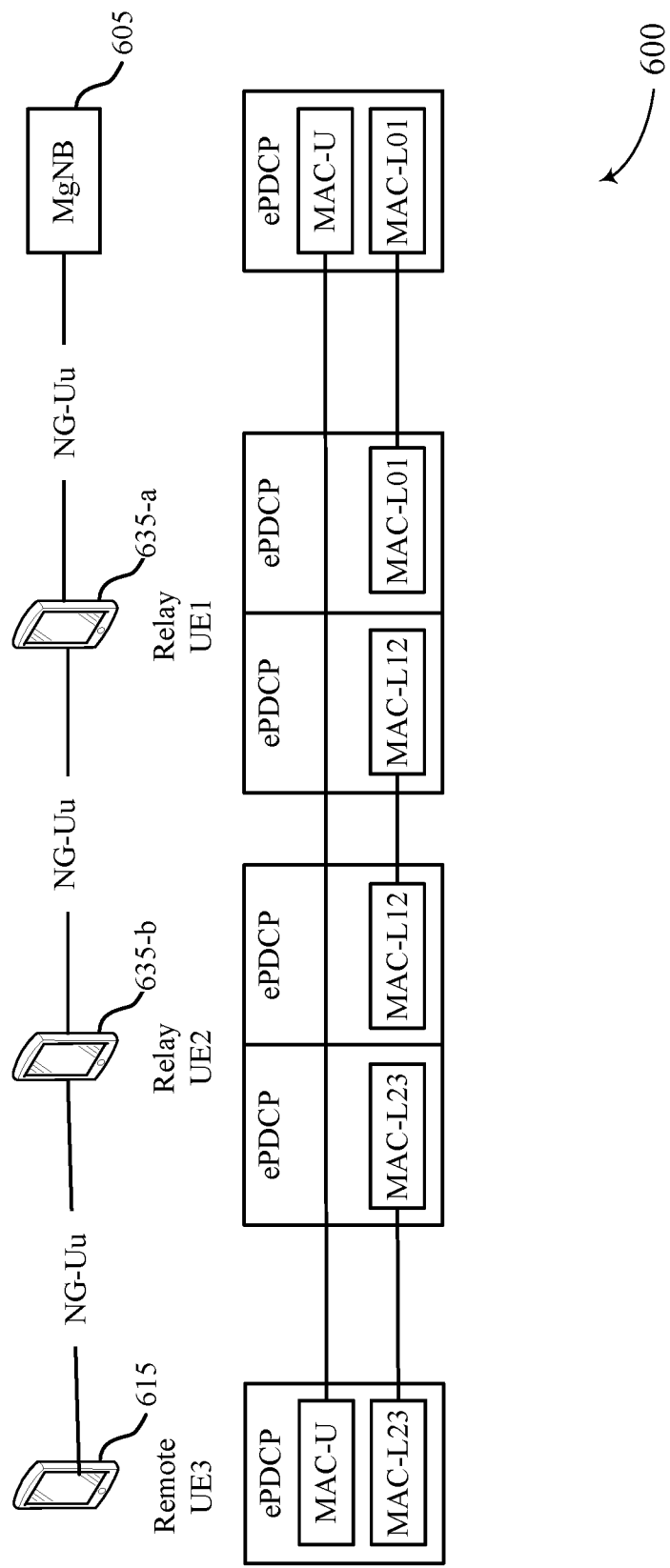
FIG. 6 shows an example wireless communication system in which a remote UE communicates with a network access device via a number of relay UEs, in accordance with various aspects of the present disclosure.

FIG. 6 shows a wireless communication system 600 in which a remote UE 615 communicates with a network access device 605 via a number of relay UEs 635, in accordance with various aspects of the present disclosure. The remote UE 615 (UE3), network access device 605 (e.g., MgNB), and relay UEs 635 (UE1 and UE2) may be examples of aspects of the UEs, network access devices, and relay UEs described with reference to FIG. 1, 2, 3, 4, or 5. By way of example, the data routing path between the remote UE 615 and network access device 605 includes two relay UEs (i.e., a first relay UE 635-*a* (UE1) and a second relay UE 635-*b* (UE2)) that route data to each other, and to the remote UE 615 and network access device 605, via Uu interfaces. In other examples, the data routing path may include a single relay UE or more than two relay UEs.

A dual MAC may be used to provide end-to-end and hop-by-hop integrity protection along the data routing path between the remote UE 615 and network access device 605. The dual MAC may include an upper MAC (MAC-U) that provides end-to-end integrity protection between the remote UE 615 and network access device 605, and a plurality of lower MACs (MAC-Ls) that provide hop-by-hop integrity protection between neighbor nodes along the data routing path. The MAC-U may be based on a first access stratum (AS) key (i.e., a security key) used for communication between (and shared with) the remote UE 615 and the network access device 605. Each MAC-L may be based on an AS key used for communication between (and shared with) neighbor nodes. For example, a first MAC-L (MAC-L01) may be based on a second AS key used for communication between the network access device 605 and the first relay UE 635-a, a second MAC-L (MAC-L12) may be based on a third AS key used for communication between the first relay UE 635-a and the second relay UE 635-b, and a third MAC-L (MAC-L23) may be based on a fourth AS key used for communication between the second relay UE 635-b and the remote UE 615. In some examples, each of the MAC-U and the MAC-Ls may be generated at an ePDCP layer of a wireless device. In some examples, each of the AS keys (or material for deriving one or more of the AS keys) may be provided to the remote UE 615 and relay UEs 635, as needed, by the network access device 605.

When a data packet is transmitted from the remote UE 615 to the network access device 605, the remote UE 615 may generate a MAC-U for the data packet based on an AS key used to communicate with the network access device 605, generate a MAC-L23 for the data packet based on an AS key used to communicate with the second relay UE 635-b, and transmit the data packet with the MAC-U and the MAC-L23 to the second relay UE 635-b. In some cases, each of the MAC-U and the MAC-L23 may be generated in the same layer (e.g., ePDCP layer). The second relay UE 635-b may verify that the data packet was received from the remote UE 615 based on the MAC-L23 and the AS key used to communicate with the remote UE 615, generate a MAC-L12 for the data packet based on an AS key used to communicate with the first relay UE 635-a, and forward the data packet with the MAC-U and the MAC-L12 to the first relay UE 635-a. The first relay UE 635-a may verify that the data packet was received from the second relay UE 635-b based on the MAC-L12 and the AS key used to communicate with the second relay 635-b, generate a MAC-L01 for the data packet based on an AS key used to communicate with the network access device 605, and forward the data packet with the MAC-U and the MAC-L01 to the network access device 605. The network access device 605 may verify that the data packet was transmitted by the remote UE 615 based on the MAC-U and the AS key used to communicate with the remote UE 615, and verify that the data packet was received from the first relay UE 635-a based on the MAC-L01 and the AS key used to communicate with the first relay UE 635-a.

When a data packet is transmitted from network access device 605 to the remote UE 615, the network access device 605 may generate a MAC-U for the data packet based on an AS key used to communicate with the remote UE 615, generate a MAC-L01 for the data packet based on an AS key used to communicate with the first relay UE 635-a, and transmit the data packet with the MAC-U and the MAC-L01 to the first relay UE 635-a. The first relay UE 635-a may verify that the data packet was received from the network access device 605 based on the MAC-L01 and the AS key used to communicate with the network access device 605, generate a MAC-L12 for the data packet based on an AS key used to communicate with the second relay UE 635-b, and forward the data packet with the MAC-U and the MAC-L12 to the second relay UE 635-b. The second relay UE 635-b may verify that the data packet was received from the first relay UE 635-a based on the MAC-L12 and the AS key used to communicate with the first relay 635-a, generate a MAC-L23 for the data packet based on an AS key used to communicate with the remote UE 615, and forward the data packet with the MAC-U and the MAC-L23 to the remote UE 615. The remote UE 615 may verify that the data packet was transmitted by the network access device 605 based on the MAC-U and the AS key used to communicate with the network access device 605, and verify that the data packet was received from the second relay UE 635-b based on the MAC-L23 and the AS key used to communicate with the second relay UE 635-b.

When using the above-described dual MAC, the network access device 605 may be unable to verify whether a data packet was forwarded by a non-neighboring node (e.g., by the second relay UE 635-b, or in the case of a data routing path including more relay UEs, any relay UE other than a relay UE that is a neighboring node to the network access device 605 along the data routing path).

In a wireless communication system that rewards nodes for serving as relay UEs, the inability of a network access device to verify that a data packet was forwarded by each node of a data routing path may enable the relay UE that neighbors the network access device to claim all rewards that should be split with other relay UEs. Alternatively, the inability of a network access device to verify that a data packet was forwarded by each node of a data routing path may enable the relay UE that neighbors the network access device to give relay credit to a relay UE that is not in the data routing path (e.g., by transmitting on a DRB associated with the relay UE that is not in the data routing path). To enable a network access device to verify that a data packet was forwarded by each node of a data routing path, path security may be employed in addition to end-to-end security and hop-by-hop security.

In some examples, path security may be provided in a dual MAC system (e.g., in the wireless communication system 600 shown in FIG. 6) by updating the upper MAC (MAC-U) per hop. For example, the MAC-U of an upstream wireless device may be combined (e.g., exclusive-ORed (XORed)) with a MAC-U$_{i0}$ generated by each downstream wireless device (e.g., a relay UE$_i$ 635):

MAC-U=MAC-U⊕MAC-U$_{i0}$

Each MAC-U$_{i0}$ may be generated by a UE$_i$ 635 based on a security key (e.g., an AS key, K$_{i0}$) used to communicate with (or shared with) the network access device 605. For the remote UE 615, the value of MAC-U may be set to 0x00 (or any initial value that is agreed upon with the network access node 605).

The network access device 605 may verify that a data packet was forwarded by each node of a data routing path based on the network access device's DRB configuration for the data routing path. For example, for a DRB$_i$ that was configured for a remote UE$_i$, the network access device 605 may retrieve a stored data routing path including a number of relay UEs and their security contexts. If a DRB is associated with multiple remote UEs, the security context for a remote UE may be identified by a flow identifier allocated for the remote UE. Based on the network access device's DRB configuration for a data routing path, the network access device 605 may verify that a data packet was forwarded by each node of a data routing path by computing a MAC-U$_{i0}$ value for each UE$_i$ of the data routing path (e.g., based on a security key (K$_{i0}$) used to communicate with each UE$_i$), combining (XORing) all of the MAC-U$_{i0}$ values with an initial MAC-U known to be generated by the remote UE 615 (e.g., 0x00) to generate an expected MAC-U, and comparing the expected MAC-U with the MAC-U received with the data packet to determine whether there is a match. If there is a match, the network access device 605 has verified that the data packet was forwarded by each node of the data routing path. Since a relay UE 635 does not know the security keys (i.e., K$_{j0}$) used by other nodes to communicate with the network access device 605, the relay UE 635 cannot manipulate the MAC-U without the manipulation being detected by the network access device 605.

For security purposes, the $K_{i0}$ used by a $UE_i$ should not be used with the same counter value (CNT) multiple times. For example, if MAC-$U_{i0}$ is computed as:

MAC-$U_{i0}$=F($K_{i0}$, CNT, Message), where F is a MAC generation function, the value of CNT should not be used more than once for the same $K_{i0}$. When a DRB of $UE_i$ is associated with multiple DRBs of different UEs, the $UE_i$ should not use the Count, obtained from the ePDCP header of a data packet, at the CNT used to generate MAC-$U_{i0}$, because different UEs that have different shared keys with the network access node (i.e., $K_{j0}$) may use the same Count in the ePDCP header. Various options for distinguishing counter values are therefore described.

When a ePDCP header of a received data packet includes a flow identifier (ID), the flow identifier may be combined (e.g., concatenated) with a counter value (Count) received in the ePDCP header (i.e., flow ID|Count) and used as a counter value (CNT) for generating a MAC-$U_{i0}$. When the Count included in the ePDCP header only includes a number of least significant bits (LSBs) of the full Count, a hyper frame number (HFN) associated with the flow ID may be maintained at a relay UE 635.

When a relay UE 635 is configured with a unique DRB pair for each (remote or relay) UE, the UE ID associated with the DRB pair may be locally stored at a relay UE during the DRB configuration, and a combination (e.g., concatenation) of the locally-stored UE ID and Count included in the ePDCP header of a data packet may be used as a CNT for generating a MAC-$U_{i0}$.

In some examples, each relay UE ($UE_i$) included in a data routing path may use a separate, locally-stored counter value ($CNT_{i0}$) associated with $K_{i0}$ for generating a MAC-$U_{i0}$, and each relay UE ($UE_i$) may write its locally-stored counter value into the ePDCP header of a data packet for which a MAC-U is generated. For this form of path security, a separate Count field may be allocated in the ePDCP header for each relay $UE_i$ along a data routing path, with each Count field being updated by a respective relay $UE_i$ based on its associated $CNT_{i0}$ (in addition to the relay UE's update of the MAC-U associated with the data packet based on the relay UE's MAC-$U_{i0}$).

In some examples, path security may also be used to enable a remote UE to verify that a data packet was forwarded by each node of a data routing path (i.e., from a network access device to the remote UE). For a communication from a network access device to a remote UE, path security may be provided as described for a communication from the remote UE to the network access device; however, for each relay UE in a data routing path between the network access device and the remote UE, the network access device has to provision the remote UE and relay UE with a security key for communicating with each other. The relay UEs may use the security keys to generate MAC-$U_{i0}$ values, and the remote UE may use the security keys to verify a MAC-U received with a data packet.

In an alternative form of path security used to enable a remote UE to verify that a data packet was forwarded by each node of a data routing path (i.e., from a network access device to the remote UE), a network access device may generate an aggregate MAC-U by computing a MAC-$U_{i0}$ for each UE in a data routing path and XORing the MAC-$U_{i0}$ values with a remainder MAC-U value (e.g., 0x00) expected by the remote UE. As the aggregate MAC-U is received by each UE along the data routing path, the UE may compute its MAC-$U_{i0}$ and XOR its MAC-$U_{i0}$ with the aggregate MAC-U. After receiving the aggregate MAC-U and XORing its MAC-$U_{i0}$ with the aggregate MAC-U, the remote UE may determine whether the remaining MAC-U matches its expected MAC-U. If there is a match, the remote UE 615 has verified that the data packet was forwarded by each node of the data routing path. Alternatively, the network access device may not XOR the MAC-$U_{i0}$ values with a MAC-U value (i.e., the MAC-U created using the key shared with the remote UE). In this case, the remote UE may share a key with each relay UE (i.e., $UE_i$) on the path and the relay $UE_i$ may update the MAC-U by computing a MAC-$U_{in}$ (which is the MAC generated using the key shared with the remote $UE_n$). The remote UE may verify the aggregate MAC-U received from its neighboring relay UE along the data routing path by generating an aggregate MAC-U by computing all MAC-$U_{in}$ value, XORing them, and comparing the result with the aggregate MAC that the remote UE receives in an ePDCP header.

In another alternative form of path security used to enable a remote UE to verify that a data packet was forwarded by each node of a data routing path (i.e., from a network access device to the remote UE), a remote UE may transmit a packet receipt status report (e.g., a PDCP status report) to a network access device. The packet receipt status report may be transmitted using path security, and may be transmitted via the data routing path over which the data packet (or a set of data packets) was received. The network access device may infer, based on a verification of path security for the packet receipt status report, that the data packet (or set of data packets) was received at the remote UE via each of the nodes included in the data routing path.

Figure 7:
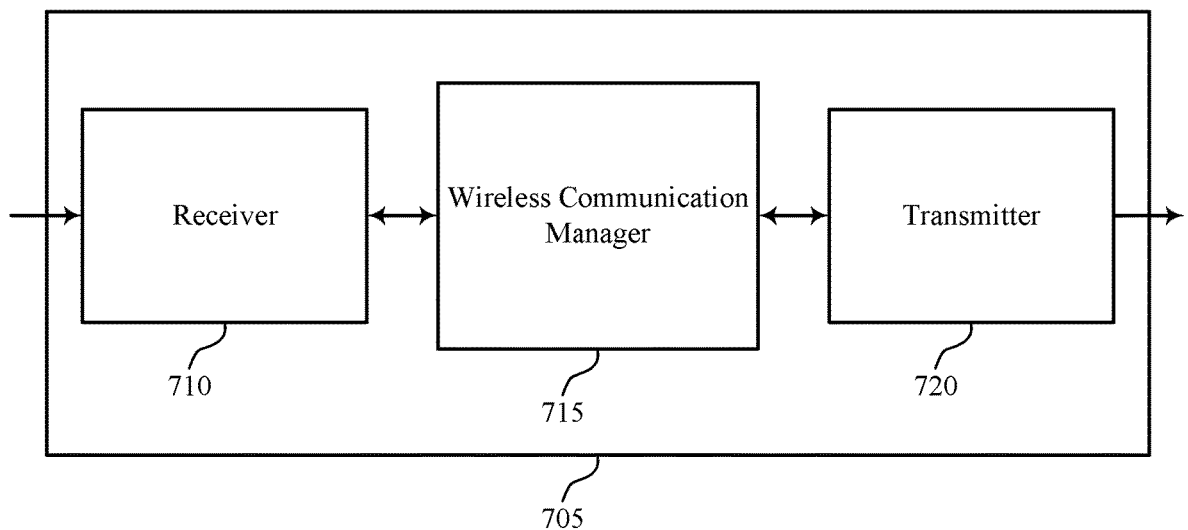
FIG. 7 shows a block diagram of an example apparatus for use in wireless communication, in accordance with one or more aspects of the present disclosure.

FIG. 7 shows a block diagram 700 of an apparatus 705 for use in wireless communication, in accordance with one or more aspects of the present disclosure. The apparatus 705 may be an example of aspects of a UE, relay UE, or network access device described with reference to FIGS. 1-6. The apparatus 705 may include a receiver 710, a wireless communication manager 715, and a transmitter 720. The apparatus 705 may also include a processor. Each of these components may be in communication with one another (e.g., via one or more buses).

The receiver 710 may receive data or control signals or information (i.e., transmissions), some or all of which may be associated with various information channels (e.g., data channels, control channels, etc.). Received signals or information, or measurements performed thereon, may be passed to other components of the apparatus 705. The receiver 710 may include a single antenna or a set of antennas.

The wireless communication manager 715 and/or at least some of its various sub-components may be implemented in hardware, software executed by a processor, firmware, or any combination thereof. If implemented in software executed by a processor, the functions of the wireless communication manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The wireless communication manager 715 and/or at least some of its various sub-components may be physically located at various positions, including being distributed such that portions of functions are implemented at different physical locations by one or more physical devices. In some examples, the wireless communication manager 715 and/or at least some of its various sub-components may be a separate and distinct component in accordance with various aspects of the present disclosure. In other examples, the wireless communication manager 715 and/or at least some of its various sub-components may be combined with one or more other hardware components, including but not limited to an I/O component, a transceiver, another computing device, one or more other components described in the present disclosure, or a combination thereof in accordance with various aspects of the present disclosure. The wireless communication manager 715 may be an example of aspects of the wireless communication managers described with reference to FIG. 1.

In examples in which the apparatus 705 is included in a UE, the wireless communication manager 715 may be used to manage wireless communications directly with a network access device, in addition to communications with the network access device via a data routing path including one or more relay UEs. In these examples, the wireless communication manager 715 may be used to establish a first connection with the network access device; receive, from the network access device via the first connection, a first indication of an available relay UE and a second indication of a DRB configuration to use when communicating with the relay UE; establish a second connection with the relay UE using the DRB configuration; and communicate with the network access device through the relay UE, as described for example with reference to FIGS. 2 and 5.

In examples in which the apparatus 705 is included in a UE, the wireless communication manager 715 may be used to manage wireless communications directly with a network access device, in addition to communications between one or more other UEs and the network access device. In these examples, the wireless communication manager 715 may be used to establish a first connection with the network access device; indicate, to the network access device, an ability of the UE to provide relay services; receive, from the network access device, a first indication of a first DRB configuration to use for communication with a downstream wireless device for which the UE is configured to relay data, and a second indication of a second DRB configuration to use for communication with an upstream wireless device; and forward the data between the downstream wireless device and the upstream wireless device using a first DRB based at least in part on the first DRB configuration and a second DRB based at least in part on the second DRB configuration, as described for example with reference to FIGS. 2 and 5.

In examples in which the apparatus 705 is included in a network access device, the wireless communication manager 715 may be used to manage wireless communications directly with a UE, in addition to communications with the UE via a data routing path including one or more relay UEs. In these examples, the wireless communication manager 715 may be used to establish a first connection with a first UE; identify a data routing path between the network access device and the first UE, the data routing path including at least a second UE and a plurality of DRBs; transmit an indication of at least a first portion of the data routing path to the first UE via the first connection; transmit an indication of at least a second portion of the data routing path to the second UE; and communicate with the first UE based at least in part on a forwarding of data over the data routing path, as described for example with reference to FIGS. 2 and 5.

The transmitter 720 may transmit data or control signals or information (i.e., transmissions) generated by other components of the apparatus 705, some or all of which may be associated with various information channels (e.g., data channels, control channels, etc.). In some examples, the transmitter 720 may be collocated with the receiver 710 in a transceiver. For example, the transmitter 720 and receiver 710 may be an example of aspects of the transceiver 1630 or 1750 described with reference to FIG. 16 or 17. The transmitter 720 may include a single antenna or a set of antennas.

Figure 8:
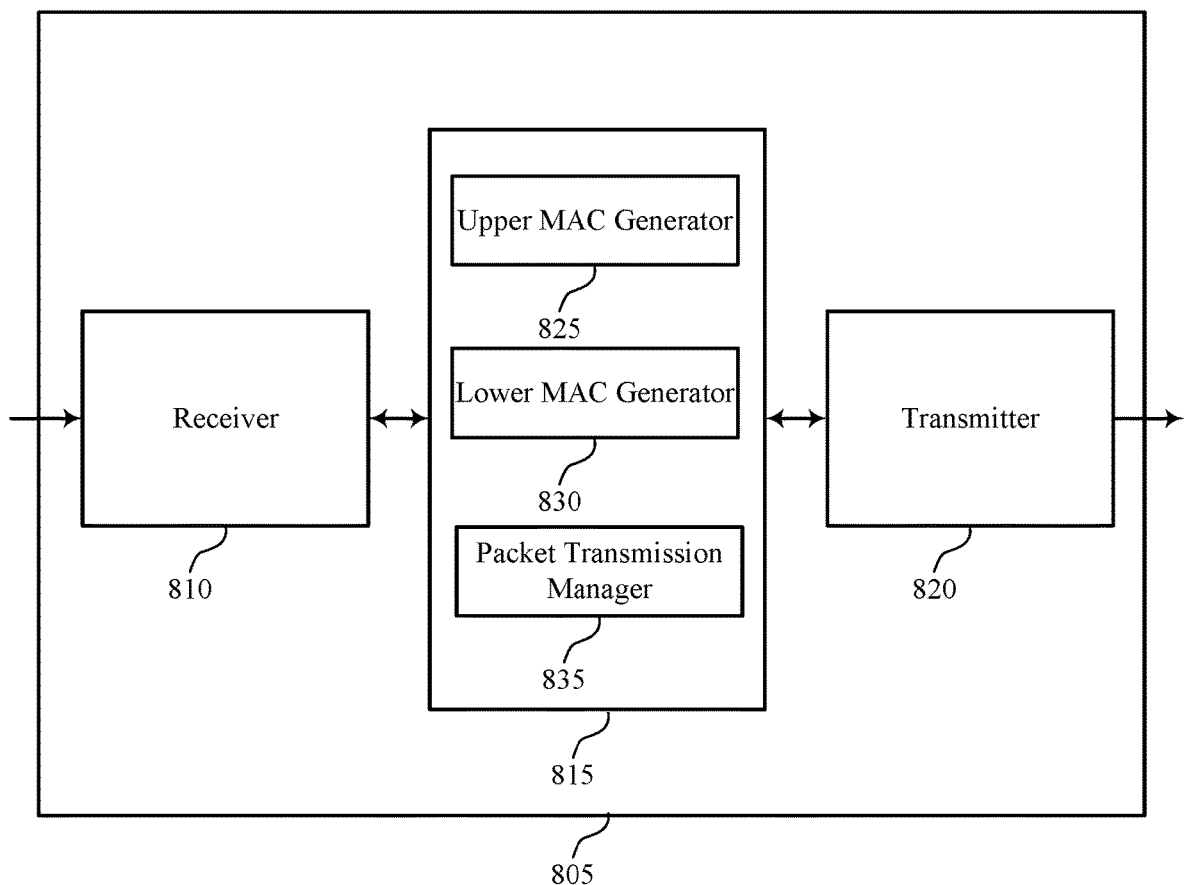
FIG. 8 shows a block diagram of an example transmitting wireless device for use in wireless communication, in accordance with one or more aspects of the present disclosure.

FIG. 8 shows a block diagram 800 of a transmitting wireless device 805 for use in wireless communication, in accordance with one or more aspects of the present disclosure. The transmitting wireless device 805 may be an example of aspects of a UE, network access device, or apparatus described with reference to FIGS. 1-7. The transmitting wireless device 805 may include a receiver 810, a wireless communication manager 815, and a transmitter 820. The transmitting wireless device 805 may also include a processor. Each of these components may be in communication with one another (e.g., via one or more buses).

The receiver 810 may receive data or control signals or information (i.e., transmissions), some or all of which may be associated with various information channels (e.g., data channels, control channels, etc.). Received signals or information, or measurements performed thereon, may be passed to other components of the transmitting wireless device 805. The receiver 810 may include a single antenna or a set of antennas.

The wireless communication manager 815 may include an upper MAC generator 825, a lower MAC generator 830, and a packet transmission manager 835. The wireless communication manager 815 may be an example of aspects of the wireless communication managers described with reference to FIGS. 1 and 7.

The upper MAC generator 825 may be used to generate a first MAC for a data packet based at least in part on a first security key used to communicate with a receiving wireless device, as described for example with reference to FIG. 6.

The lower MAC generator 830 may be used to generate a second MAC for the data packet based at least in part on a second security key used to communicate with a relay UE, as described for example with reference to FIG. 6. The relay UE may be included in a data routing path between the transmitting wireless device and the receiving wireless device.

The packet transmission manager 835 may be used to transmit the data packet to the relay UE with at least the first MAC and the second MAC, as described for example with reference to FIG. 6.

The transmitter 820 may transmit data or control signals or information (i.e., transmissions) generated by other components of the transmitting wireless device 805, some or all of which may be associated with various information channels (e.g., data channels, control channels, etc.). In some examples, the transmitter 820 may be collocated with the receiver 810 in a transceiver. For example, the transmitter 820 and receiver 810 may be an example of aspects of the transceiver 1630 or 1750 described with reference to FIG. 16 or 17. The transmitter 820 may include a single antenna or a set of antennas.

In some examples, the transmitting wireless device 805 may be a UE and the receiving wireless device may be a network access device. In other examples, the transmitting wireless device 805 may be a network access device and the receiving wireless device may be a UE.

Figure 9:
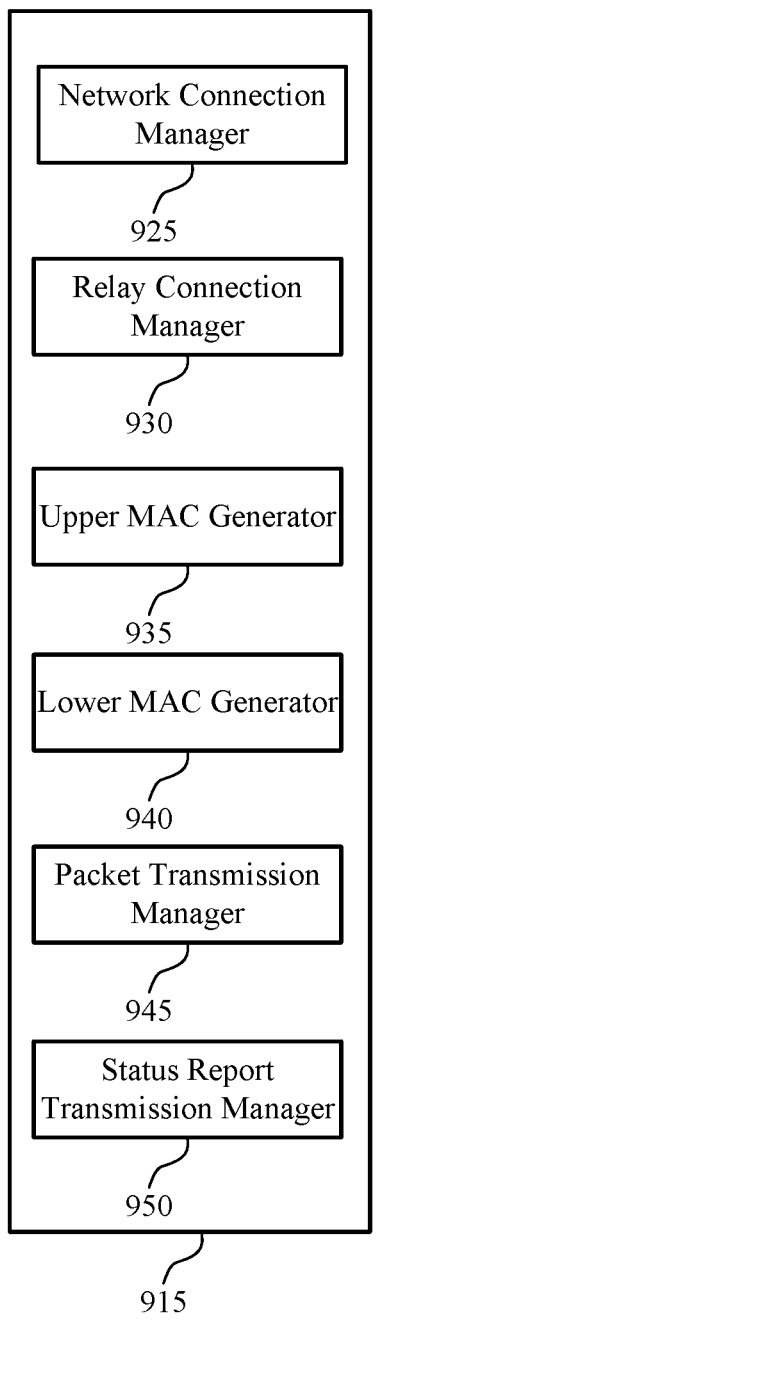
FIG. 9 shows a block diagram of an example wireless communication manager, in accordance with one or more aspects of the present disclosure.

FIG. 9 shows a block diagram 900 of a wireless communication manager 915, in accordance with one or more aspects of the present disclosure. The wireless communication manager 915 may be an example of aspects of a wireless communication managers described with reference to FIGS. 1, 7, and 8, and may be included in a UE such as one of the UEs described with reference to FIGS. 1-6 or a UE including one of the apparatuses described with reference to FIGS. 7 and 8. The wireless communication manager 915 may include a network connection manager 925, a relay connection manager 930, an upper MAC generator 935, a lower MAC generator 940, a packet transmission manager 945, and an optional status report transmission manager 950. Each of these components may communicate, directly or indirectly, with one another (e.g., via one or more buses). The upper MAC generator 935, lower MAC generator 940, and packet transmission manager 945 may be configured similarly to, and may perform the functions of, the upper MAC generator 825, lower MAC generator 830, and packet transmission manager 835 described with reference to FIG. 8.

The network connection manager 925 may be used to include establish a connection with a network access device, as described for example with reference to FIGS. 2 and 5.

The relay connection manager 930 may be used to receive, from the network access device via the connection, a first indication of a relay UE and a second indication of a DRB configuration to use when communicating with the relay UE, as described for example with reference to FIGS. 2 and 5. The relay UE may be included in a data routing path between the UE and the network access device. The relay connection manager 930 may also be used to establish a connection with the relay UE using the DRB configuration, as described for example with reference to FIGS. 2 and 5.

The upper MAC generator 935 may be used to generate a first MAC for a data packet based at least in part on a first security key used to communicate with a network access device, as described for example with reference to FIG. 6.

The lower MAC generator 940 may be used to generate a second MAC for the data packet based at least in part on a second security key used to communicate with the relay UE, as described for example with reference to FIG. 6. In some cases, the first MAC and second MAC may be generated in the same layer (e.g., ePDCP layer).

The packet transmission manager 945 may be used to transmit the data packet to the relay UE with at least the first MAC and the second MAC, as described for example with reference to FIG. 6.

The status report transmission manager 950 may be used to transmit, to the network access device, an integrity-protected status report indicating receipt of the data packet at the UE, as described for example with reference to FIG. 6.

Figure 10:
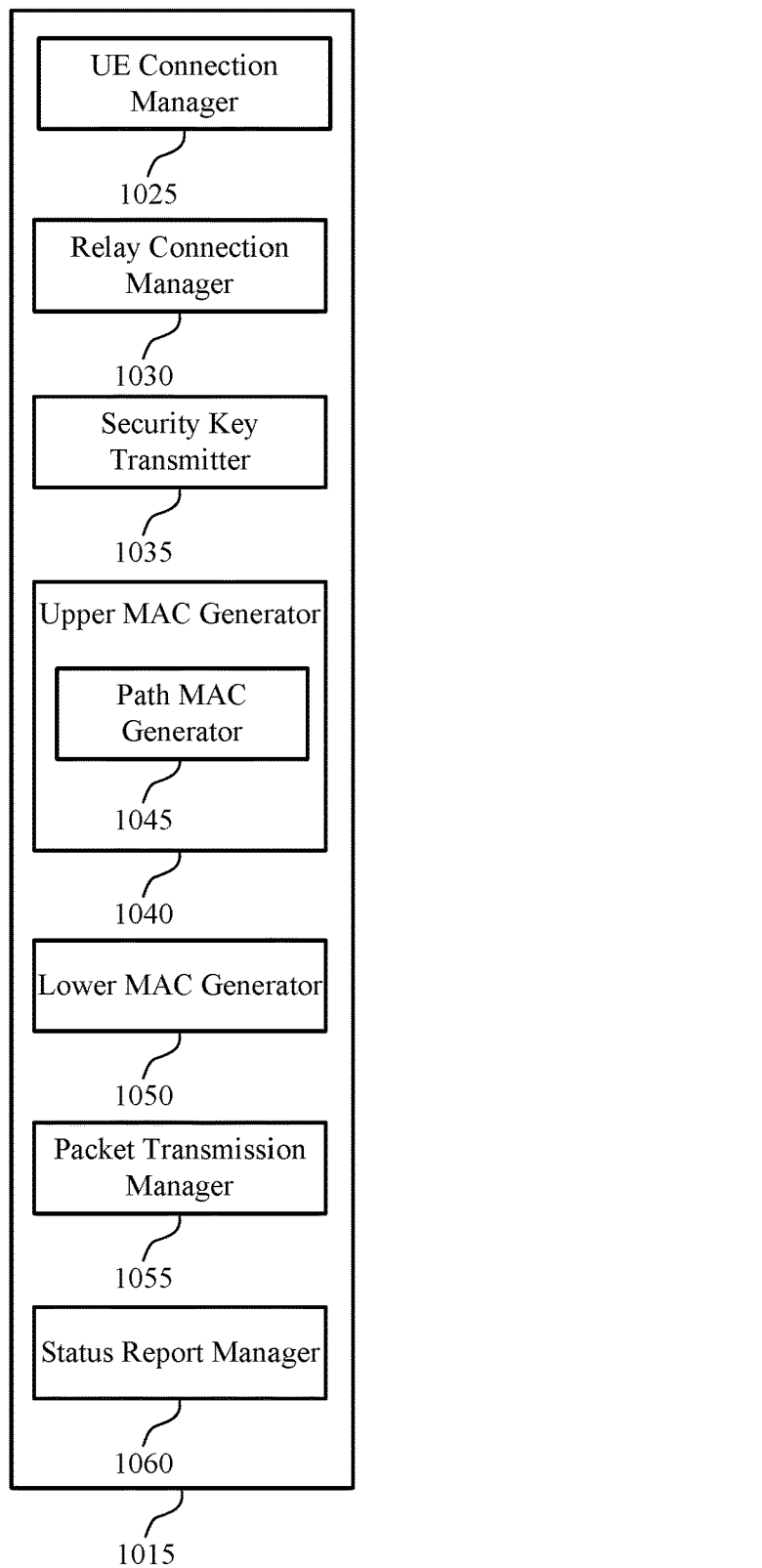
FIG. 10 shows a block diagram of an example wireless communication manager, in accordance with one or more aspects of the present disclosure.

FIG. 10 shows a block diagram 1000 of a wireless communication manager 1015, in accordance with one or more aspects of the present disclosure. The wireless communication manager 1015 may be an example of aspects of a wireless communication managers described with reference to FIGS. 1, 7, and 8, and may be included in a network access device such as one of the network access devices described with reference to FIGS. 1-6 or a network access device including one of the apparatuses described with reference to FIGS. 7 and 8. The wireless communication manager 1015 may include a UE connection manager 1025, a relay connection manager 1030, an optional security key transmitter 1035, an upper MAC generator 1040, a lower MAC generator 1050, a packet transmission manager 1055, and an optional status report manager 1060. In some examples, the upper MAC generator 1040 may include an optional path MAC generator 1045. Each of these components may communicate, directly or indirectly, with one another (e.g., via one or more buses). The upper MAC generator 1040, lower MAC generator 1050, and packet transmission manager 1055 may be configured similarly to, and may perform the functions of, the upper MAC generator 825, lower MAC generator 830, and packet transmission manager 835 described with reference to FIG. 8.

The UE connection manager 1025 may be used to include establish a first connection with a UE, as described for example with reference to FIGS. 2 and 5.

The relay connection manager 1030 may be used to identify a data routing path between the network access device and the UE, as described for example with reference to FIGS. 2 and 5. The data routing path may include at least one relay UE and a DRB configuration. The relay connection manager 1030 may also be used to transmit an indication of at least a first portion of the data routing path to the UE via the first connection, and to transmit an indication of at least a second portion of the data routing path to the relay UE, as described for example with reference to FIGS. 2 and 5.

The security key transmitter 1035 may be used to transmit, to the UE, a set of one or more security keys used to communicate with each of a plurality of relay UEs included in the data routing path, as described for example with reference to FIG. 6. Alternatively, the security key transmitter 1035 may be used to transmit, to each relay UE of the plurality of relay UEs, a respective security key used to communicate with the network access device, as described for example with reference to FIG. 6.

The upper MAC generator 1040 may be used to generate a first MAC for a data packet based at least in part on a first security key used to communicate with the UE, as described for example with reference to FIG. 6.

The path MAC generator 1045 may be used to generate a plurality of MACs for the data packet, for the plurality of relay UEs, based on the respective security keys used to communicate with the network access device. In some examples, the first MAC may be further generated based at least in part on the plurality of MACs generated for the plurality of UEs (e.g., the first MAC may be an aggregate MAC), as described for example with reference to FIG. 6.

The lower MAC generator 1050 may be used to generate a second MAC for the data packet based at least in part on a second security key used to communicate with the relay UE, as described for example with reference to FIG. 6. Furthermore, in some cases, the first MAC and second MAC may be generated in the same layer (e.g., ePDCP layer).

The packet transmission manager 1055 may be used to transmit the data packet to the relay UE with at least the first MAC and the second MAC, as described for example with reference to FIG. 6.

The status report manager 1060 may be used to receive, from the UE, an integrity-protected status report indicating receipt of the data packet at the UE, as described for example with reference to FIG. 6.

Figure 11:
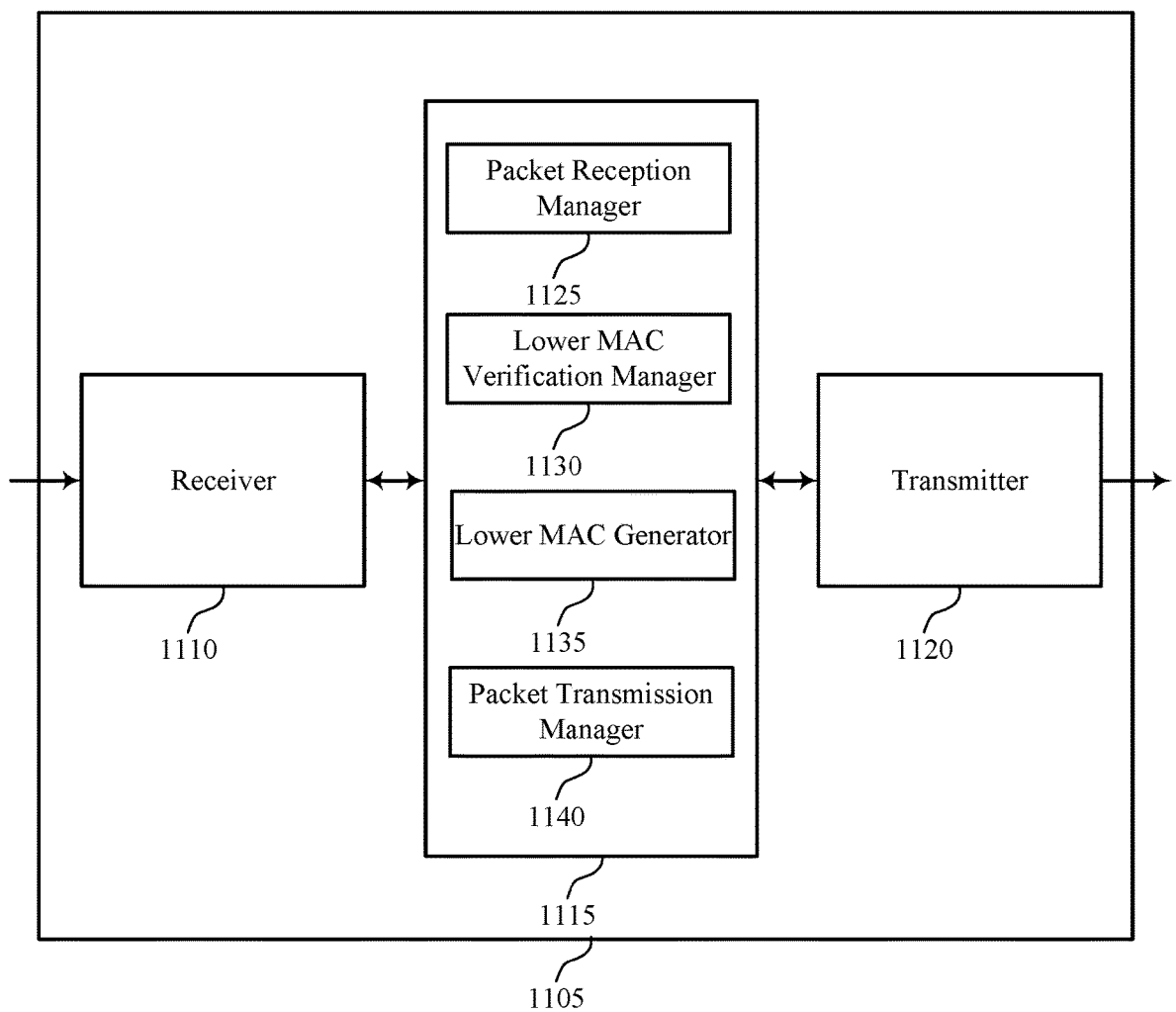
FIG. 11 shows a block diagram of an example relay UE for use in wireless communication, in accordance with one or more aspects of the present disclosure.

FIG. 11 shows a block diagram 1100 of a relay UE 1105 for use in wireless communication, in accordance with one or more aspects of the present disclosure. The relay UE 1105 may be an example of aspects of a relay UE or apparatus described with reference to FIGS. 1-7. The relay UE 1105 may include a receiver 1110, a wireless communication manager 1115, and a transmitter 1120. The relay UE 1105 may also include a processor. Each of these components may be in communication with one another (e.g., via one or more buses).

The receiver 1110 may receive data or control signals or information (i.e., transmissions), some or all of which may be associated with various information channels (e.g., data channels, control channels, etc.). Received signals or information, or measurements performed thereon, may be passed to other components of the relay UE 1105. The receiver 1110 may include a single antenna or a set of antennas.

The wireless communication manager 1115 may include a packet reception manager 1125, a lower MAC verification manager 1130, a lower MAC generator 1135, and a packet transmission manager 1140. The wireless communication manager 1115 may be an example of aspects of the wireless communication manager described with reference to FIG. 7.

The packet reception manager 1125 may be used to receive a data packet associated with at least a first MAC and a second MAC, as described for example with reference to FIG. 6.

The lower MAC verification manager 1130 may be used to determine, based at least in part on a first security key used to communicate with an upstream wireless device for which the relay UE 1105 is configured to relay data, that the second MAC was generated at least in part by the upstream wireless device, as described for example with reference to FIG. 6. In some cases, the first MAC and second MAC may have been generated in the same layer (e.g., ePDCP layer) of the upstream wireless device.

The lower MAC generator 1135 may be used to generate, based at least in part on the determination that the second MAC was generated at least in part by the upstream wireless device, a third MAC for the data packet based at least in part on a second security key used to communicate with a downstream wireless device, as described for example with reference to FIG. 6.

The packet transmission manager 1140 may be used to transmit the data packet to the downstream wireless device with at least an indication of the first MAC and the third MAC, as described for example with reference to FIG. 6. In some examples, the indication of the first MAC may include the first MAC.

The transmitter 1120 may transmit data or control signals or information (i.e., transmissions) generated by other components of the relay UE 1105, some or all of which may be associated with various information channels (e.g., data channels, control channels, etc.). In some examples, the transmitter 1120 may be collocated with the receiver 1110 in a transceiver. For example, the transmitter 1120 and receiver 1110 may be an example of aspects of the transceiver 1630 or 1750 described with reference to FIG. 16 or 17. The transmitter 1120 may include a single antenna or a set of antennas.

In some examples of the relay UE 1105, the upstream wireless device and the downstream wireless device may be nodes along a data routing path between a UE and a network access device, with the upstream wireless device being the UE (or a second relay UE positioned closer to the UE than the downstream wireless device along the data routing path). In other examples, the upstream wireless device and the downstream wireless device may be nodes along a data routing path between a network access device and a UE, with the upstream wireless device being the network access device (or a second relay UE positioned closer to the network access device than the downstream wireless device along the data routing path).

Figure 12:
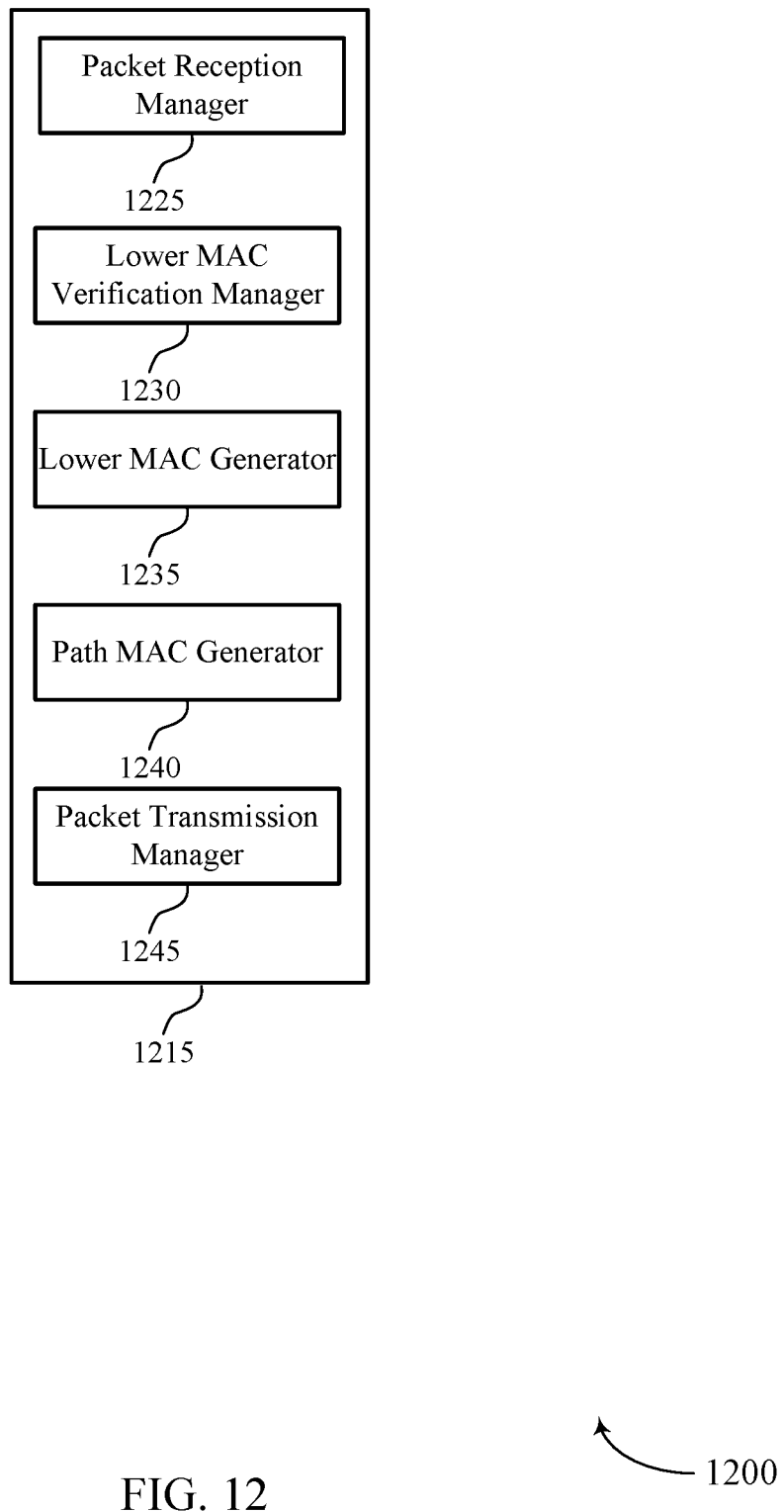
FIG. 12 shows a block diagram of an example wireless communication manager, in accordance with one or more aspects of the present disclosure.

FIG. 12 shows a block diagram 1200 of a wireless communication manager 1215, in accordance with one or more aspects of the present disclosure. The wireless communication manager 1215 may be an example of aspects of a wireless communication managers described with reference to FIGS. 1, 7, and 11, and may be included in a relay UE such as one of the relay UEs described with reference to FIGS. 1-6 or a relay UE including one of the apparatuses described with reference to FIGS. 7 and 11. The wireless communication manager 1215 may include a packet reception manager 1225, a lower MAC verification manager 1230, a lower MAC generator 1235, a path MAC generator 1240, and a packet transmission manager 1245. Each of these components may communicate, directly or indirectly, with one another (e.g., via one or more buses). The packet reception manager 1225, lower MAC verification manager 1230, lower MAC generator 1235, and packet transmission manager 1245 may be configured similarly to, and may perform the functions of, the packet reception manager 1125, lower MAC verification manager 1130, lower MAC generator 1135, and packet transmission manager 1140 described with reference to FIG. 11.

The packet reception manager 1225 may be used to receive a data packet associated with at least a first MAC and a second MAC, as described for example with reference to FIG. 6.

The lower MAC verification manager 1230 may be used to determine, based at least in part on a first security key used to communicate with an upstream wireless device for which the relay UE 1105 is configured to relay data, that the second MAC was generated at least in part by the upstream wireless device, as described for example with reference to FIG. 6. As described above, with reference to FIG. 11, in some cases, the first MAC and second MAC may have been generated in the same layer (e.g., ePDCP layer) of the upstream wireless device.

The lower MAC generator 1235 may be used to generate, based at least in part on the determination that the second MAC was generated at least in part by the upstream wireless device, a third MAC for the data packet based at least in part on a second security key used to communicate with a downstream wireless device, as described for example with reference to FIG. 6.

The path MAC generator 1240 may be used to generate a fourth MAC for the data packet. When the downstream wireless device is a wireless device (e.g., a UE or a network access device) at a receiving end of a data routing path for the data packet, the fourth MAC may be based at least in part on the second security key, as described for example with reference to FIG. 6. Otherwise, the fourth MAC may be based at least in part on a third security key used to communicate with a wireless device (e.g., a UE or a network access device) at an end (e.g., a receiving end or a transmitting end) of the data routing path for the data packet, as described for example with reference to FIG. 6. For a data packet transmitted from a UE to a network access device via the relay UE, the third security key may be a security key used by the relay UE to communicate with the network access device (i.e., the wireless device at the receiving end of the data routing path). For a data packet transmitted from a network access device to a UE via the relay UE, the third security key may be a security key used by the relay to communicate with the network access device (i.e., the wireless device at the transmitting end of the data routing path), or if provided by the network access device, a security key used by the relay to communicate with the UE (i.e., the wireless device at the receiving end of the data routing path).

In some examples, the fourth MAC may be further generated based at least in part on a combination of a first counter value that was written in an ePDCP header of the data packet by the wireless device at the transmitting end of the data routing path for the data packet, and a flow identifier that was written in the ePDCP header of the data packet by the wireless device at the transmitting end of the data routing path for the data packet. In some examples, the fourth MAC may be further generated based at least in part on a combination of the first counter value and a locally-stored UE identifier associated with a DRB over which the data packet is received or transmitted. In some examples, the fourth MAC may be further generated based at least in part on a locally-stored counter value for MAC generation, and the path MAC generator 1240 may be used to write the locally-stored counter value to the ePDCP header of the data packet.

The path MAC generator 1240 may also be used to combine the first MAC with the fourth MAC to generate a fifth MAC, as described for example with reference to FIG. 6.

The packet transmission manager 1245 may be used to transmit the data packet to the downstream wireless device with at least an indication of the first MAC and the third MAC, as described for example with reference to FIG. 6. In some examples, the indication of the first MAC may include the fifth MAC.

Figure 13:
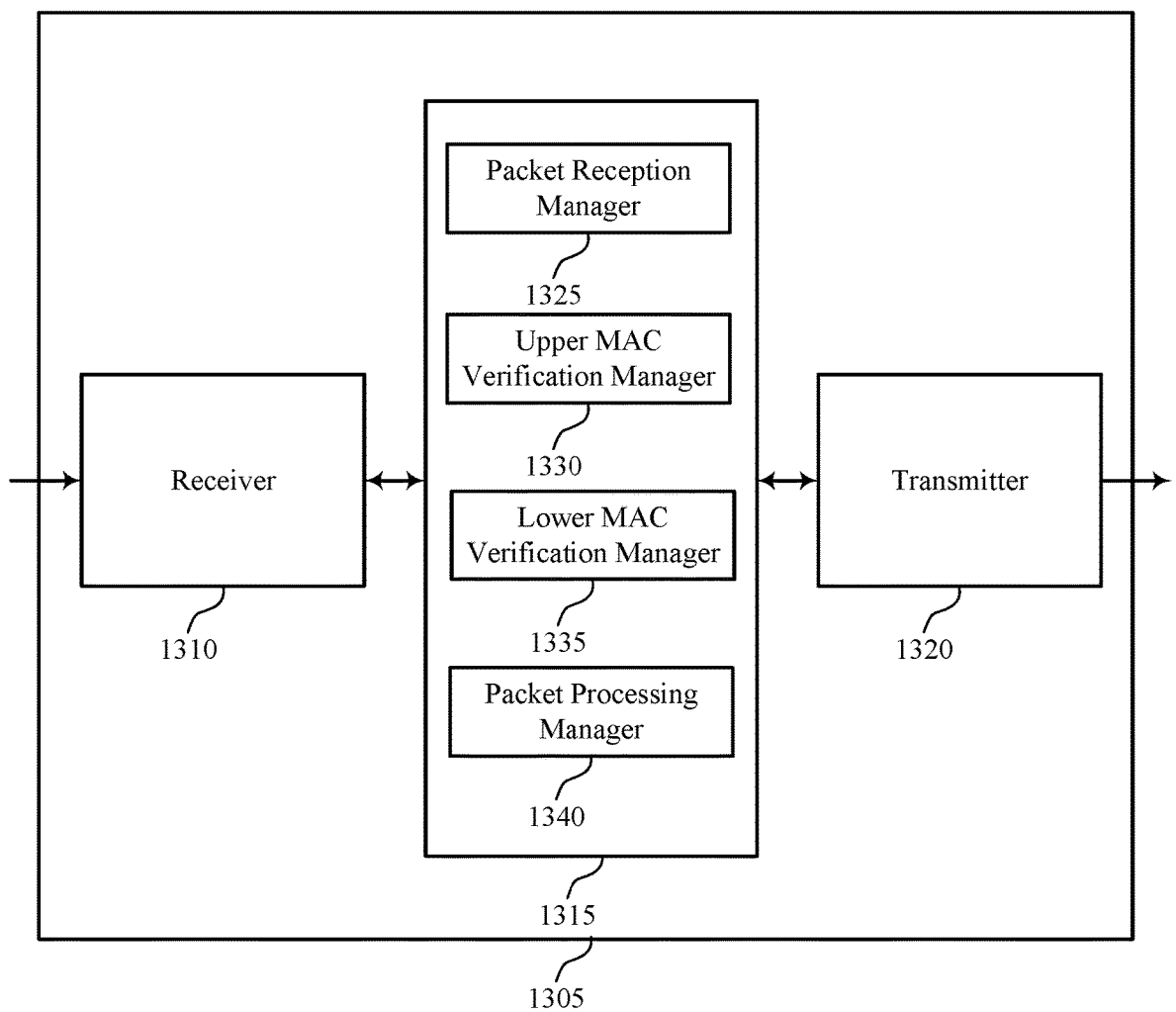
FIG. 13 shows a block diagram of an example receiving wireless device for use in wireless communication, in accordance with one or more aspects of the present disclosure.

FIG. 13 shows a block diagram 1300 of a receiving wireless device 1305 for use in wireless communication, in accordance with one or more aspects of the present disclosure. The receiving wireless device 1305 may be an example of aspects of a UE, network access device, or apparatus described with reference to FIGS. 1-7. The receiving wireless device 1305 may include a receiver 1310, a wireless communication manager 1315, and a transmitter 1320. The receiving wireless device 1305 may also include a processor. Each of these components may be in communication with one another (e.g., via one or more buses).

The receiver 1310 may receive data or control signals or information (i.e., transmissions), some or all of which may be associated with various information channels (e.g., data channels, control channels, etc.). Received signals or information, or measurements performed thereon, may be passed to other components of the receiving wireless device 1305. The receiver 1310 may include a single antenna or a set of antennas.

The wireless communication manager 1315 may include a packet reception manager 1325, an upper MAC verification manager 1330, a lower MAC verification manager 1335, and a packet processing manager 1340. The wireless communication manager 1315 may be an example of aspects of the wireless communication managers described with reference to FIGS. 1 and 7.

The packet reception manager 1325 may be used to receive a data packet associated with an indication of a first MAC and a second MAC, as described for example with reference to FIG. 6.

The upper MAC verification manager 1330 may be used to determine, based at least in part on a first security key used to communicate with a transmitting wireless device, that the first MAC was generated at least in part by the transmitting wireless device, as described for example with reference to FIG. 6.

The lower MAC verification manager 1335 may be used to determine, based at least in part on a second security key used to communicate with a relay UE, that the second MAC was generated at least in part by the relay UE, as described for example with reference to FIG. 6. The relay UE may be configured to relay data from the transmitting wireless device (e.g., a UE or a network access device) to the receiving wireless device 1305 via a data routing path.

The packet processing manager 1340 may be used to process the data packet as received from the transmitting wireless device based at least in part on the determinations that the first MAC was generated at least in part by the transmitting wireless device and the second MAC was generated at least in part by the relay UE, as described for example with reference to FIG. 6.

The transmitter 1320 may transmit data or control signals or information (i.e., transmissions) generated by other components of the receiving wireless device 1305, some or all of which may be associated with various information channels (e.g., data channels, control channels, etc.). In some examples, the transmitter 1320 may be collocated with the receiver 1310 in a transceiver. For example, the transmitter 1320 and receiver 1310 may be an example of aspects of the transceiver 1630 or 1750 described with reference to FIG. 16 or 17. The transmitter 1320 may include a single antenna or a set of antennas.

In some examples, the transmitting wireless device may be a UE and the receiving wireless device 1305 may be a network access device. In other examples, the transmitting wireless device may be a network access device and the receiving wireless device 1305 may be a UE.

Figure 14:
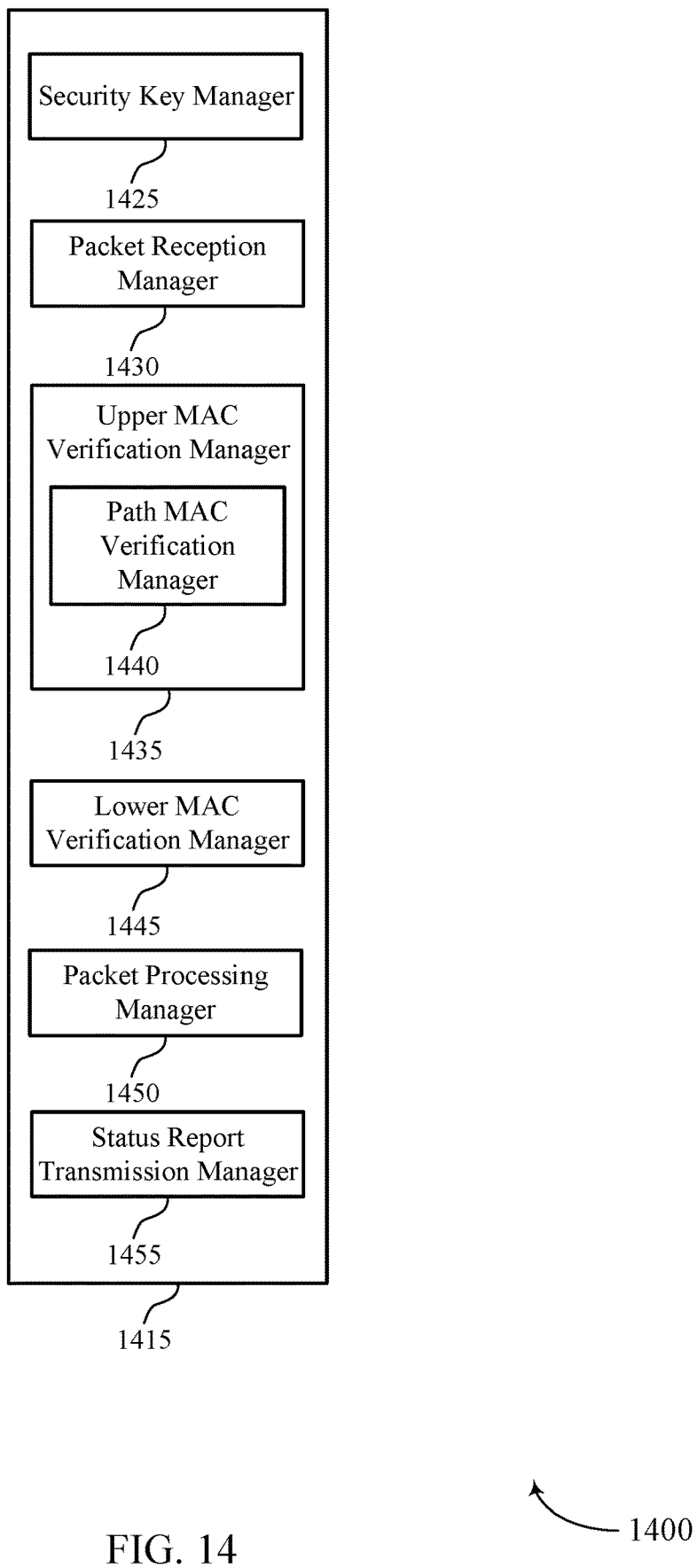
FIG. 14 shows a block diagram of an example wireless communication manager, in accordance with one or more aspects of the present disclosure.

FIG. 14 shows a block diagram 1400 of a wireless communication manager 1415, in accordance with one or more aspects of the present disclosure. The wireless communication manager 1415 may be an example of aspects of a wireless communication managers described with reference to FIGS. 1, 7, and 13, and may be included in a UE such as one of the UEs described with reference to FIGS. 1-6 or a UE including one of the apparatuses described with reference to FIGS. 7 and 13. The wireless communication manager 1415 may include an optional security key manager 1425, a packet reception manager 1430, an upper MAC verification manager 1435, a lower MAC verification manager 1445, a packet processing manager 1450, and an optional status report transmission manager 1455. In some examples, the upper MAC verification manager 1435 may include an optional path MAC verification manager 1440. Each of these components may communicate, directly or indirectly, with one another (e.g., via one or more buses). The packet reception manager 1430, upper MAC verification manager 1435, lower MAC verification manager 1445, and packet processing manager 1450 may be configured similarly to, and may perform the functions of, the packet reception manager 1325, upper MAC verification manager 1330, lower MAC verification manager 1335, and packet processing manager 1340 described with reference to FIG. 13.

The security key manager 1425 may be used to receive, from a network access device, a set of one or more security keys used to communicate with each of a plurality of relay UEs, as described for example with reference to FIG. 6. The plurality of relay UEs may be included in a data routing path between the network access device and the UE.

The packet reception manager 1325 may be used to receive a data packet associated with an indication of a first MAC and a second MAC, as described for example with reference to FIG. 6.

The upper MAC verification manager 1330 may be used to determine, based at least in part on a first security key used to communicate with a network access device, that the first MAC was generated at least in part by the network access device, as described for example with reference to FIG. 6.

The path MAC verification manager 1440 may be used to determine, based at least in part on a third security key used to communicate with a second relay UE configured to relay data from the network access device to the UE along the data routing path, that the indication of the first MAC was generated at least in part by the second relay UE, as described for example with reference to FIG. 6. In some examples, the determination that the indication of the first MAC was generated at least in part by the second relay UE may be further based at least in part on a combination of a first counter value that was written in an ePDCP header of the data packet by the UE, and a flow identifier that was written in the ePDCP header of the data packet by the UE. In other examples, the determination that the indication of the first MAC was generated at least in part by the second relay UE may be further based at least in part on a combination of the first counter value and a locally-stored UE identifier associated with a DRB over which the data packet is received by or transmitted from the second relay UE. In other examples, the determination that the indication of the first MAC was generated at least in part by the second relay UE may be further based at least in part on a second counter value written in the ePDCP header of the data packet by the second relay UE.

The lower MAC verification manager 1335 may be used to determine, based at least in part on a second security key used to communicate with a relay UE, that the second MAC was generated at least in part by the relay UE, as described for example with reference to FIG. 6. The relay UE may be configured to relay data from the network access device to the UE via the data routing path.

The packet processing manager 1340 may be used to processing the data packet as received from the network access device based at least in part on the determinations that the first MAC was generated at least in part by the network access device and the second MAC was generated at least in part by the relay UE, as described for example with reference to FIG. 6.

The status report transmission manager 1455 may be used to transmit, to the network access device, an integrity-protected status report indicating receipt of the data packet at the UE, as described for example with reference to FIG. 6.

Figure 15:
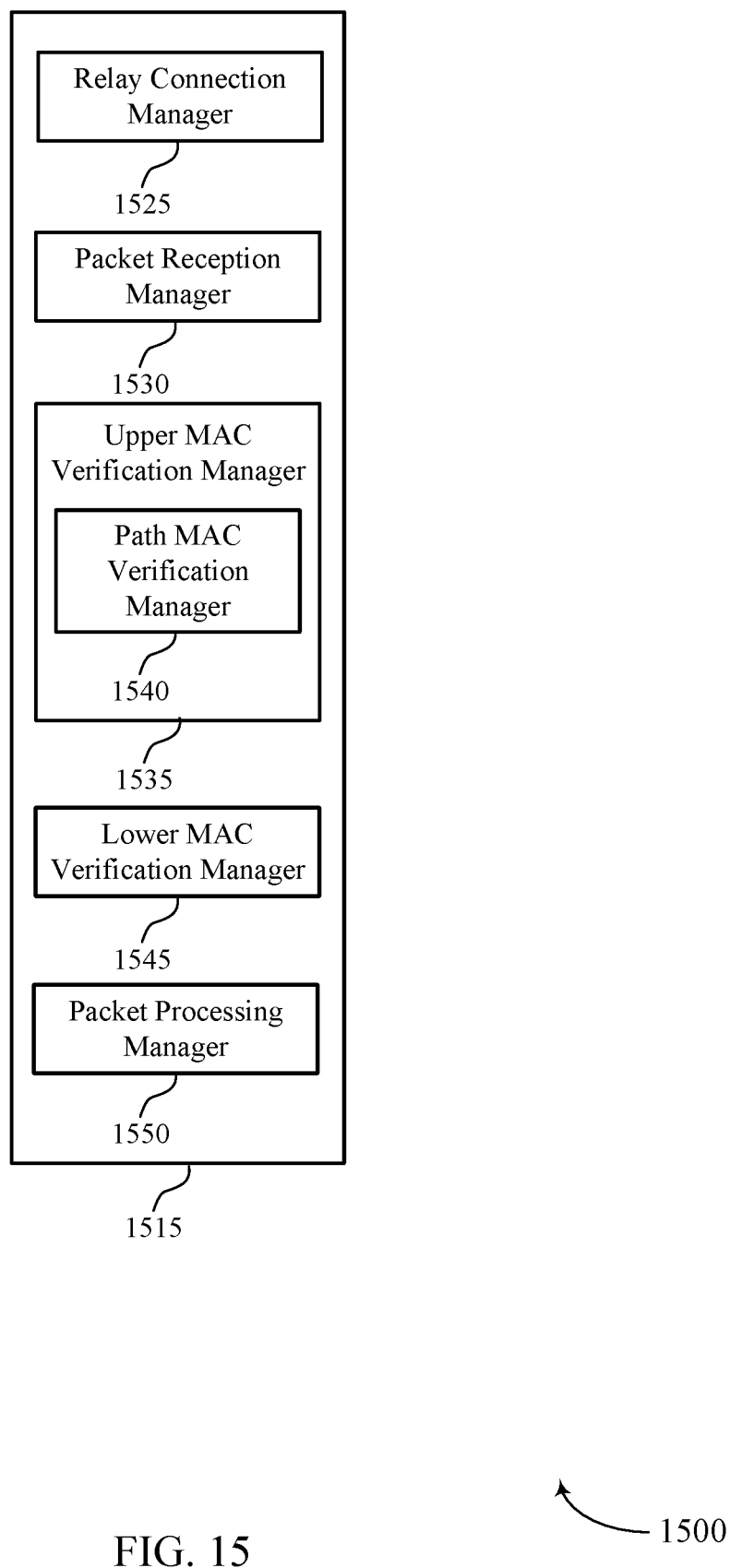
FIG. 15 shows a block diagram of an example wireless communication manager, in accordance with one or more aspects of the present disclosure.

FIG. 15 shows a block diagram 1500 of a wireless communication manager 1515, in accordance with one or more aspects of the present disclosure. The wireless communication manager 1515 may be an example of aspects of a wireless communication managers described with reference to FIGS. 1, 7, and 13, and may be included in a network access device such as one of the network access devices described with reference to FIGS. 1-6 or a network access device including one of the apparatuses described with reference to FIGS. 7 and 13. The wireless communication manager 1515 may include a relay connection manager 1525, a packet reception manager 1530, an upper MAC verification manager 1535, a lower MAC verification manager 1545, and a packet processing manager 1550. In some examples, the upper MAC verification manager 1535 may include a path MAC verification manager 1540. Each of these components may communicate, directly or indirectly, with one another (e.g., via one or more buses). The packet reception manager 1530, upper MAC verification manager 1535, lower MAC verification manager 1545, and packet processing manager 1550 may be configured similarly to, and may perform the functions of, the packet reception manager 1325, upper MAC verification manager 1330, lower MAC verification manager 1335, and packet processing manager 1340 described with reference to FIG. 13.

The relay connection manager 1525 may be used to configure a data routing path, as described for example with reference to FIG. 6. The data routing path may include a relay UE configured to relay data from a UE to a network access device via the data routing path. The relay connection manager 1525 may also be used to transmit an indication of at least a first portion of the data routing path, to the UE, using a first direct connection between the network access device and the UE, and to transmit an indication of at least a second portion of the data routing path, to a relay UE of the data routing path, using a second direct connection between the network access device and the relay UE, as described for example with reference to FIG. 6.

The packet reception manager 1530 may be used to receive a data packet associated with an indication of a first MAC and a second MAC, as described for example with reference to FIG. 6.

The upper MAC verification manager 1535 may be used to determine, based at least in part on a first security key used to communicate with the UE, that the first MAC was generated at least in part by the UE, as described for example with reference to FIG. 6.

The lower MAC verification manager 1545 may be used to determine, based at least in part on a second security key used to communicate with a relay UE, that the second MAC was generated at least in part by the relay UE, as described for example with reference to FIG. 6. The relay UE may be configured to relay data from the UE to the network access device via a data routing path.

The path MAC verification manager 1540 may be used to determine, based at least in part on a third security key used to communicate with a second relay UE configured to relay data from the UE to the network access device along the data routing path, that the indication of the first MAC was generated at least in part by the second relay, as described for example with reference to FIG. 6. In some examples, the determination that the indication of the first MAC was generated at least in part by the second relay UE may be further based at least in part on a combination of a first counter value that was written in an ePDCP header of the data packet by the UE, and a flow identifier that was written in the ePDCP header of the data packet by the UE. In other examples, the determination that the indication of the first MAC was generated at least in part by the second relay UE may be further based at least in part on a combination of the first counter value and a locally-stored UE identifier associated with a DRB over which the data packet is received by or transmitted from the second relay UE. In other examples, the determination that the indication of the first MAC was generated at least in part by the second relay UE may be further based at least in part on a second counter value written in the ePDCP header of the data packet by the second relay UE.

The packet processing manager 1550 may be used to processing the data packet as received from the transmitting wireless device based at least in part on the determinations that the first MAC was generated at least in part by the transmitting wireless device and the second MAC was generated at least in part by the relay UE, as described for example with reference to FIG. 6.

Figure 16:
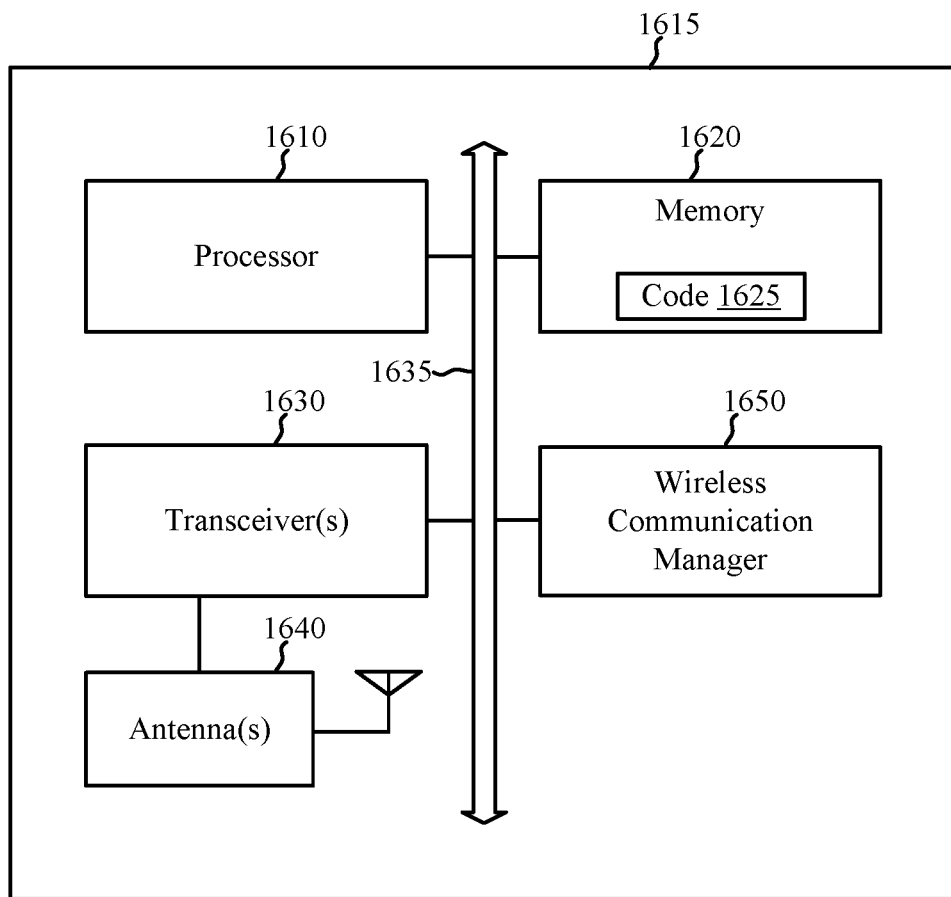
FIG. 16 shows a block diagram of an example UE for use in wireless communication, in accordance with one or more aspects of the present disclosure.

FIG. 16 shows a block diagram 1600 of a UE 1615 for use in wireless communication, in accordance with one or more aspects of the present disclosure. The UE 1615 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1615 may, in some examples, have an internal power supply (not shown), such as a small battery, to facilitate mobile operation. In some examples, the UE 1615 may be an example of aspects of one or more of the UEs or relay UEs described with reference to FIGS. 1-6, or aspects of one or more of the apparatuses described with reference to FIGS. 7-9 and 11-14. The UE 1615 may be configured to implement at least some of the UE or apparatus techniques and functions described with reference to FIGS. 1-9 and 11-14.

The UE 1615 may include a processor 1610, a memory 1620, at least one transceiver (represented by transceiver(s) 1630), antennas 1640 (e.g., an antenna array), or a wireless communication manager 1650. Each of these components may be in communication with each other, directly or indirectly, over one or more buses 1635.

The memory 1620 may include random access memory (RAM) or read-only memory (ROM). The memory 1620 may store computer-readable, computer-executable code 1625 containing instructions that are configured to, when executed, cause the processor 1610 to perform various functions described herein related to wireless communication, including, for example, the reception and transmission of data packets via a direct connection with a network access device or an indirect connection with the network access device (e.g., via one or more relay UEs of a data routing path), or the relaying of data packets as a relay UE. Alternatively, the computer-executable code 1625 may not be directly executable by the processor 1610 but be configured to cause the UE 1615 (e.g., when compiled and executed) to perform various of the functions described herein.

The processor 1610 may include an intelligent hardware device, e.g., a central processing unit (CPU), a microcontroller, an ASIC, etc. The processor 1610 may process information received through the transceiver(s) 1630 or information to be sent to the transceiver(s) 1630 for transmission through the antennas 1640. The processor 1610 may handle, alone or in connection with the wireless communication manager 1650, one or more aspects of communicating over (or managing communications over) one or more radio frequency spectrum bands.

The transceiver(s) 1630 may include a modem configured to modulate packets and provide the modulated packets to the antennas 1640 for transmission, and to demodulate packets received from the antennas 1640. The transceiver(s) 1630 may, in some examples, be implemented as one or more transmitters and one or more separate receivers. The transceiver(s) 1630 may support communications in one or more radio frequency spectrum bands. The transceiver(s) 1630 may be configured to communicate bi-directionally, via the antennas 1640, with one or more network access devices or apparatuses, such as one of the network access devices described with reference to FIGS. 1-6, or one of the apparatuses described with reference to FIGS. 7, 8, 10, 13, and 15.

The wireless communication manager 1650 may be configured to perform or control some or all of the UE or apparatus techniques or functions described with reference to FIGS. 1-9 and 11-14 related to wireless communication. The wireless communication manager 1650, or portions of it, may include a processor, or some or all of the functions of the wireless communication manager 1650 may be performed by the processor 1610 or in connection with the processor 1610. In some examples, the wireless communication manager 1650 may be an example of the wireless communication manager described with reference to FIGS. 1, 7-9, and 11-14.

Figure 17:
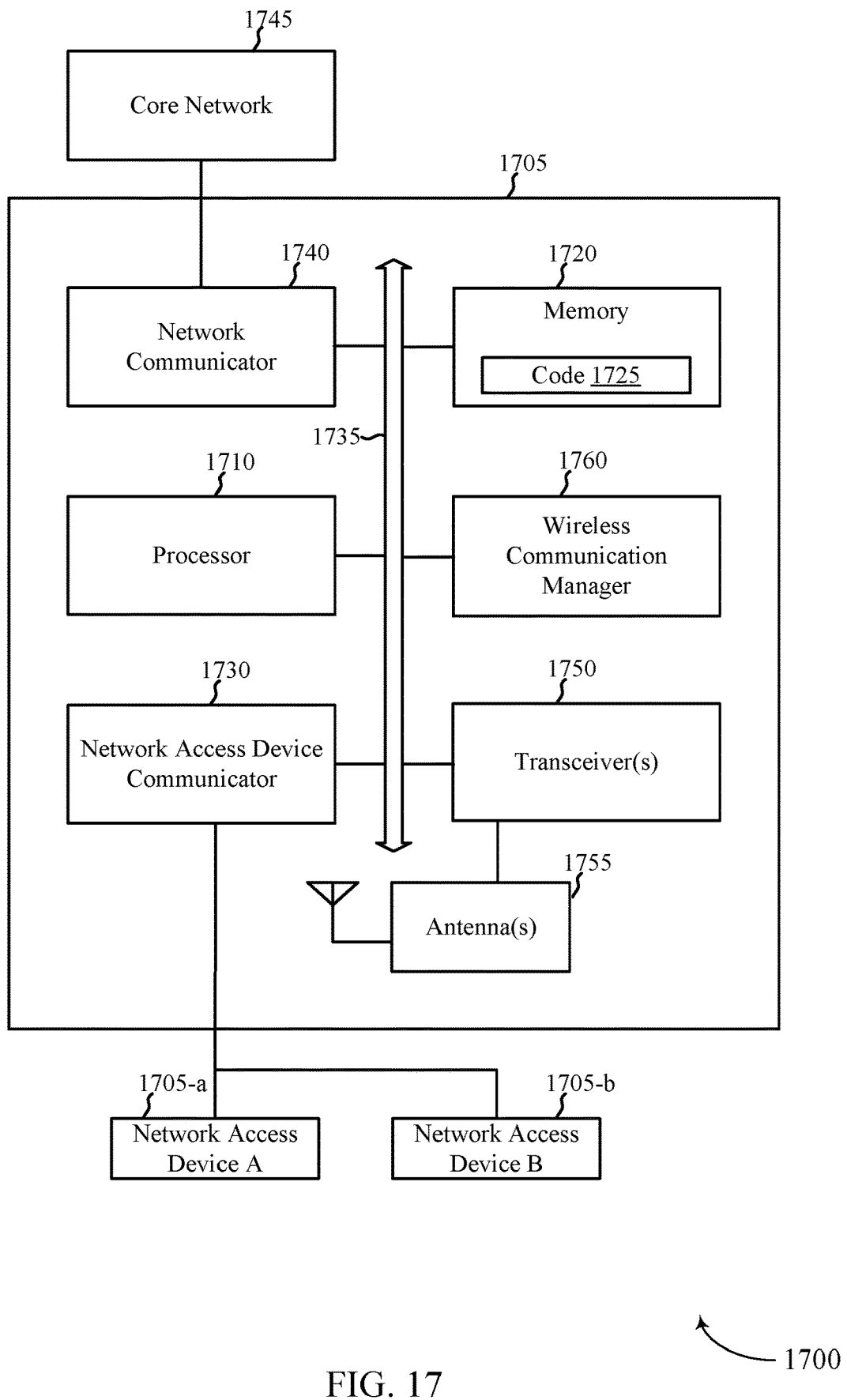
FIG. 17 shows a block diagram of an example network access device for use in wireless communication, in accordance with one or more aspects of the present disclosure.

FIG. 17 shows a block diagram 1700 of a network access device 1705 for use in wireless communication, in accordance with one or more aspects of the present disclosure. In some examples, the network access device 1705 may be an example of aspects of one or more of the network access devices (e.g., a radio head, a base station, a gNB, or an ANC) described with reference to FIGS. 1-6, or aspects of one or more of the apparatuses described with reference to FIGS. 7, 8, and 13. The network access device 1705 may be configured to implement or facilitate at least some of the network access device techniques and functions described with reference to FIGS. 1-8, 10, 13, and 15.

The network access device 1705 may include a processor 1710, a memory 1720, at least one transceiver (represented by transceiver(s) 1750), antennas 1755 (e.g., an antenna array), or a wireless communication manager 1760. The network access device 1705 may also include one or more of a network access device communicator 1730 or a network communicator 1740. Each of these components may be in communication with each other, directly or indirectly, over one or more buses 1735.

The memory 1720 may include RAM or ROM. The memory 1720 may store computer-readable, computer-executable code 1725 containing instructions that are configured to, when executed, cause the processor 1710 to perform various functions described herein related to wireless communication, including, for example, the reception and transmission of data packets via a direct connection with a UE or an indirect connection with the UE (e.g., via one or more relay UEs of a data routing path), or the configuration of the data routing path. Alternatively, the computer-executable code 1725 may not be directly executable by the processor 1710 but be configured to cause the network access device 1705 (e.g., when compiled and executed) to perform various of the functions described herein.

The processor 1710 may include an intelligent hardware device, e.g., a CPU, a microcontroller, an ASIC, etc. The processor 1710 may process information received through the transceiver(s) 1750, the network access device communicator 1730, or the network communicator 1740. The processor 1710 may also process information to be sent to the transceiver(s) 1750 for transmission through the antennas 1755, or to the network access device communicator 1730 for transmission to one or more other network access devices (e.g., network access device 1705-a and network access device 1705-b), or to the network communicator 1740 for transmission to a core network 1745, which may be an example of one or more aspects of the core network 130 described with reference to FIG. 1. The processor 1710 may handle, alone or in connection with the wireless communication manager 1760, one or more aspects of communicating over (or managing communications over) one or more radio frequency spectrum bands.

The transceiver(s) 1750 may include a modem configured to modulate packets and provide the modulated packets to the antennas 1755 for transmission, and to demodulate packets received from the antennas 1755. The transceiver(s) 1750 may, in some examples, be implemented as one or more transmitters and one or more separate receivers. The transceiver(s) 1750 may support communications in one or more radio frequency spectrum bands. The transceiver(s) 1750 may be configured to communicate bi-directionally, via the antennas 1755, with one or more UEs or apparatuses, such as one of the UEs described with reference to FIGS. 1-6 and 16, or one of the apparatuses described with reference to FIGS. 7, 8, and 13. The network access device 1705 may communicate with the core network 1745 through the network communicator 1740. The network access device 1705 may also communicate with other network access devices, such as the network access device 1705-a and the network access device 1705-b, using the network access device communicator 1730.

The wireless communication manager 1760 may be configured to perform or control some or all of the network access device or apparatus techniques or functions described with reference to FIGS. 1-8, 10, 13, and 15 related to wireless communication. The wireless communication manager 1760, or portions of it, may include a processor, or some or all of the functions of the wireless communication manager 1760 may be performed by the processor 1710 or in connection with the processor 1710. In some examples, the wireless communication manager 1760 may be an example of the wireless communication manager described with reference to FIGS. 1, 7, 8, 10, 13, and 15.

Figure 18:
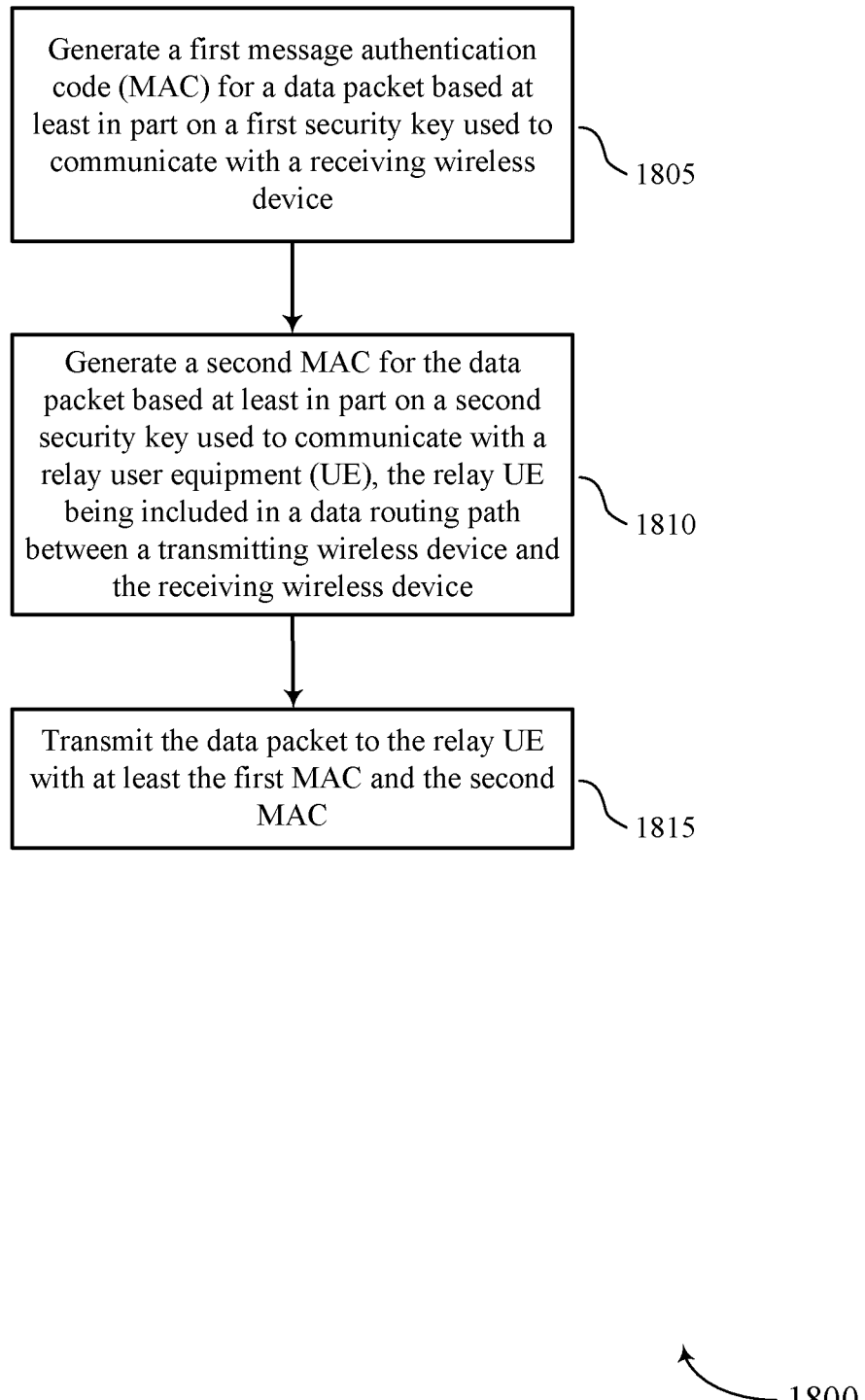
FIG. 18 is a flow chart illustrating an example of a method for wireless communication at a transmitting wireless device, in accordance with one or more aspects of the present disclosure.

FIG. 18 is a flow chart illustrating an example of a method 1800 for wireless communication at a transmitting wireless device, in accordance with one or more aspects of the present disclosure. For clarity, the method 1800 is described below with reference to aspects of one or more of the UEs described with reference to FIGS. 1-6 and 16, aspects of one or more of the network access devices or MgNBs described with reference to FIGS. 1-6 and 17, aspects of one or more of the apparatuses described with reference to FIGS. 7 and 8, or aspects of one or more of the wireless communication managers described with reference to FIGS. 1, 7, 8, 9, 10, 11, 16, and 17. In some examples, a wireless device may execute one or more sets of codes to control the functional elements of the wireless device to perform the functions described below. Additionally or alternatively, the wireless device may perform one or more of the functions described below using special-purpose hardware.

At block 1805, the method 1800 may include generating a first MAC for a data packet based at least in part on a first security key used to communicate with a receiving wireless device, as described for example with reference to FIG. 6. In certain examples, the operation(s) at block 1805 may be performed using the upper MAC generator described with reference to FIGS. 8-10.

At block 1810, the method 1800 may include generating a second MAC for the data packet based at least in part on a second security key used to communicate with a relay UE, as described for example with reference to FIG. 6. The relay UE may be included in a data routing path between the transmitting wireless device and the receiving wireless device. In certain examples, the operation(s) at block 1810 may be performed using the lower MAC generator described with reference to FIGS. 8-10.

At block 1815, the method 1800 may include transmitting the data packet to the relay UE with at least the first MAC and the second MAC, as described for example with reference to FIG. 6. In certain examples, the operation(s) at block 1815 may be performed using the packet transmission manager described with reference to FIGS. 8-10.

In some examples of the method 1800, the transmitting wireless device may be a UE and the receiving wireless device may be a network access device. In other examples, the transmitting wireless device may be a network access device and the receiving wireless device may be a UE.

Figure 19:
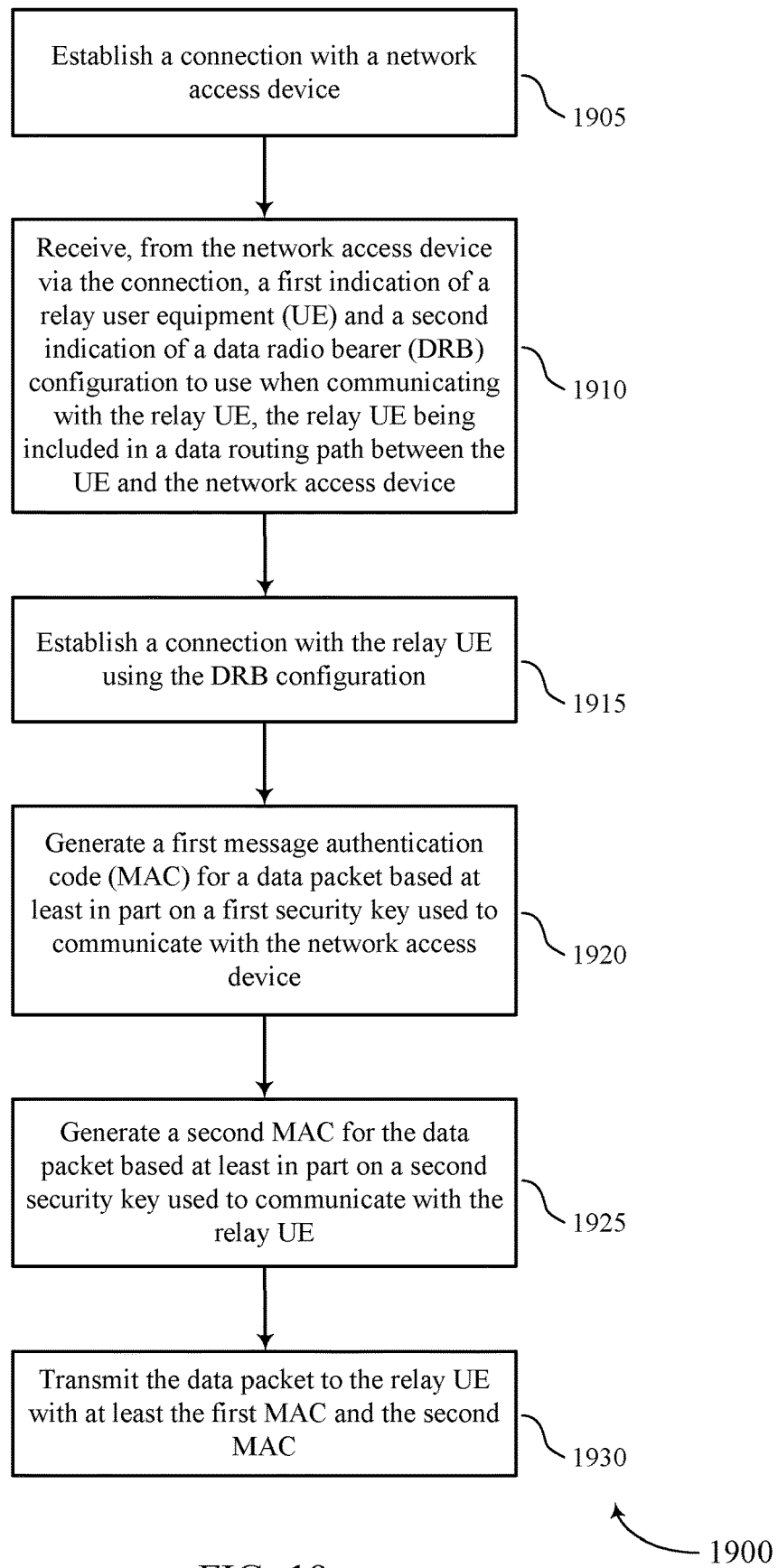
FIG. 19 is a flow chart illustrating an example of a method for wireless communication at a UE, in accordance with one or more aspects of the present disclosure.

FIG. 19 is a flow chart illustrating an example of a method 1900 for wireless communication at a UE, in accordance with one or more aspects of the present disclosure. In the method 1900, the UE operates as a transmitting wireless device and a network access device operates as a receiving wireless device. For clarity, the method 1900 is described below with reference to aspects of one or more of the UEs described with reference to FIGS. 1-6 and 16, aspects of one or more of the apparatuses described with reference to FIGS. 7 and 8, or aspects of one or more of the wireless communication managers described with reference to FIGS. 1, 7, 8, 9, and 16. In some examples, a UE may execute one or more sets of codes to control the functional elements of the UE to perform the functions described below. Additionally or alternatively, the UE may perform one or more of the functions described below using special-purpose hardware.

At block 1905, the method 1900 may include establishing a connection with the network access device, as described for example with reference to FIGS. 2 and 5. In certain examples, the operation(s) at block 1905 may be performed using the network connection manager described with reference to FIG. 9.

At block 1910, the method 1900 may include receiving, from the network access device via the connection, a first indication of a relay UE and a second indication of a DRB configuration to use when communicating with the relay UE, as described for example with reference to FIGS. 2 and 5. The relay UE may be included in a data routing path between the UE and the network access device. In certain examples, the operation(s) at block 1910 may be performed using the relay connection manager described with reference to FIG. 9.

At block 1915, the method 1900 may include establishing a connection with the relay UE using the DRB configuration, as described for example with reference to FIGS. 2 and 5. In certain examples, the operation(s) at block 1915 may be performed using the relay connection manager described with reference to FIG. 9.

At block 1920, the method 1900 may include generating a first MAC for a data packet based at least in part on a first security key used to communicate with the network access device, as described for example with reference to FIG. 6. In certain examples, the operation(s) at block 1920 may be performed using the upper MAC generator described with reference to FIGS. 8 and 9.

At block 1925, the method 1900 may include generating a second MAC for the data packet based at least in part on a second security key used to communicate with the relay UE, as described for example with reference to FIG. 6. In certain examples, the operation(s) at block 1925 may be performed using the lower MAC generator described with reference to FIGS. 8 and 9.

At block 1930, the method 1900 may include transmitting the data packet to the relay UE with at least the first MAC and the second MAC, as described for example with reference to FIG. 6. In certain examples, the operation(s) at block 1930 may be performed using the packet transmission manager described with reference to FIGS. 8 and 9.

Figure 20:
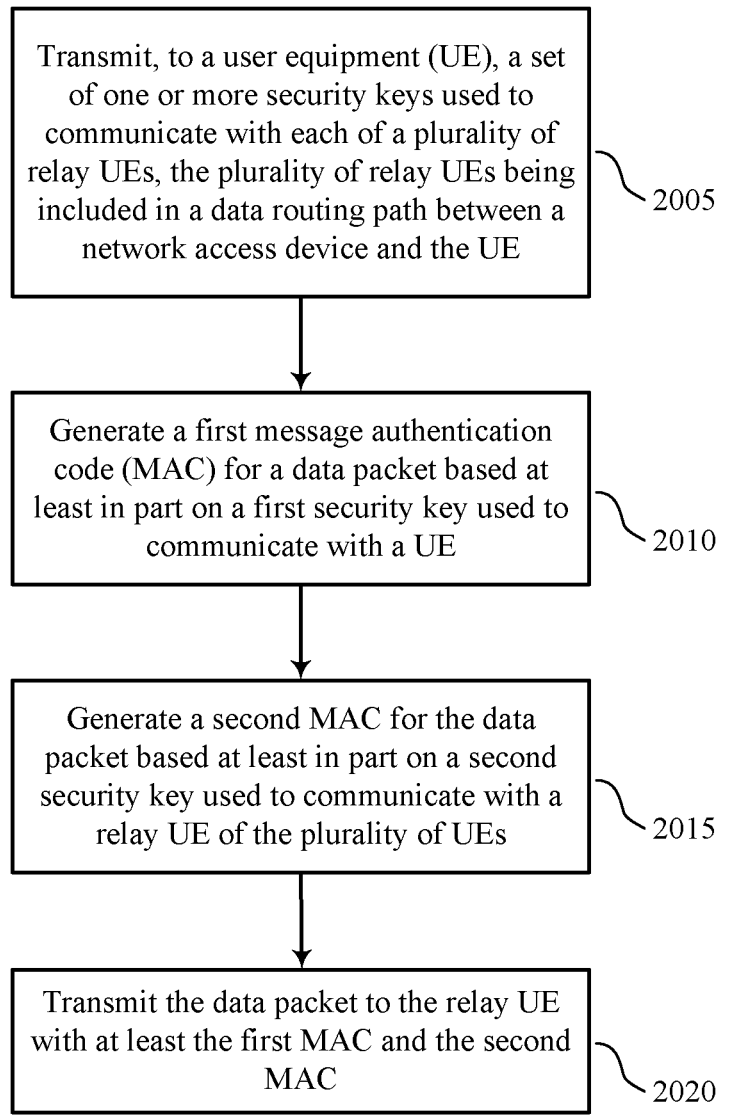
FIG. 20 is a flow chart illustrating an example of a method for wireless communication at a network access device, in accordance with one or more aspects of the present disclosure.

FIG. 20 is a flow chart illustrating an example of a method 2000 for wireless communication at a network access device, in accordance with one or more aspects of the present disclosure. In the method 2000, the network access device operates as a transmitting wireless device and a UE operates as a receiving wireless device. For clarity, the method 2000 is described below with reference to aspects of one or more of the network access devices described with reference to FIGS. 1-6 and 17, aspects of one or more of the apparatuses described with reference to FIGS. 7 and 8, or aspects of one or more of the wireless communication managers described with reference to FIGS. 1, 7, 8, 10, and 17. In some examples, a network access device may execute one or more sets of codes to control the functional elements of the network access device to perform the functions described below. Additionally or alternatively, the network access device may perform one or more of the functions described below using special-purpose hardware.

At block 2005, the method 2000 may include transmitting, to the UE, a set of one or more security keys used to communicate with each of the plurality of relay UEs, as described for example with reference to FIG. 6. The plurality of relay UEs may be included in a data routing path between the network access device and the UE. In certain examples, the operation(s) at block 2005 may be performed using the security key transmitter described with reference to FIG. 10.

At block 2010, the method 2000 may include generating a first MAC for a data packet based at least in part on a first security key used to communicate with the UE, as described for example with reference to FIG. 6. In certain examples, the operation(s) at block 2010 may be performed using the upper MAC generator described with reference to FIGS. 8 and 10.

At block 2015, the method 2000 may include generating a second MAC for the data packet based at least in part on a second security key used to communicate with a relay UE of the plurality of relay UEs including in the data routing path, as described for example with reference to FIG. 6. In certain examples, the operation(s) at block 2015 may be performed using the lower MAC generator described with reference to FIGS. 8 and 10.

At block 2020, the method 2000 may include transmitting the data packet to the relay UE with at least the first MAC and the second MAC, as described for example with reference to FIG. 6. In certain examples, the operation(s) at block 2020 may be performed using the packet transmission manager described with reference to FIGS. 8 and 10. As described above, in some cases, the first MAC and second MAC may have been generated in the same layer (e.g., ePDCP layer).

Figure 21:
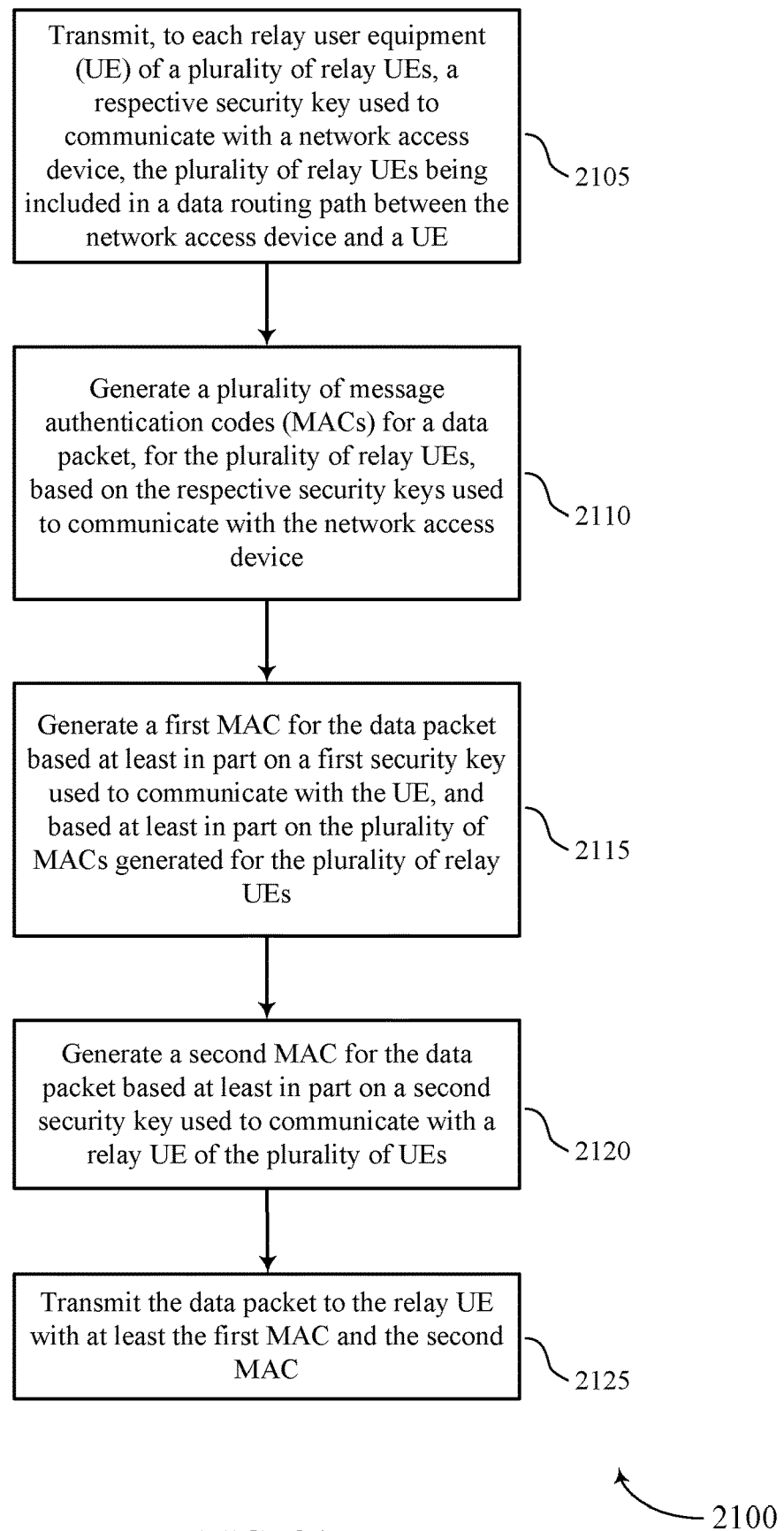
FIG. 21 is a flow chart illustrating an example of a method for wireless communication at a network access device, in accordance with one or more aspects of the present disclosure.

FIG. 21 is a flow chart illustrating an example of a method 2100 for wireless communication at a network access device, in accordance with one or more aspects of the present disclosure. In the method 2100, the network access device operates as a transmitting wireless device and a UE operates as a receiving wireless device. For clarity, the method 2100 is described below with reference to aspects of one or more of the network access devices described with reference to FIGS. 1-6 and 17, aspects of one or more of the apparatuses described with reference to FIGS. 7 and 8, or aspects of one or more of the wireless communication managers described with reference to FIGS. 1, 7, 8, 10, and 17. In some examples, a network access device may execute one or more sets of codes to control the functional elements of the network access device to perform the functions described below. Additionally or alternatively, the network access device may perform one or more of the functions described below using special-purpose hardware.

At block 2105, the method 2100 may include transmitting, to each relay UE of a plurality of relay UEs, a respective security key used to communicate with the network access device, as described for example with reference to FIG. 6. The plurality of relay UEs may be included in a data routing path between the network access device and the UE. In certain examples, the operation(s) at block 2105 may be performed using the security key transmitter described with reference to FIG. 10.

At block 2110, the method 2100 may include generating a plurality of MACs for the data packet, for the plurality of relay UEs, based on the respective security keys used to communicate with the network access device, as described for example with reference to FIG. 6. In certain examples, the operation(s) at block 2110 may be performed using the path MAC generator described with reference to FIG. 10.

At block 2115, the method 2100 may include generating a first MAC for a data packet based at least in part on a first security key used to communicate with the UE, and based at least in part on the plurality of MACs generated for the plurality of relay UEs (e.g., the first MAC may be an aggregate MAC), as described for example with reference to FIG. 6. In certain examples, the operation(s) at block 2115 may be performed using the upper MAC generator described with reference to FIGS. 8 and 10.

At block 2120, the method 2100 may include generating a second MAC for the data packet based at least in part on a second security key used to communicate with a relay UE of the plurality of relay UEs including in the data routing path, as described for example with reference to FIG. 6. In certain examples, the operation(s) at block 2120 may be performed using the lower MAC generator described with reference to FIGS. 8 and 10.

At block 2125, the method 2100 may include transmitting the data packet to the relay UE with at least the first MAC and the second MAC, as described for example with reference to FIG. 6. In certain examples, the operation(s) at block 2125 may be performed using the packet transmission manager described with reference to FIGS. 8 and 10.

Figure 22:
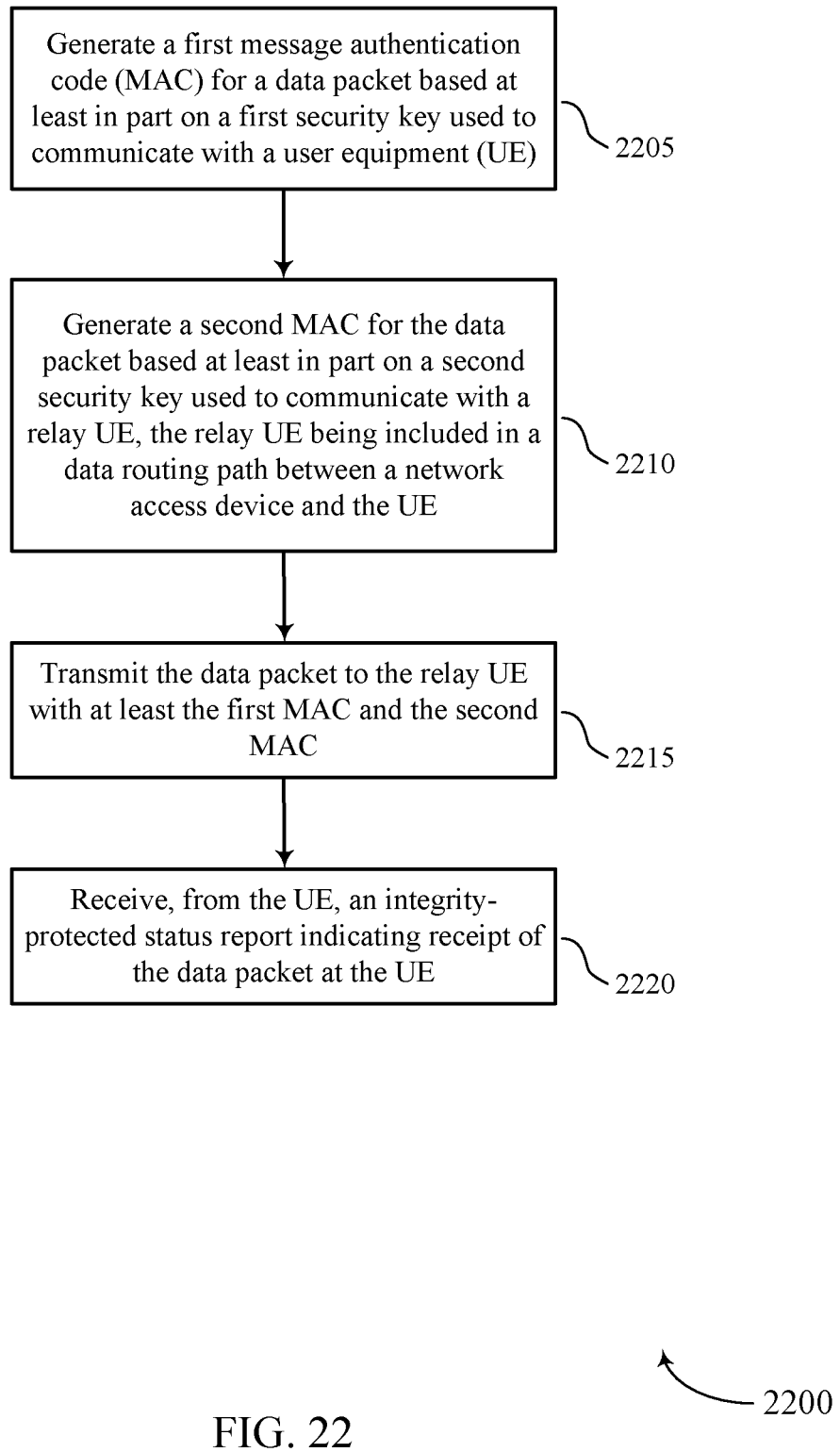
FIG. 22 is a flow chart illustrating an example of a method for wireless communication at a network access device, in accordance with one or more aspects of the present disclosure.

FIG. 22 is a flow chart illustrating an example of a method 2200 for wireless communication at a network access device, in accordance with one or more aspects of the present disclosure. In the method 2200, the network access device operates as a transmitting wireless device and a UE operates as a receiving wireless device. For clarity, the method 2200 is described below with reference to aspects of one or more of the network access devices described with reference to FIGS. 1-6 and 17, aspects of one or more of the apparatuses described with reference to FIGS. 7 and 8, or aspects of one or more of the wireless communication managers described with reference to FIGS. 1, 7, 8, 10, and 17. In some examples, a network access device may execute one or more sets of codes to control the functional elements of the network access device to perform the functions described below. Additionally or alternatively, the network access device may perform one or more of the functions described below using special-purpose hardware.

At block 2205, the method 2200 may include generating a first MAC for a data packet based at least in part on a first security key used to communicate with the UE, as described for example with reference to FIG. 6. In certain examples, the operation(s) at block 2205 may be performed using the upper MAC generator described with reference to FIGS. 8 and 10.

At block 2210, the method 2200 may include generating a second MAC for the data packet based at least in part on a second security key used to communicate with a relay UE, as described for example with reference to FIG. 6. The relay UE may be included in a data routing path between the network access device and the UE. In certain examples, the operation(s) at block 2210 may be performed using the lower MAC generator described with reference to FIGS. 8 and 10.

At block 2215, the method 2200 may include transmitting the data packet to the relay UE with at least the first MAC and the second MAC, as described for example with reference to FIG. 6. In certain examples, the operation(s) at block 2215 may be performed using the packet transmission manager described with reference to FIGS. 8 and 10.

At block 2220, the method 2200 may include receiving, from the UE, an integrity-protected status report indicating receipt of the data packet at the UE, as described for example with reference to FIG. 6. In certain examples, the operation(s) at block 2220 may be performed using the status report manager described with reference to FIG. 10.

Figure 23:
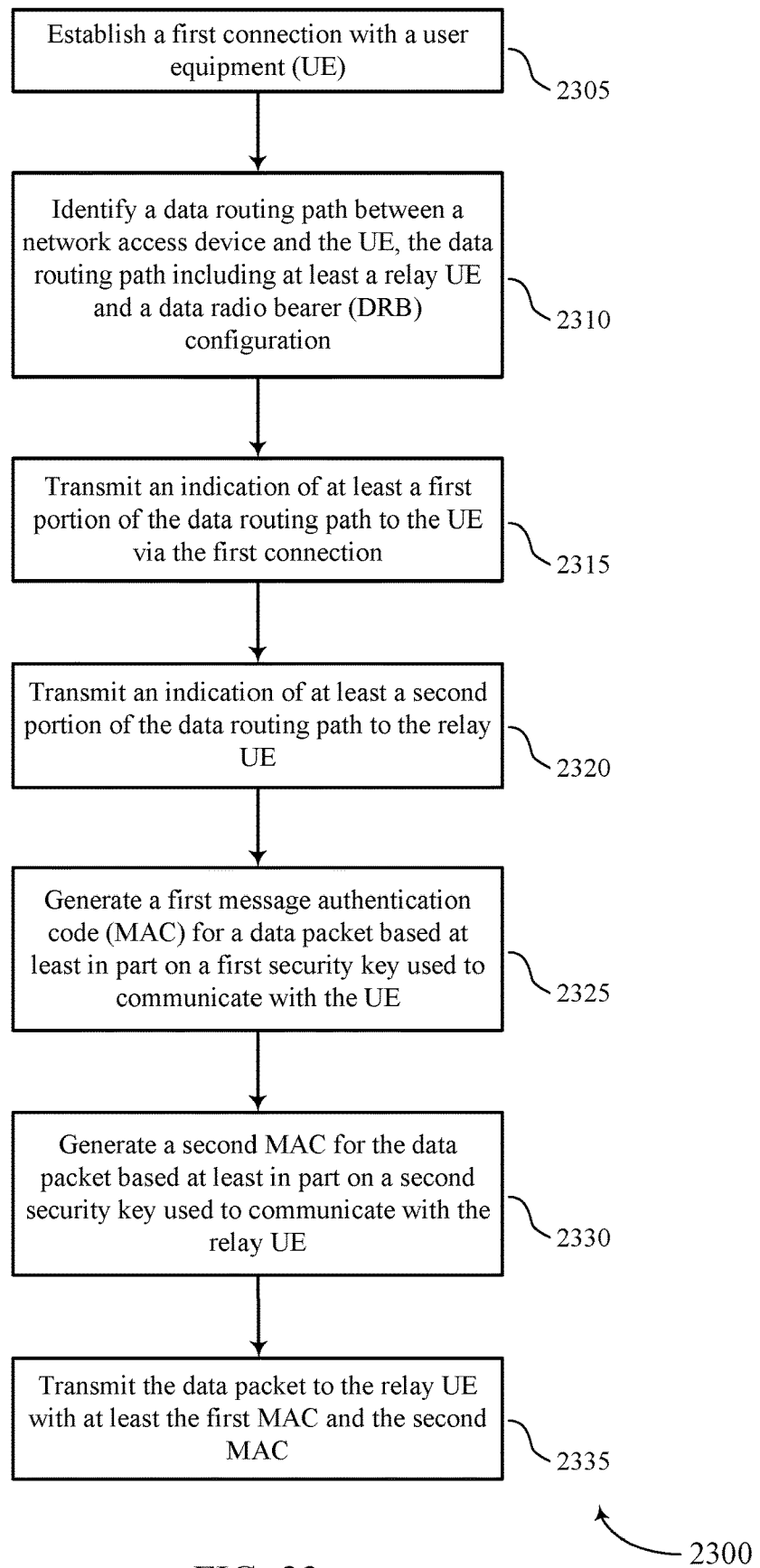
FIG. 23 is a flow chart illustrating an example of a method for wireless communication at a network access device, in accordance with one or more aspects of the present disclosure.

FIG. 23 is a flow chart illustrating an example of a method 2300 for wireless communication at a network access device, in accordance with one or more aspects of the present disclosure. In the method 2300, the network access device operates as a transmitting wireless device and a UE operates as a receiving wireless device. For clarity, the method 2300 is described below with reference to aspects of one or more of the network access devices described with reference to FIGS. 1-6 and 17, aspects of one or more of the apparatuses described with reference to FIGS. 7 and 8, or aspects of one or more of the wireless communication managers described with reference to FIGS. 1, 7, 8, 10, and 17. In some examples, a network access device may execute one or more sets of codes to control the functional elements of the network access device to perform the functions described below. Additionally or alternatively, the network access device may perform one or more of the functions described below using special-purpose hardware.

At block 2305, the method 2300 may include establishing a first connection with the UE, as described for example with reference to FIGS. 2 and 5. In certain examples, the operation(s) at block 2305 may be performed using the UE connection manager described with reference to FIG. 10.

At block 2310, the method 2300 may include identifying a data routing path between the network access device and the UE, as described for example with reference to FIGS. 2 and 5. The data routing path may include at least one relay UE and the DRB configuration. In certain examples, the operation(s) at block 2310 may be performed using the relay connection manager described with reference to FIG. 10.

At block 2315, the method 2300 may include transmitting an indication of at least a first portion of the data routing path to the UE via the first connection, as described for example with reference to FIGS. 2 and 5. In certain examples, the operation(s) at block 2315 may be performed using the relay connection manager described with reference to FIG. 10.

At block 2320, the method 2300 may include transmitting an indication of at least a second portion of the data routing path to the relay UE, as described for example with reference to FIGS. 2 and 5. In certain examples, the operation(s) at block 2320 may be performed using the relay connection manager described with reference to FIG. 10.

At block 2325, the method 2300 may include generating a first MAC for a data packet based at least in part on a first security key used to communicate with the UE, as described for example with reference to FIG. 6. In certain examples, the operation(s) at block 2325 may be performed using the upper MAC generator described with reference to FIGS. 8 and 10.

At block 2330, the method 2300 may include generating a second MAC for the data packet based at least in part on a second security key used to communicate with the relay UE, as described for example with reference to FIG. 6. In certain examples, the operation(s) at block 2330 may be performed using the lower MAC generator described with reference to FIGS. 8 and 10.

At block 2335, the method 2300 may include transmitting the data packet to the relay UE with at least the first MAC and the second MAC, as described for example with reference to FIG. 6. In certain examples, the operation(s) at block 2335 may be performed using the packet transmission manager described with reference to FIGS. 8 and 10. As described above, in some cases, the first MAC and second MAC may have been generated in the same layer (e.g., ePDCP layer).

Figure 24:
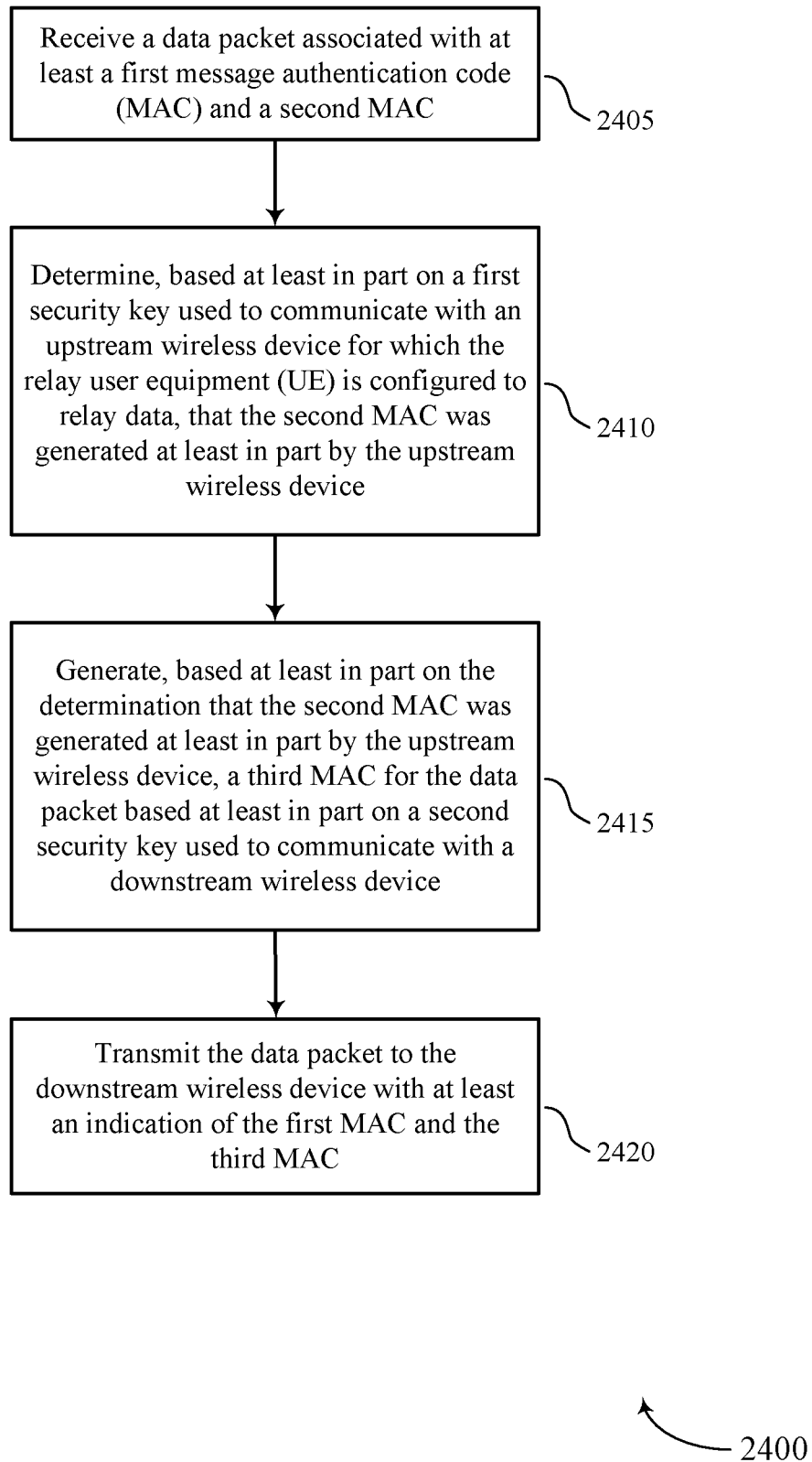
FIG. 24 is a flow chart illustrating an example of a method for wireless communication at a relay UE, in accordance with one or more aspects of the present disclosure.

FIG. 24 is a flow chart illustrating an example of a method 2400 for wireless communication at a relay UE, in accordance with one or more aspects of the present disclosure. For clarity, the method 2400 is described below with reference to aspects of one or more of the relay UEs described with reference to FIGS. 2-6 and 16, aspects of one or more of the apparatuses described with reference to FIGS. 7 and 11, or aspects of one or more of the wireless communication managers described with reference to FIGS. 7, 11, 12, and 16. In some examples, a relay UE may execute one or more sets of codes to control the functional elements of the relay UE to perform the functions described below. Additionally or alternatively, the relay UE may perform one or more of the functions described below using special-purpose hardware.

At block 2405, the method 2400 may include receiving a data packet associated with at least a first MAC and a second MAC, as described for example with reference to FIG. 6. In certain examples, the operation(s) at block 2405 may be performed using the packet reception manager described with reference to FIGS. 11 and 12.

At block 2410, the method 2400 may include determining, based at least in part on a first security key used to communicate with an upstream wireless device for which the relay UE is configured to relay data, that the second MAC was generated at least in part by the upstream wireless device, as described for example with reference to FIG. 6. In certain examples, the operation(s) at block 2410 may be performed using the lower MAC verification manager described with reference to FIGS. 11 and 12. In some cases, the first MAC and second MAC may have been generated in the same layer (e.g., ePDCP layer) of the upstream wireless device.

At block 2415, the method 2400 may include generating, based at least in part on the determination that the second MAC was generated at least in part by the upstream wireless device, a third MAC for the data packet based at least in part on a second security key used to communicate with a downstream wireless device, as described for example with reference to FIG. 6. In certain examples, the operation(s) at block 2415 may be performed using the lower MAC generator described with reference to FIGS. 11 and 12.

At block 2420, the method 2400 may include transmitting the data packet to the downstream wireless device with at least an indication of the first MAC and the third MAC, as described for example with reference to FIG. 6. In some examples, the indication of the first MAC may include the first MAC. In certain examples, the operation(s) at block 2420 may be performed using the packet transmission manager described with reference to FIGS. 11 and 12.

In some examples of the method 2400, the upstream wireless device and the downstream wireless device may be nodes along a data routing path between a UE and a network access device, with the upstream wireless device being the UE (or a second relay UE positioned closer to the UE than the downstream wireless device along the data routing path). In other examples, the upstream wireless device and the downstream wireless device may be nodes along a data routing path between a network access device and a UE, with the upstream wireless device being the network access device (or a second relay UE positioned closer to the network access device than the downstream wireless device along the data routing path).

Figure 25:
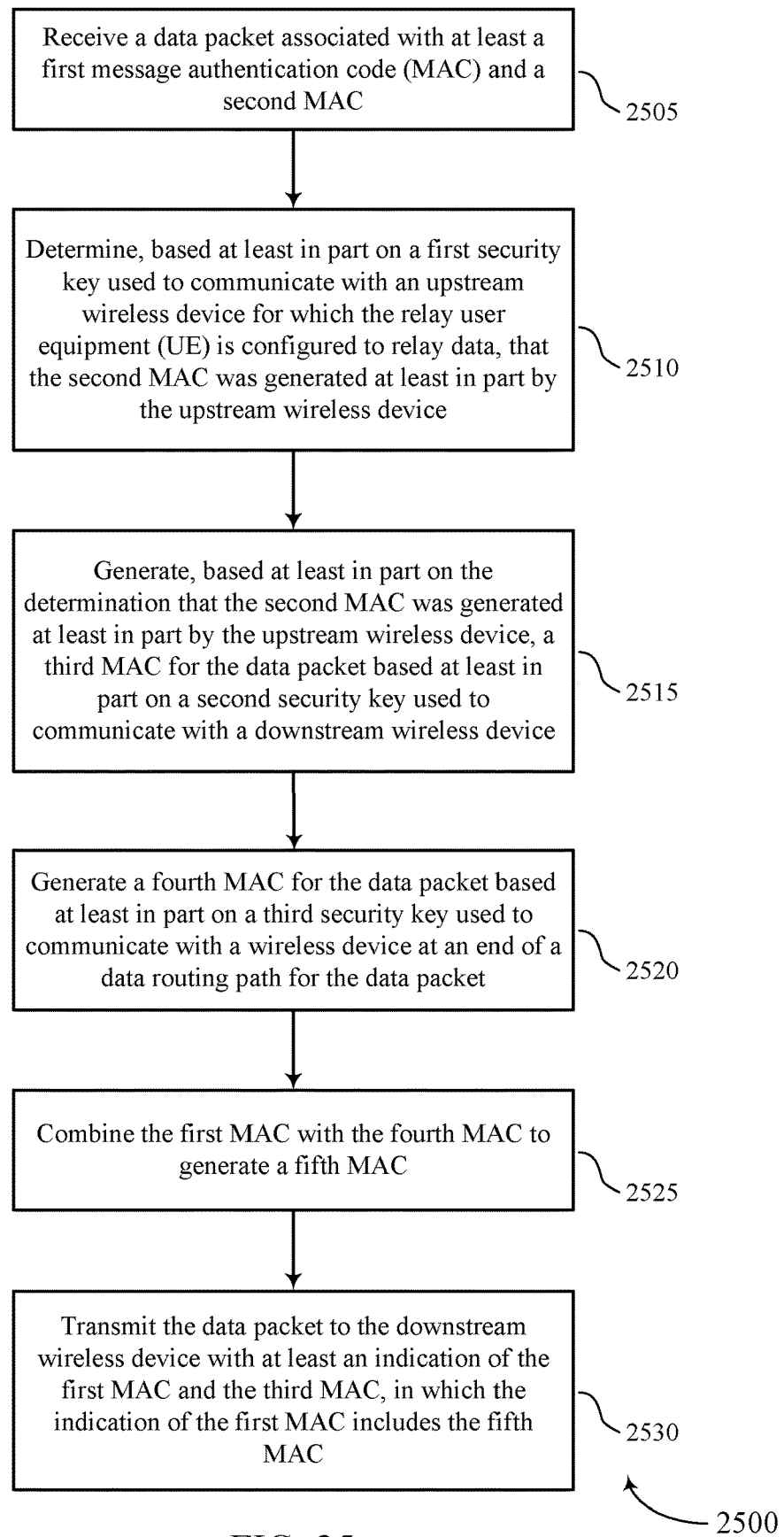
FIG. 25 is a flow chart illustrating an example of a method for wireless communication at a relay UE, in accordance with one or more aspects of the present disclosure.

FIG. 25 is a flow chart illustrating an example of a method 2500 for wireless communication at a relay UE, in accordance with one or more aspects of the present disclosure. For clarity, the method 2500 is described below with reference to aspects of one or more of the relay UEs described with reference to FIGS. 2-6 and 16, aspects of one or more of the apparatuses described with reference to FIGS. 7 and 11, or aspects of one or more of the wireless communication managers described with reference to FIGS. 7, 11, 12, and 16. In some examples, a relay UE may execute one or more sets of codes to control the functional elements of the relay UE to perform the functions described below. Additionally or alternatively, the relay UE may perform one or more of the functions described below using special-purpose hardware.

At block 2505, the method 2500 may include receiving a data packet associated with at least a first MAC and a second MAC, as described for example with reference to FIG. 6. In certain examples, the operation(s) at block 2505 may be performed using the packet reception manager described with reference to FIGS. 11 and 12.

At block 2510, the method 2500 may include determining, based at least in part on a first security key used to communicate with an upstream wireless device for which the relay UE is configured to relay data, that the second MAC was generated at least in part by the upstream wireless device, as described for example with reference to FIG. 6. In certain examples, the operation(s) at block 2510 may be performed using the lower MAC verification manager described with reference to FIGS. 11 and 12.

At block 2515, the method 2500 may include generating, based at least in part on the determination that the second MAC was generated at least in part by the upstream wireless device, a third MAC for the data packet based at least in part on a second security key used to communicate with a downstream wireless device, as described for example with reference to FIG. 6. In certain examples, the operation(s) at block 2515 may be performed using the lower MAC generator described with reference to FIGS. 11 and 12.

At block 2520, the method 2500 may include generating a fourth MAC for the data packet based at least in part on a third security key used to communicate with a wireless device (e.g., a UE or a network access device) at an end (e.g., a receiving end or a transmitting end) of a data routing path for the data packet, as described for example with reference to FIG. 6. For a data packet transmitted from a UE to a network access device via the relay UE, the third security key may be a security key used by the relay UE to communicate with the network access device (i.e., the wireless device at the receiving end of the data routing path). For a data packet transmitted from a network access device to a UE via the relay UE, the third security key may be a security key used by the relay to communicate with the network access device (i.e., the wireless device at the transmitting end of the data routing path), or if provided by the network access device, a security key used by the relay to communicate with the UE (i.e., the wireless device at the receiving end of the data routing path).

In some examples, the fourth MAC may be further generated based at least in part on a combination of a first counter value that was written in an ePDCP header of the data packet by the wireless device at the transmitting end of the data routing path for the data packet, and a flow identifier that was written in the ePDCP header of the data packet by the wireless device at the transmitting end of the data routing path for the data packet. In some examples, the fourth MAC may be further generated based at least in part on a combination of the first counter value and a locally-stored UE identifier associated with a DRB over which the data packet is received or transmitted. In some examples, the fourth MAC may be further generated based at least in part on a locally-stored counter value for MAC generation, and the method 2600 may further include writing the locally-stored counter value to the ePDCP header of the data packet. In certain examples, the operation(s) at block 2520 may be performed using the path MAC generator described with reference to FIG. 12.

At block 2525, the method 2500 may include combining the first MAC with the fourth MAC to generate a fifth MAC, as described for example with reference to FIG. 6. In certain examples, the operation(s) at block 2525 may be performed using the path MAC generator described with reference to FIG. 12.

At block 2530, the method 2500 may include transmitting the data packet to the downstream wireless device with at least an indication of the first MAC and the third MAC, as described for example with reference to FIG. 6. The indication of the first MAC may include the fifth MAC. In certain examples, the operation(s) at block 2530 may be performed using the packet transmission manager described with reference to FIGS. 11 and 12.

In some examples of the method 2500, the upstream wireless device and the downstream wireless device may be nodes along a data routing path between a UE and a network access device, with the upstream wireless device being the UE (or a second relay UE positioned closer to the UE than the downstream wireless device along the data routing path). In other examples, the upstream wireless device and the downstream wireless device may be nodes along a data routing path between a network access device and a UE, with the upstream wireless device being the network access device (or a second relay UE positioned closer to the network access device than the downstream wireless device along the data routing path).

Figure 26:
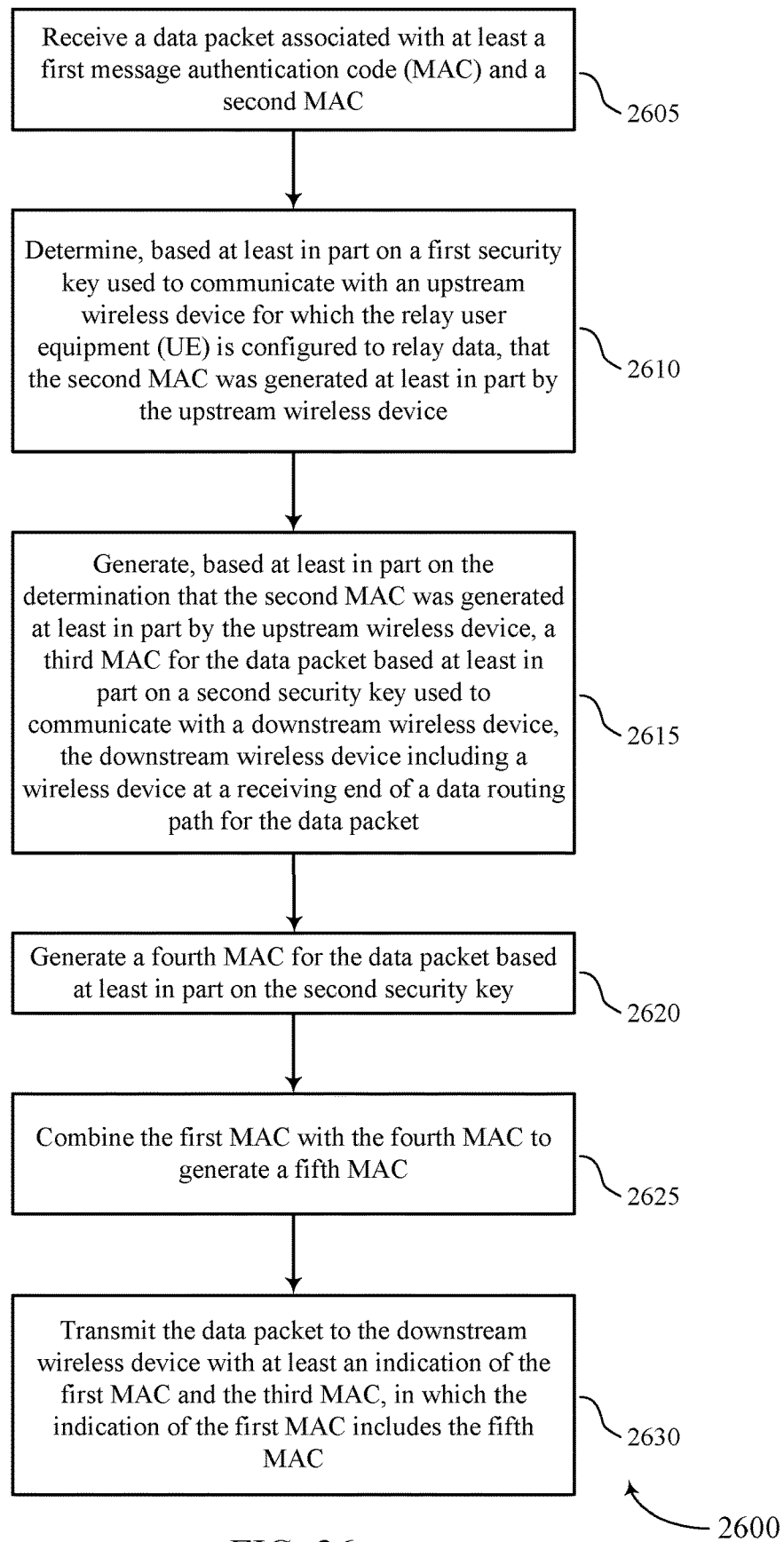
FIG. 26 is a flow chart illustrating an example of a method for wireless communication at a relay UE, in accordance with one or more aspects of the present disclosure.

FIG. 26 is a flow chart illustrating an example of a method 2600 for wireless communication at a relay UE, in accordance with one or more aspects of the present disclosure. For clarity, the method 2600 is described below with reference to aspects of one or more of the relay UEs described with reference to FIGS. 2-6 and 16, aspects of one or more of the apparatuses described with reference to FIGS. 7 and 11, or aspects of one or more of the wireless communication managers described with reference to FIGS. 7, 11, 12, and 16. In some examples, a relay UE may execute one or more sets of codes to control the functional elements of the relay UE to perform the functions described below. Additionally or alternatively, the relay UE may perform one or more of the functions described below using special-purpose hardware.

At block 2605, the method 2600 may include receiving a data packet associated with at least a first MAC and a second MAC, as described for example with reference to FIG. 6. In certain examples, the operation(s) at block 2605 may be performed using the packet reception manager described with reference to FIGS. 11 and 12.

At block 2610, the method 2600 may include determining, based at least in part on a first security key used to communicate with an upstream wireless device for which the relay UE is configured to relay data, that the second MAC was generated at least in part by the upstream wireless device, as described for example with reference to FIG. 6. In certain examples, the operation(s) at block 2610 may be performed using the lower MAC verification manager described with reference to FIGS. 11 and 12.

At block 2615, the method 2600 may include generating, based at least in part on the determination that the second MAC was generated at least in part by the upstream wireless device, a third MAC for the data packet based at least in part on a second security key used to communicate with a downstream wireless device, as described for example with reference to FIG. 6. The downstream wireless device may be a wireless device (e.g., a UE or a network access device) at a receiving end of a data routing path for the data packet. In certain examples, the operation(s) at block 2615 may be performed using the lower MAC generator described with reference to FIGS. 11 and 12.

At block 2620, the method 2600 may include generating a fourth MAC for the data packet based at least in part on the second security key, as described for example with reference to FIG. 6. In some examples, the fourth MAC may be further generated based at least in part on a combination of a first counter value that was written in an ePDCP header of the data packet by the wireless device at the transmitting end of the data routing path for the data packet, and a flow identifier that was written in the ePDCP header of the data packet by the wireless device at the transmitting end of the data routing path for the data packet. In some examples, the fourth MAC may be further generated based at least in part on a combination of the first counter value and a locally-stored UE identifier associated with a DRB over which the data packet is received or transmitted. In some examples, the fourth MAC may be further generated based at least in part on a locally-stored counter value for MAC generation, and the method 2600 may further include writing the locally-stored counter value to the ePDCP header of the data packet. In certain examples, the operation(s) at block 2620 may be performed using the path MAC generator described with reference to FIG. 12.

At block 2625, the method 2600 may include combining the first MAC with the fourth MAC to generate a fifth MAC, as described for example with reference to FIG. 6. In certain examples, the operation(s) at block 2625 may be performed using the path MAC generator described with reference to FIG. 12.

At block 2630, the method 2600 may include transmitting the data packet to the downstream wireless device with at least an indication of the first MAC and the third MAC, as described for example with reference to FIG. 6. The indication of the first MAC may include the fifth MAC. In certain examples, the operation(s) at block 2630 may be performed using the packet transmission manager described with reference to FIGS. 11 and 12.

In some examples of the method 2600, the upstream wireless device and the downstream wireless device may be nodes along a data routing path between a UE and a network access device, with the upstream wireless device being the UE (or a second relay UE positioned closer to the UE than the downstream wireless device along the data routing path). In other examples, the upstream wireless device and the downstream wireless device may be nodes along a data routing path between a network access device and a UE, with the upstream wireless device being the network access device (or a second relay UE positioned closer to the network access device than the downstream wireless device along the data routing path).

Figure 27:
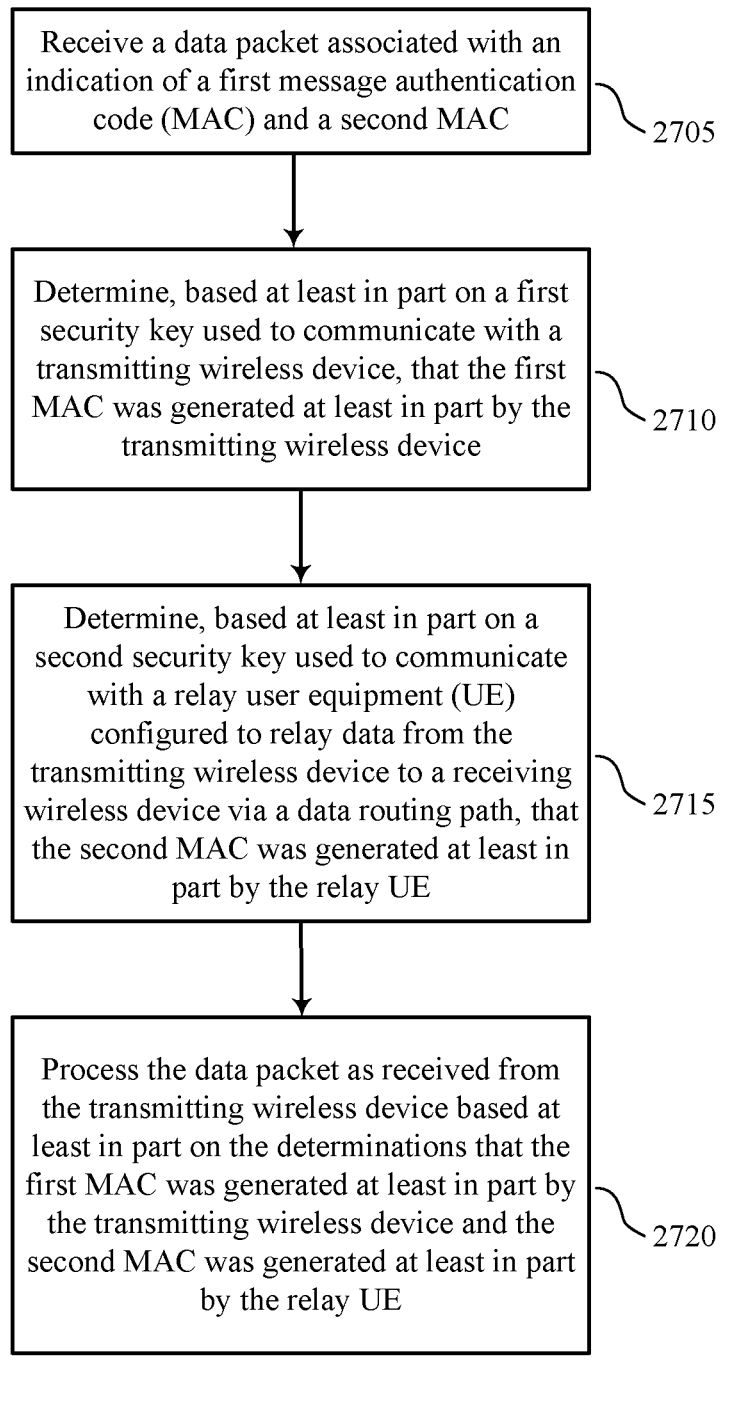
FIG. 27 is a flow chart illustrating an example of a method for wireless communication at a receiving wireless device, in accordance with one or more aspects of the present disclosure.

FIG. 27 is a flow chart illustrating an example of a method 2700 for wireless communication at a receiving wireless device, in accordance with one or more aspects of the present disclosure. For clarity, the method 2700 is described below with reference to aspects of one or more of the UEs described with reference to FIGS. 1-6 and 16, aspects of one or more of the network access devices or MgNBs described with reference to FIGS. 1-6 and 17, aspects of one or more of the apparatuses described with reference to FIGS. 7 and 13, or aspects of one or more of the wireless communication managers described with reference to FIGS. 1, 7, 13, 14, 15, 16, and 17. In some examples, a wireless device may execute one or more sets of codes to control the functional elements of the wireless device to perform the functions described below. Additionally or alternatively, the wireless device may perform one or more of the functions described below using special-purpose hardware.

At block 2705, the method 2700 may include receiving a data packet associated with an indication of a first MAC and a second MAC, as described for example with reference to FIG. 6. In certain examples, the operation(s) at block 2705 may be performed using the packet reception manager described with reference to FIGS. 13-15.

At block 2710, the method 2700 may include determining, based at least in part on a first security key used to communicate with a transmitting wireless device, that the first MAC was generated at least in part by the transmitting wireless device, as described for example with reference to FIG. 6. In certain examples, the operation(s) at block 2710 may be performed using the upper MAC verification manager described with reference to FIGS. 13-15.

At block 2715, the method 2700 may include determining, based at least in part on a second security key used to communicate with a relay UE, that the second MAC was generated at least in part by the relay UE, as described for example with reference to FIG. 6. The relay UE may be configured to relay data from the transmitting wireless device (e.g., a UE or a network access device) to the receiving wireless device via a data routing path. In certain examples, the operation(s) at block 2715 may be performed using the lower MAC verification manager described with reference to FIGS. 13-15.

At block 2720, the method 2700 may include processing the data packet as received from the transmitting wireless device based at least in part on the determinations that the first MAC was generated at least in part by the transmitting wireless device and the second MAC was generated at least in part by the relay UE, as described for example with reference to FIG. 6. In certain examples, the operation(s) at block 2720 may be performed using the packet processing manager described with reference to FIGS. 13-15.

In some examples of the method 2700, the transmitting wireless device may be a UE and the receiving wireless device may be a network access device. In other examples, the transmitting wireless device may be a network access device and the receiving wireless device may be a UE.

Figure 28:
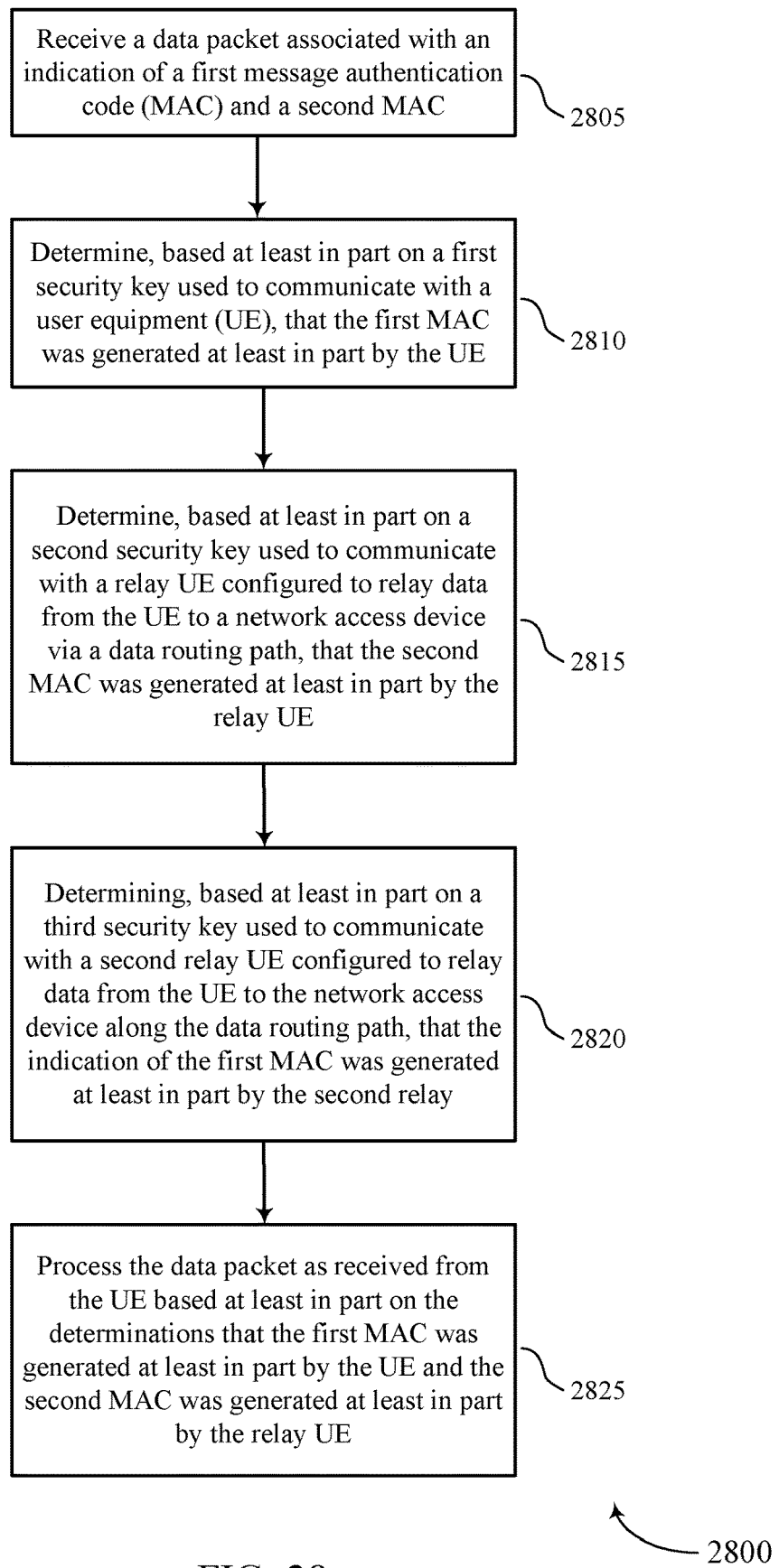
FIG. 28 is a flow chart illustrating an example of a method for wireless communication at a network access device, in accordance with one or more aspects of the present disclosure.

FIG. 28 is a flow chart illustrating an example of a method 2800 for wireless communication at a network access device, in accordance with one or more aspects of the present disclosure. In the method 2800, the UE operates as a transmitting wireless device and a network access device operates as a receiving wireless device. For clarity, the method 2800 is described below with reference to aspects of one or more of the network access devices or MgNBs described with reference to FIGS. 1-6 and 17, aspects of one or more of the apparatuses described with reference to FIGS. 7 and 13, or aspects of one or more of the wireless communication managers described with reference to FIGS. 1, 7, 13, 15, and 17. In some examples, a network access device may execute one or more sets of codes to control the functional elements of the network access device to perform the functions described below. Additionally or alternatively, the network access device may perform one or more of the functions described below using special-purpose hardware.

At block 2805, the method 2800 may include receiving a data packet associated with an indication of a first MAC and a second MAC, as described for example with reference to FIG. 6. In certain examples, the operation(s) at block 2805 may be performed using the packet reception manager described with reference to FIGS. 13 and 15.

At block 2810, the method 2800 may include determining, based at least in part on a first security key used to communicate with the UE, that the first MAC was generated at least in part by the UE, as described for example with reference to FIG. 6. In certain examples, the operation(s) at block 2810 may be performed using the upper MAC verification manager described with reference to FIGS. 13 and 15.

At block 2815, the method 2800 may include determining, based at least in part on a second security key used to communicate with a relay UE, that the second MAC was generated at least in part by the relay UE, as described for example with reference to FIG. 6. The relay UE may be configured to relay data from the UE to the network access device via a data routing path. In certain examples, the operation(s) at block 2815 may be performed using the lower MAC verification manager described with reference to FIGS. 13 and 15.

At block 2820, the method 2800 may include determining, based at least in part on a third security key used to communicate with a second relay UE configured to relay data from the UE to the network access device along the data routing path, that the indication of the first MAC was generated at least in part by the second relay, as described for example with reference to FIG. 6. In some examples, the determination that the indication of the first MAC was generated at least in part by the second relay UE may be further based at least in part on a combination of a first counter value that was written in an ePDCP header of the data packet by the UE, and a flow identifier that was written in the ePDCP header of the data packet by the UE. In other examples, the determination that the indication of the first MAC was generated at least in part by the second relay UE may be further based at least in part on a combination of the first counter value and a locally-stored UE identifier associated with a DRB over which the data packet is received by or transmitted from the second relay UE. In other examples, the determination that the indication of the first MAC was generated at least in part by the second relay UE may be further based at least in part on a second counter value written in the ePDCP header of the data packet by the second relay UE. In certain examples, the operation(s) at block 2820 may be performed using the path MAC verification manager described with reference to FIG. 15.

At block 2825, the method 2800 may include processing the data packet as received from the UE based at least in part on the determinations that the first MAC was generated at least in part by the UE and the second MAC was generated at least in part by the relay UE, as described for example with reference to FIG. 6. In certain examples, the operation(s) at block 2825 may be performed using the packet processing manager described with reference to FIGS. 13 and 15.

Figure 29:
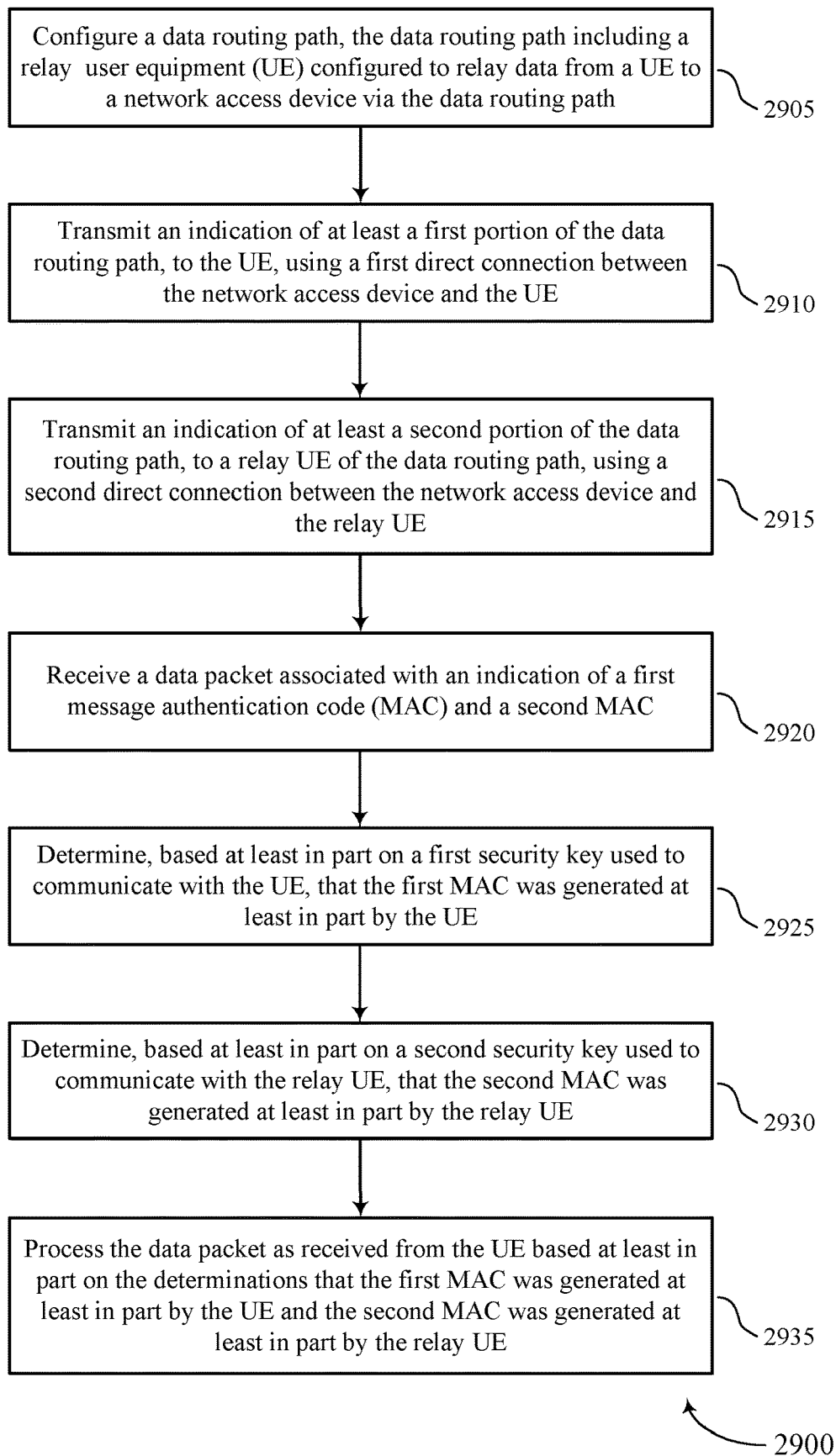
FIG. 29 is a flow chart illustrating an example of a method for wireless communication at a network access device, in accordance with one or more aspects of the present disclosure.

FIG. 29 is a flow chart illustrating an example of a method 2900 for wireless communication at a network access device, in accordance with one or more aspects of the present disclosure. In the method 2900, the UE operates as a transmitting wireless device and a network access device operates as a receiving wireless device. For clarity, the method 2900 is described below with reference to aspects of one or more of the network access devices or MgNBs described with reference to FIGS. 1-6 and 17, aspects of one or more of the apparatuses described with reference to FIGS. 7 and 13, or aspects of one or more of the wireless communication managers described with reference to FIGS. 1, 7, 13, 15, and 17. In some examples, a network access device may execute one or more sets of codes to control the functional elements of the network access device to perform the functions described below. Additionally or alternatively, the network access device may perform one or more of the functions described below using special-purpose hardware.

At block 2905, the method 2900 may include configuring a data routing path, as described for example with reference to FIG. 6. The data routing path may include a relay UE configured to relay data from a UE to a network access device via the data routing path. In certain examples, the operation(s) at block 2905 may be performed using the relay connection manager described with reference to FIGS. 13 and 15.

At block 2910, the method 2900 may include transmitting an indication of at least a first portion of the data routing path, to the UE, using a first direct connection between the network access device and the UE, as described for example with reference to FIG. 6. In certain examples, the operation(s) at block 2910 may be performed using the relay connection manager described with reference to FIGS. 13 and 15.

At block 2915, the method 2900 may include transmitting an indication of at least a second portion of the data routing path, to a relay UE of the data routing path, using a second direct connection between the network access device and the relay UE, as described for example with reference to FIG. 6. In certain examples, the operation(s) at block 2915 may be performed using the relay connection manager described with reference to FIGS. 13 and 15.

At block 2920, the method 2900 may include receiving a data packet associated with an indication of a first MAC and a second MAC, as described for example with reference to FIG. 6. In certain examples, the operation(s) at block 2920 may be performed using the packet reception manager described with reference to FIGS. 13 and 15.

At block 2925, the method 2900 may include determining, based at least in part on a first security key used to communicate with the UE, that the first MAC was generated at least in part by the UE, as described for example with reference to FIG. 6. In certain examples, the operation(s) at block 2925 may be performed using the upper MAC verification manager described with reference to FIGS. 13 and 15.

At block 2930, the method 2900 may include determining, based at least in part on a second security key used to communicate with the relay UE, that the second MAC was generated at least in part by the relay UE, as described for example with reference to FIG. 6. In certain examples, the operation(s) at block 2930 may be performed using the lower MAC verification manager described with reference to FIGS. 13 and 15.

At block 2935, the method 2900 may include processing the data packet as received from the UE based at least in part on the determinations that the first MAC was generated at least in part by the UE and the second MAC was generated at least in part by the relay UE, as described for example with reference to FIG. 6. In certain examples, the operation(s) at block 2935 may be performed using the packet processing manager described with reference to FIGS. 13 and 15.

Figure 30:
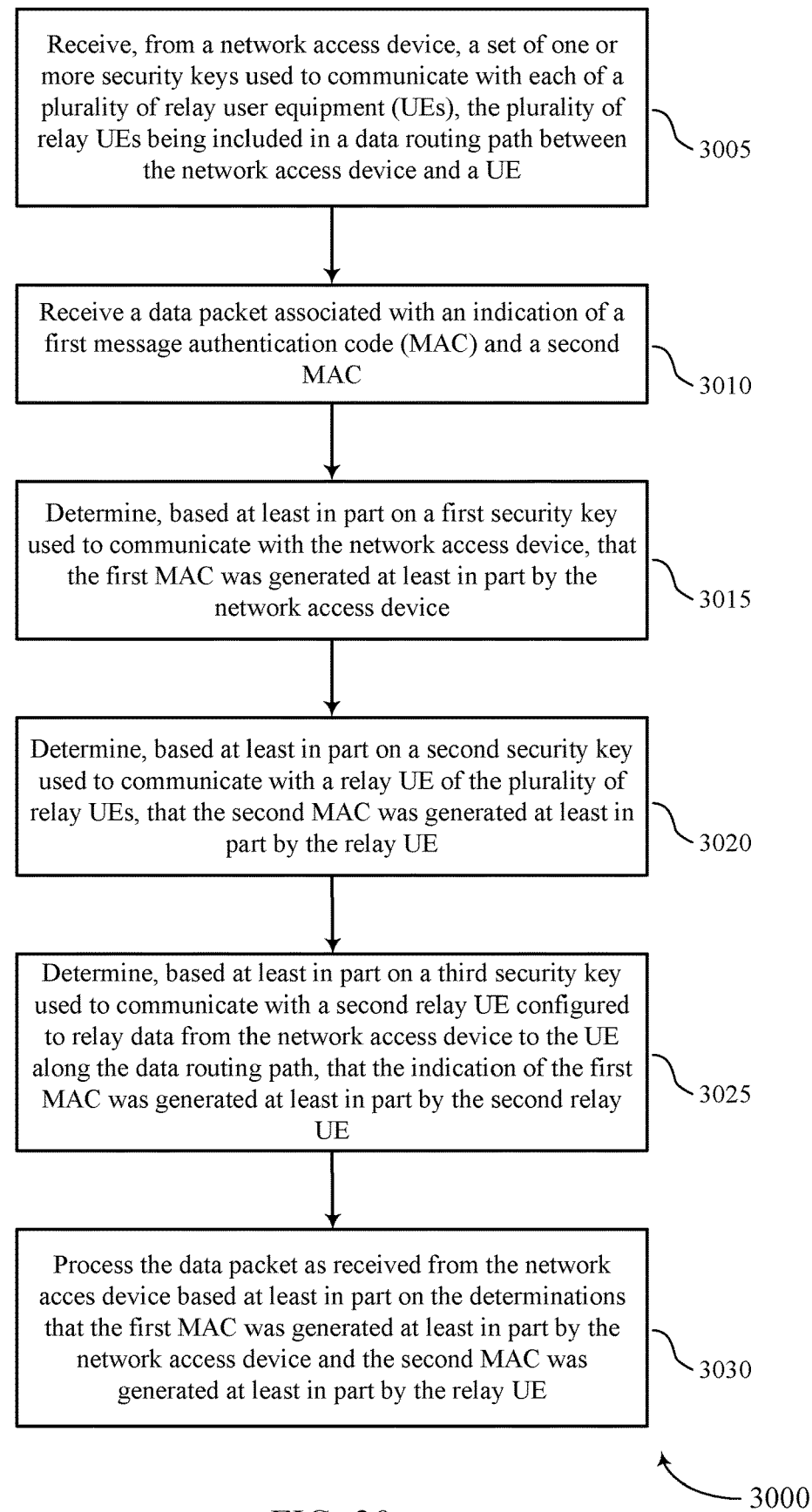
FIG. 30 is a flow chart illustrating an example of a method for wireless communication at a UE, in accordance with one or more aspects of the present disclosure.

FIG. 30 is a flow chart illustrating an example of a method 3000 for wireless communication at a UE, in accordance with one or more aspects of the present disclosure. In the method 3000, the network access device operates as a transmitting wireless device and a UE operates as a receiving wireless device. For clarity, the method 3000 is described below with reference to aspects of one or more of the UEs described with reference to FIGS. 1-6 and 16, aspects of one or more of the apparatuses described with reference to FIGS. 7 and 13, or aspects of one or more of the wireless communication managers described with reference to FIGS. 1, 7, 13, 14, and 17. In some examples, a UE may execute one or more sets of codes to control the functional elements of the UE to perform the functions described below. Additionally or alternatively, the UE may perform one or more of the functions described below using special-purpose hardware.

At block 3005, the method 3000 may include receiving, from the network access device, a set of one or more security keys used to communicate with each of a plurality of relay UEs, as described for example with reference to FIG. 6. The plurality of relay UEs may be included in a data routing path between the network access device and the UE. In certain examples, the operation(s) at block 3005 may be performed using the security key transmitter described with reference to FIG. 14.

At block 3010, the method 3000 may include receiving a data packet associated with an indication of a first MAC and a second MAC, as described for example with reference to FIG. 6. In certain examples, the operation(s) at block 3010 may be performed using the packet reception manager described with reference to FIGS. 13 and 14.

At block 3015, the method 3000 may include determining, based at least in part on a first security key used to communicate with the network access device, that the first MAC was generated at least in part by the network access device, as described for example with reference to FIG. 6. In certain examples, the operation(s) at block 3015 may be performed using the upper MAC verification manager described with reference to FIGS. 13 and 14.

At block 3020, the method 3000 may include determining, based at least in part on a second security key used to communicate with a relay UE of the plurality of relay UEs, that the second MAC was generated at least in part by the relay UE, as described for example with reference to FIG. 6. In certain examples, the operation(s) at block 3020 may be performed using the lower MAC verification manager described with reference to FIGS. 13 and 14.

At block 3025, the method 3000 may include determining, based at least in part on a third security key used to communicate with a second relay UE configured to relay data from the network access device to the UE along the data routing path, that the indication of the first MAC was generated at least in part by the second relay UE, as described for example with reference to FIG. 6. In some examples, the determination that the indication of the first MAC was generated at least in part by the second relay UE may be further based at least in part on a combination of a first counter value that was written in an ePDCP header of the data packet by the UE, and a flow identifier that was written in the ePDCP header of the data packet by the UE. In other examples, the determination that the indication of the first MAC was generated at least in part by the second relay UE may be further based at least in part on a combination of the first counter value and a locally-stored UE identifier associated with a DRB over which the data packet is received by or transmitted from the second relay UE. In other examples, the determination that the indication of the first MAC was generated at least in part by the second relay UE may be further based at least in part on a second counter value written in the ePDCP header of the data packet by the second relay UE. In certain examples, the operation(s) at block 3025 may be performed using the path MAC verification manager described with reference to FIGS. 13 and 14.

At block 3030, the method 3000 may include processing the data packet as received from the network access device based at least in part on the determinations that the first MAC was generated at least in part by the network access device and the second MAC was generated at least in part by the relay UE, as described for example with reference to FIG. 6. In certain examples, the operation(s) at block 3030 may be performed using the packet processing manager described with reference to FIGS. 13 and 14.

Figure 31:
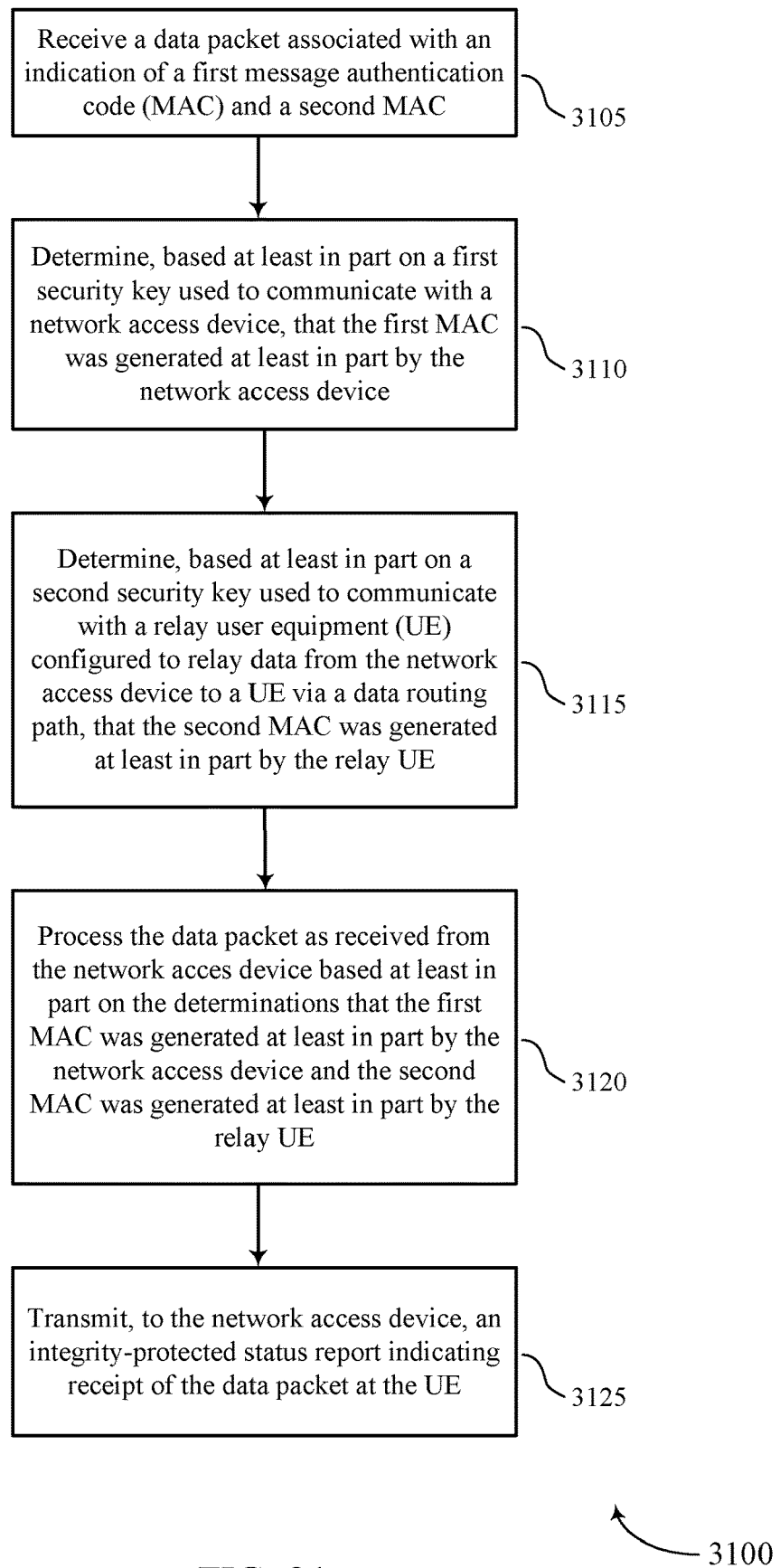
FIG. 31 is a flow chart illustrating an example of a method for wireless communication at a UE, in accordance with one or more aspects of the present disclosure.

FIG. 31 is a flow chart illustrating an example of a method 3100 for wireless communication at a UE, in accordance with one or more aspects of the present disclosure. In the method 3100, the network access device operates as a transmitting wireless device and a UE operates as a receiving wireless device. For clarity, the method 3100 is described below with reference to aspects of one or more of the UEs described with reference to FIGS. 1-6 and 16, aspects of one or more of the apparatuses described with reference to FIGS. 7 and 13, or aspects of one or more of the wireless communication managers described with reference to FIGS. 1, 7, 13, 14, and 17. In some examples, a UE may execute one or more sets of codes to control the functional elements of the UE to perform the functions described below. Additionally or alternatively, the UE may perform one or more of the functions described below using special-purpose hardware.

At block 3105, the method 3100 may include receiving a data packet associated with an indication of a first MAC and a second MAC, as described for example with reference to FIG. 6. In certain examples, the operation(s) at block 3105 may be performed using the packet reception manager described with reference to FIGS. 13 and 14.

At block 3110, the method 3100 may include determining, based at least in part on a first security key used to communicate with the network access device, that the first MAC was generated at least in part by the network access device, as described for example with reference to FIG. 6. In certain examples, the operation(s) at block 3110 may be performed using the upper MAC verification manager described with reference to FIGS. 13 and 14.

At block 3115, the method 3100 may include determining, based at least in part on a second security key used to communicate with a relay UE, that the second MAC was generated at least in part by the relay UE, as described for example with reference to FIG. 6. The relay UE may be configured to relay data from the network access device to the UE via a data routing path. In certain examples, the operation(s) at block 3115 may be performed using the lower MAC verification manager described with reference to FIGS. 13 and 14.

At block 3120, the method 3100 may include processing the data packet as received from the network access device based at least in part on the determinations that the first MAC was generated at least in part by the network access device and the second MAC was generated at least in part by the relay UE, as described for example with reference to FIG. 6. In certain examples, the operation(s) at block 3120 may be performed using the packet processing manager described with reference to FIGS. 13 and 14.

At block 3125, the method 3100 may include transmitting, to the network access device, an integrity-protected status report indicating receipt of the data packet at the UE, as described for example with reference to FIG. 6. In certain examples, the operation(s) at block 3125 may be performed using the status report transmission manager described with reference to FIG. 14.

Figure 32:
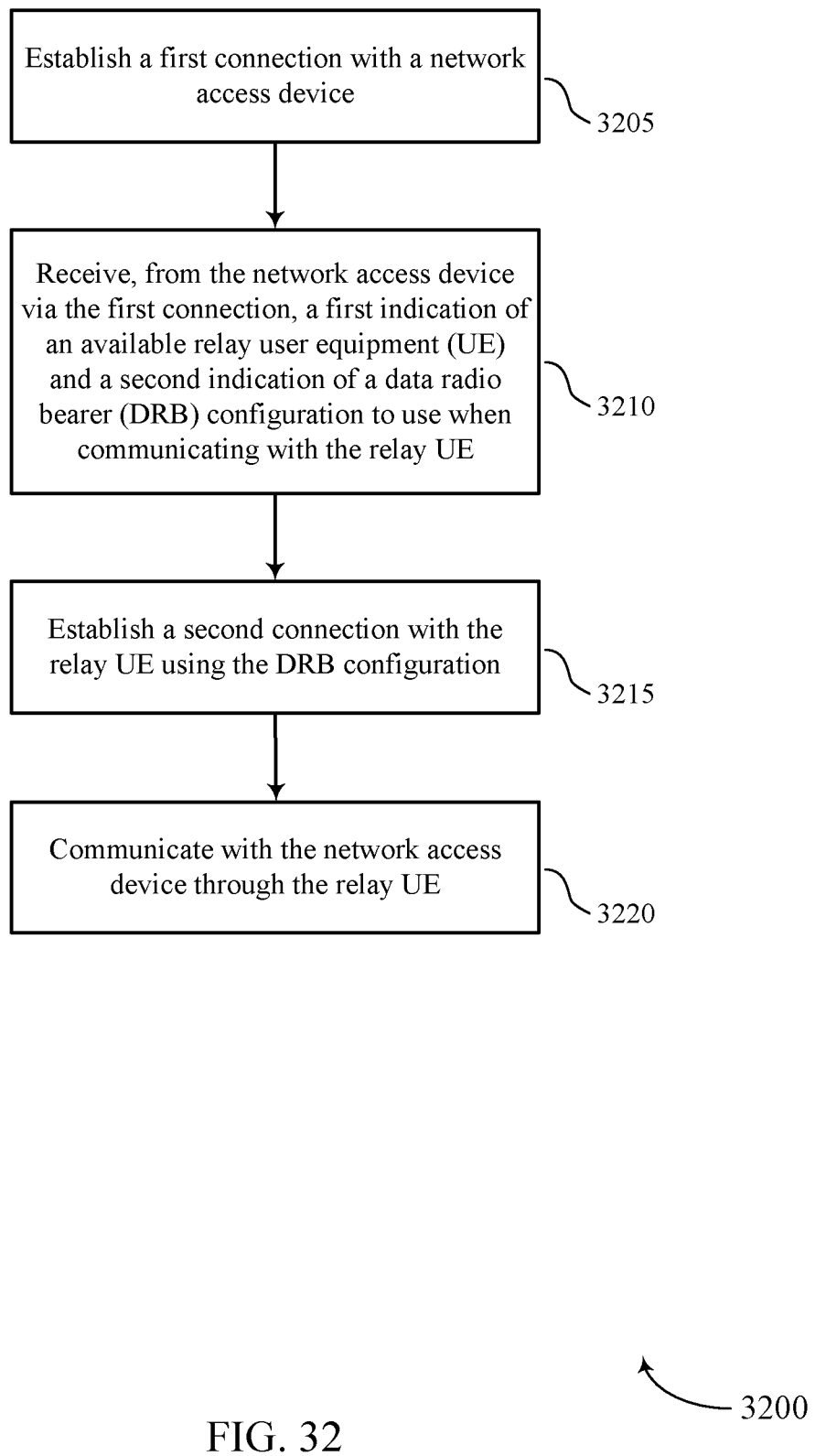
FIG. 32 is a flow chart illustrating an example of a method for wireless communication at a UE, in accordance with one or more aspects of the present disclosure.

FIG. 32 is a flow chart illustrating an example of a method 3200 for wireless communication at a UE, in accordance with one or more aspects of the present disclosure. For clarity, the method 3200 is described below with reference to aspects of one or more of the UEs described with reference to FIGS. 1-6 and 16. In some examples, a UE may execute one or more sets of codes to control the functional elements of the UE to perform the functions described below. Additionally or alternatively, the UE may perform one or more of the functions described below using special-purpose hardware.

At block 3205, the method 3200 may include establishing a first connection with a network access device, as described for example with reference to FIGS. 2 and 5. In certain examples, the operation(s) at block 3205 may be performed using the network connection manager described with reference to FIG. 9.

At block 3210, the method 3200 may include receiving, from the network access device via the first connection, a first indication of an available relay UE and a second indication of a DRB configuration to use when communicating with the relay UE, as described for example with reference to FIGS. 2 and 5. In certain examples, the operation(s) at block 3210 may be performed using the relay connection manager described with reference to FIG. 9.

At block 3215, the method 3200 may include establishing a second connection with the relay UE using the DRB configuration, as described for example with reference to FIGS. 2 and 5. In certain examples, the operation(s) at block 3215 may be performed using the relay connection manager described with reference to FIG. 9.

At block 3220, the method 3200 may include communicating with the network access device through the relay UE, as described for example with reference to FIGS. 2 and 5.

Figure 33:
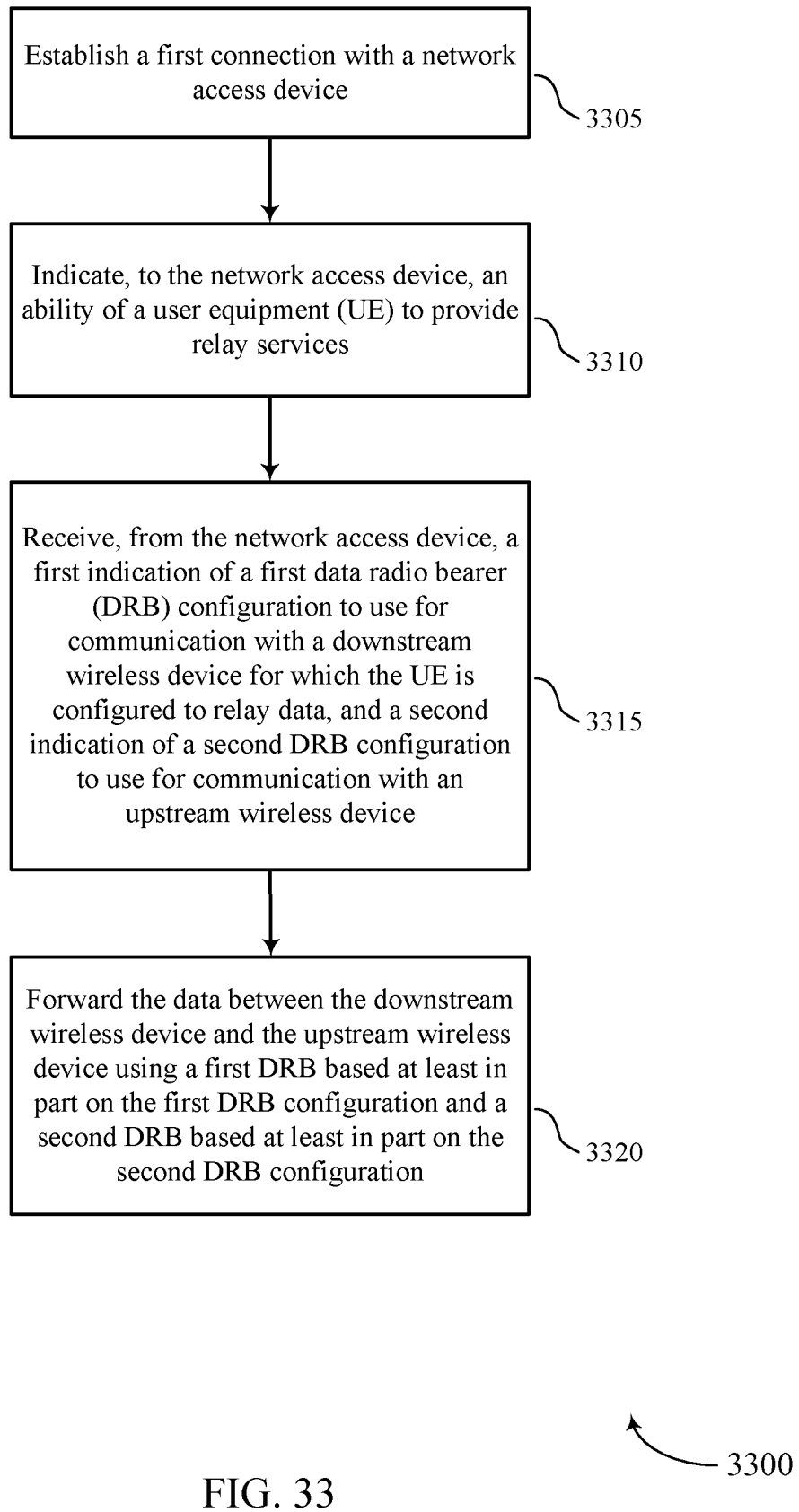
FIG. 33 is a flow chart illustrating an example of a method for wireless communication at a relay UE, in accordance with one or more aspects of the present disclosure.

FIG. 33 is a flow chart illustrating an example of a method 3300 for wireless communication at a UE, in accordance with one or more aspects of the present disclosure. For clarity, the method 3300 is described below with reference to aspects of one or more of the relay UEs described with reference to FIGS. 2-6 and 16. In some examples, a relay UE may execute one or more sets of codes to control the functional elements of the relay UE to perform the functions described below. Additionally or alternatively, the relay UE may perform one or more of the functions described below using special-purpose hardware.

At block 3305, the method 3300 may include establishing a first connection with a network access device, as described for example with reference to FIGS. 2 and 5.

At block 3310, the method 3300 may include indicating, to the network access device, an ability of the UE to provide relay services, as described for example with reference to FIGS. 2 and 5.

At block 3315, the method 3300 may include receiving, from the network access device, a first indication of a first DRB configuration to use for communication with a downstream wireless device for which the UE is configured to relay data, and a second indication of a second DRB configuration to use for communication with an upstream wireless device, as described for example with reference to FIGS. 2 and 5.

At block 3320, the method 3300 may include forwarding the data between the downstream wireless device and the upstream wireless device using a first DRB based at least in part on the first DRB configuration and a second DRB based at least in part on the second DRB configuration, as described for example with reference to FIGS. 2 and 5.

Figure 34:
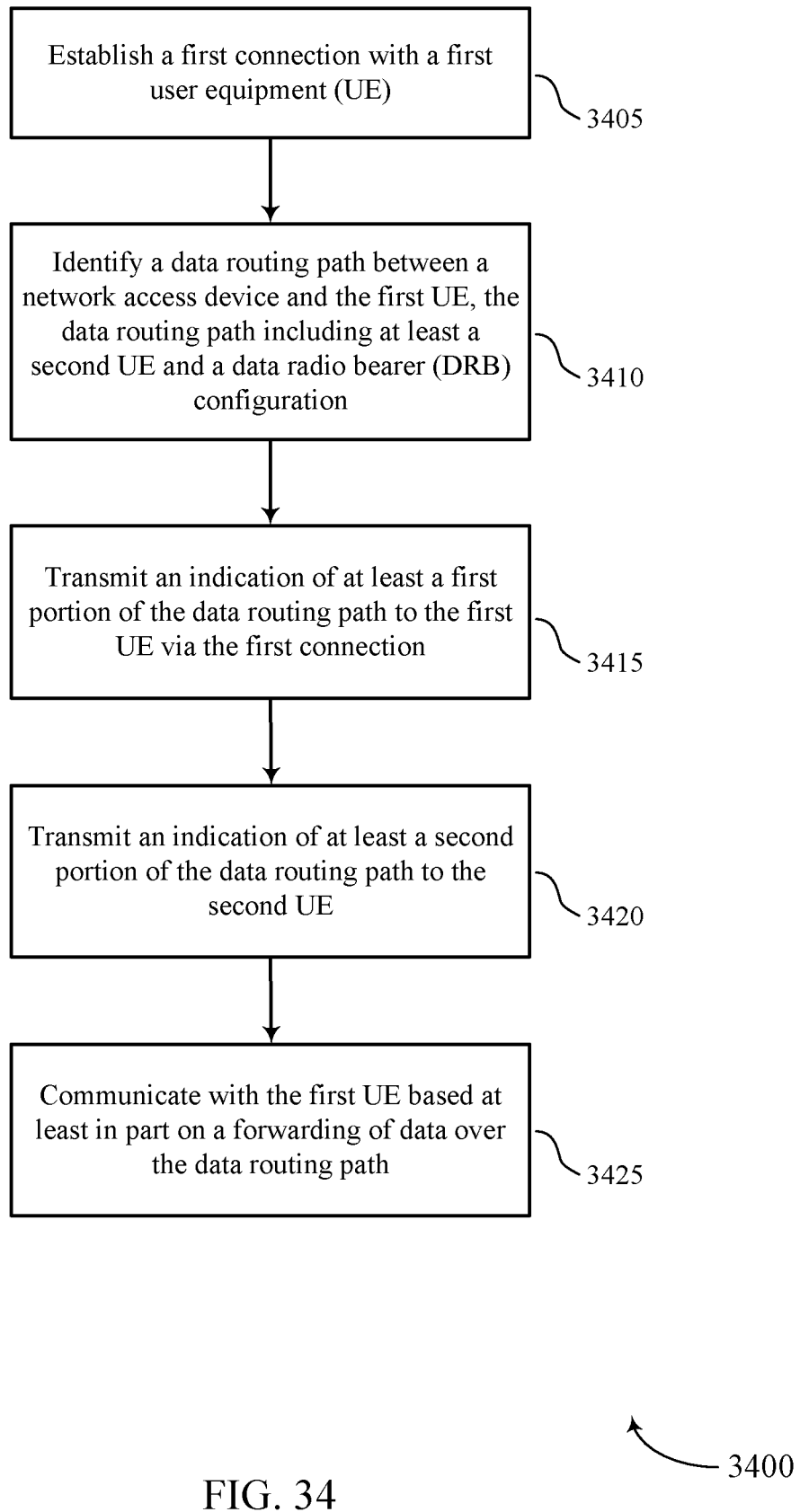
FIG. 34 is a flow chart illustrating an example of a method for wireless communication at a network access device (e.g., a MgNB), in accordance with one or more aspects of the present disclosure.

FIG. 34 is a flow chart illustrating an example of a method 3400 for wireless communication at a network access device (e.g., a MgNB), in accordance with one or more aspects of the present disclosure. For clarity, the method 3400 is described below with reference to aspects of one or more of the network access devices or MgNBs described with reference to FIGS. 1-6 and 17. In some examples, a network access device may execute one or more sets of codes to control the functional elements of the network access device to perform the functions described below. Additionally or alternatively, the network access device may perform one or more of the functions described below using special-purpose hardware.

At block 3405, the method 3400 may include establishing a first connection with a first UE, as described for example with reference to FIGS. 2 and 5. In certain examples, the operation(s) at block 3405 may be performed using the UE connection manager described with reference to FIG. 10.

At block 3410, the method 3400 may include identifying a data routing path between the network access device and the first UE, as described for example with reference to FIGS. 2 and 5. The data routing path may include at least a second UE and a DRB configuration. In certain examples, the operation(s) at block 3410 may be performed using the relay connection manager described with reference to FIG. 10.

At block 3415, the method 3400 may include transmitting an indication of at least a first portion of the data routing path to the first UE via the first connection, as described for example with reference to FIGS. 2 and 5. In certain examples, the operation(s) at block 3415 may be performed using the relay connection manager described with reference to FIG. 10.

At block 3420, the method 3400 may include transmitting an indication of at least a second portion of the data routing path to the second UE, as described for example with reference to FIGS. 2 and 5. In certain examples, the operation(s) at block 3420 may be performed using the relay connection manager described with reference to FIG. 10.

At block 3425, the method 3400 may include communicating with the first UE based at least in part on a forwarding of data over the data routing path, as described for example with reference to FIGS. 2 and 5.

The methods 1800, 1900, 2000, 2100, 2200, 2300, 2400, 2500, 2600, 2700, 2800, 2900, 3000, 3100, 3200, 3300, and 3400 described with reference to FIGS. 18-34 may provide for wireless communication. It should be noted that the methods described in FIGS. 18-34 are example implementations of some of the techniques described in the present disclosure, and the operations of the methods may be rearranged, combined with other operations of the same or different method(s), or otherwise modified, such that other implementations are possible. Operations may also be added to the methods.

In some examples of the method, apparatus, and computer-readable medium described above, the transmitting wireless device may include a UE and the receiving wireless device may include a network access device. Some examples of the method, apparatus, and computer-readable medium described above may further include processes, features, means, instructions, or code for establishing a connection with the network access device; receiving, from the network access device via the connection, a first indication of the relay UE and a second indication of a data radio bearer (DRB) configuration to use when communicating with the relay UE; and establishing a connection with the relay UE using the DRB configuration.

In some examples of the method, apparatus, and computer-readable medium described above, the transmitting wireless device may include a network access device and the receiving wireless device may include a UE. In some examples, the data packet may be transmitted from the network access device to the UE via the data routing path; the data routing path may include a plurality of relay UEs including the relay UE; and the method, apparatus, and computer-readable medium described above may further include processes, features, means, instructions, or code for transmitting, to the UE, a set of one or more security keys used to communicate with each of the plurality of relay UEs. In some examples, the data packet may be transmitted from the network access device to the UE via the data routing path; the data routing path may include a plurality of relay UEs including the relay UE; and the method, apparatus, and computer-readable medium described above may further include processes, features, means, instructions, or code for transmitting, to each relay UE of the plurality of relay UEs, a respective security key used to communicate with the network access device; and generating a plurality of MACs for the data packet, for the plurality of relay UEs, based on the respective security keys used to communicate with the network access device. In these examples, the first MAC may be further generated based at least in part on the plurality of MACs generated for the plurality of relay UEs. Some examples of the method, apparatus, and computer-readable medium described above may further include processes, features, means, instructions, or code for receiving, from the UE, an integrity-protected status report indicating receipt of the data packet at the UE. Some examples of the method, apparatus, and computer-readable medium described above may further include processes, features, means, instructions, or code for establishing a first connection with the UE; identifying the data routing path between the network access device and the UE, the data routing path including at least the relay UE and the DRB configuration; transmitting an indication of at least a first portion of the data routing path to the UE via the first connection; and transmitting an indication of at least a second portion of the data routing path to the relay UE.

In some examples of the method, apparatus, and computer-readable medium described above, the indication of the first MAC may include the first MAC.

Some examples of the method, apparatus, and computer-readable medium described above may further include processes, features, means, instructions, or code for generating a fourth MAC for the data packet based at least in part on a third security key used to communicate with a wireless device at an end of a data routing path for the data packet; and combining the first MAC with the fourth MAC to generate a fifth MAC. In these examples, the indication of the first MAC may include the fifth MAC. In some examples, the wireless device at the end of the data routing path may include a UE or a network access device. In some examples, the fourth MAC may be further generated based at least in part on a combination of a first counter value that was written in a header of the data packet by the wireless device at a transmitting end of the data routing path for the data packet, and a flow identifier that was written in the header of the data packet by the wireless device at the transmitting end of the data routing path for the data packet; or a combination of the first counter value and a locally-stored UE identifier associated with a DRB over which the data packet is received or transmitted. In some cases, the header may be an enhanced Packet Data Convergence Protocol (ePDCP) header, a security header, a L2 header. In some examples, the fourth MAC may be further generated based at least in part on a locally-stored counter value for MAC generation, and the method, apparatus, and computer-readable medium described above may further include processes, features, means, instructions, or code for writing the locally-stored counter value to an ePDCP header of the data packet.

In some examples of the method, apparatus, and computer-readable medium described above, the downstream wireless device may include a wireless device at a receiving end of a data routing path for the data packet, and the method, apparatus, and computer-readable medium described above may further include processes, features, means, instructions, or code for generating a fourth MAC for the data packet based at least in part on the second security key; and combining the first MAC with the fourth MAC to generate a fifth MAC. In these examples, the indication of the first MAC may include the fifth MAC. In some examples, the wireless device at the receiving end of the data routing path may include a UE or a network access device. In some examples, the fourth MAC may be further generated based at least in part on a combination of a first counter value that was written in a header of the data packet by the wireless device at a transmitting end of the data routing path for the data packet, and a flow identifier that was written in the header of the data packet by the wireless device at the transmitting end of the data routing path for the data packet; or a combination of the first counter value and a locally-stored UE identifier associated with a DRB over which the data packet is received or transmitted. In some examples, the fourth MAC may be further generated based at least in part on a locally-stored counter value for MAC generation, and the method, apparatus, and computer-readable medium described above may further include processes, features, means, instructions, or code for writing the locally-stored counter value to an ePDCP header of the data packet.

In some examples of the method, apparatus, and computer-readable medium described above, the upstream wireless device and the downstream wireless device may be nodes along a data routing path between a UE and a network access device, with the upstream wireless device including the UE, or a second relay UE positioned closer to the UE than the downstream wireless device along the data routing path.

In some examples of the method, apparatus, and computer-readable medium described above, the upstream wireless device and the downstream wireless device may be nodes along a data routing path between a network access device and a UE, with the upstream wireless device including the network access device, or a second relay UE positioned closer to the network access device than the downstream wireless device along the data routing path.

In some examples of the method, apparatus, and computer-readable medium described above, the transmitting wireless device may include a UE and the receiving wireless device may include a network access device. Some examples of the method, apparatus, and computer-readable medium described above may further include processes, features, means, instructions, or code for determining, based at least in part on a third security key used to communicate with a second relay UE configured to relay data from the transmitting wireless device to the receiving wireless device along the data routing path, that the indication of the first MAC was generated at least in part by the second relay UE. In some examples, the determination that the indication of the first MAC was generated at least in part by the second relay UE may be further based at least in part on a combination of a first counter value that was written in a header of the data packet by the UE, and a flow identifier that was written in the header of the data packet by the UE; a combination of the first counter value and a locally-stored UE identifier associated with a DRB over which the data packet is received by or transmitted from the second relay UE; or a second counter value written in the header of the data packet by the second relay UE. Some examples of the method, apparatus, and computer-readable medium described above may further include processes, features, means, instructions, or code for configuring the data routing path. Some examples of the method, apparatus, and computer-readable medium described above may further include processes, features, means, instructions, or code for transmitting an indication of at least a first portion of the data routing path, to the transmitting wireless device, using a first direct connection between the receiving wireless device and the transmitting wireless device; and transmitting an indication of at least a second portion of the data routing path, to the relay UE, using a second direct connection between the receiving wireless device and the relay UE.

In some examples of the method, apparatus, and computer-readable medium described above, the transmitting wireless device may include a network access device and the receiving wireless device may include a UE. In some examples, the data routing path may include a plurality of relay UEs, the plurality of relay UEs may include the relay UE, and the method, apparatus, and computer-readable medium described above may further include processes, features, means, instructions, or code for receiving, from the network access device, a set of one or more security keys used to communicate with each of the plurality of relay UEs. Some examples of the method, apparatus, and computer-readable medium described above may further include processes, features, means, instructions, or code for determining, based at least in part on a third security key used to communicate with a second relay UE configured to relay data from the transmitting wireless device to the receiving wireless device along the data routing path, that the indication of the first MAC was generated at least in part by the second relay UE. In some examples, the determination that the indication of the first MAC was generated at least in part by the second relay UE may be further based at least in part on a combination of a first counter value that was written in a header of the data packet by the network access device and a flow identifier that was written in the header of the data packet by the network access device, a combination of the first counter value and a locally-stored UE identifier associated with a DRB over which the data packet is received by or transmitted from the second relay UE, or a second counter value written in the header of the data packet by the second relay UE. Some examples of the method, apparatus, and computer-readable medium described above may further include processes, features, means, instructions, or code for transmitting, to the network access device, an integrity-protected status report indicating receipt of the data packet at the UE.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1×, 1×, etc. IS-856 (TIA-856) may be referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communication, comprising, at a wireless device: receiving, a data packet from a relay user equipment (UE) configured to relay data from a first UE to the wireless device via a first data routing path, the data packet associated with a first message authentication code and a second message authentication code, wherein the relay UE is configured to relay data from the wireless device to the first UE; determining, based at least in part on a first security key used to communicate with the first UE, that the first message authentication code was generated at least in part by the first UE; determining, based at least in part on a second security key used to communicate with the relay UE, that the second message authentication code was generated at least in part by the relay UE; and processing, the data packet based at least in part on the determinations that the first message authentication code was generated at least in part by the first UE and the second message authentication code was generated at least in part by the relay UE; and the transmission between the wireless device and the relay UE, an indication of at least a second portion of the data using a second data routing path, wherein the first data muting path and the second data routing path are different.

2. The method of claim 1, wherein the wireless device comprises a network access device.

3. The method of claim 2, further comprising, at the wireless device:
    determining, based at least in part on a third security key used to communicate with a second relay UE, that the first message authentication code was generated at least in part by the second relay UE, the second relay UE configured to relay data from the first UE to the wireless device along the data routing path.

4. The method of claim 3, wherein the determination that the first message authentication code was generated at least in part by the second relay UE is further based at least in part on: a combination of a first counter value written in a header of the data packet by the first UE, and a flow identifier written in the header of the data packet by the first UE; a combination of the first counter value and a locally-stored identifier at the second relay UE associated with a data radio bearer (DRB) over which the data packet is received by or transmitted from the second relay UE; a second counter value written in the header of the data packet by the second relay UE; or some combination thereof.

5. The method of claim 4, wherein the header is an enhanced Packet Data Convergence Protocol (ePDCP) header, a security header, or a Layer 2 (L2) header.

6. The method of claim 2, further comprising, at the wireless device: configuring the data routing path; transmitting, to the first UE, an indication of at least a first portion of the data routing path using a first direct connection between the wireless device and the first UE.

7. The method of claim 1, wherein the data routing path comprises a plurality of relay UEs including the relay UE, the method further comprising, at the wireless device:
    transmitting a set of one or more security keys used to communicate with each of the plurality of relay UEs.

8. The method of claim 7, further comprising, at the wireless device:
    determining, based at least in part on a third security key used to communicate with a second relay UE configured to relay data from the wireless device to the first UE along the data routing path, that the first message authentication code was generated at least in part by the second relay UE.

9. The method of claim 8, wherein the determination that the first message authentication code was generated at least in part by the second relay UE is further based at least in part on: a combination of a first counter value written in an enhanced Packet Data Convergence Protocol (ePDCP) header of the data packet and a flow identifier written in the ePDCP header of the data packet, a combination of the first counter value and a locally-stored identifier at the second relay UE associated with a data radio bearer (DRB) over which the data packet is received by or transmitted from the second relay UE, a second counter value written in the ePDCP header of the data packet by the second relay UE; or some combination thereof.

10. The method of claim 1, further comprising, at the wireless device:
receiving an integrity-protected status report indicating receipt of the data packet at the first UE.

11. A wireless device comprising: a transceiver, a processor coupled with the transceiver; and memory coupled with the processor; wherein the processor and the memory are configured to: receive, via the transceiver, a data packet from a relay user equipment (UE) configured to relay data from a first UE to the wireless device via a data routing path, the data packet associated with a first message authentication code and a second message authentication code, wherein the relay UE is configured to relay data from the wireless device to the first UE; determine, based at least in part on a first security key used to communicate with the first UE, that the first message authentication code was generated at least in part by the first UE; determine, based at least in part on a second security key used to communicate with the relay UE, that the second message authentication code was generated at least in part by the relay UE; and process, the data packet based at least in part on the determinations that the first message authentication code was generated at least in part by the first UE and the second message authentication code was generated at least in part by the relay UE; and the transmission between the wireless device and the relay UE, an indication of at least a second portion of the data using a second data routing path, wherein the first data routing path and the second data routing path are different.

12. The wireless device of claim 11, wherein the wireless device comprises a network access device.

13. The wireless device of claim 12, wherein the processor and the memory are further configured to:
determine, based at least in part on a third security key used to communicate with a second relay UE, that the first message authentication code was generated at least in part by the second relay UE, the second relay UE configured to relay data from the first UE to the wireless device along the data routing path.

14. The wireless device of claim 13, wherein the determination that the first message authentication code was generated at least in part by the second relay UE is further based at least in part on: a combination of a first counter value written in a header of the data packet by the first UE, and a flow identifier written in the header of the data packet by the first UE; a combination of the first counter value and a locally-stored identifier at the second relay UE associated with a data radio bearer (DRB) over which the data packet is received by or transmitted from the second relay UE; a second counter value written in the header of the data packet by the second relay UE; or some combination thereof.

15. The wireless device of claim 14, wherein the header is an enhanced Packet Data Convergence Protocol (ePDCP) header, a security header, or a Layer 2 (L2) header.

16. The wireless device of claim 12, wherein the processor and the memory are further configured to: configure the data muting path; transmit, via the transceiver to the first UE, an indication of at least a first portion of the data routing path using a first direct connection between the wireless device and the first UE.

17. The wireless device of claim 11, wherein the data routing path comprises a plurality of relay UEs including the relay UE, and wherein the processor and the memory are further configured to:
transmit, via the transceiver, a set of one or more security keys used to communicate with each of the plurality of relay UEs.

18. The wireless device of claim 17, wherein the processor and the memory are further configured to:
determine, based at least in part on a third security key used to communicate with a second relay UE configured to relay data from the wireless device to the first UE along the data routing path, that the first message authentication code was generated at least in part by the second relay UE.

19. The wireless device of claim 18, wherein the determination that the first message authentication code was generated at least in part by the second relay UE is further based at least in part on: a combination of a first counter value written in an enhanced Packet Data Convergence Protocol (ePDCP) header of the data packet and a flow identifier written in the ePDCP header of the data packet, a combination of the first counter value and a locally-stored identifier at the second relay UE associated with a data radio bearer (DRB) over which the data packet is received by or transmitted from the second relay UE, a second counter value written in the ePDCP header of the data packet by the second relay UE; or some combination thereof.

20. The wireless device of claim 11, wherein the processor and the memory are further configured to:
receive, via the transceiver, an integrity-protected status report indicating receipt of the data packet at the first UE.

21. An apparatus for use in a wireless device, the apparatus comprising: means for receiving a data packet from a relay user equipment (UE) configured to relay data from a first LE to the wireless device via a first data routing path, the data packet associated with a first message authentication code and a second message authentication code, wherein the relay UE is configured to relay data from the wireless device to the first UE means for determining, based at least in part on a first security key used to communicate with the first UE, that the first message authentication code was generated at least in part by the first LE; means for determining, based at least in part on a second security key used to communicate with the relay UE, that the second message authentication code was generated at least in part by the relay UE; and means for processing the data packet based at least in part on the determinations that the first message authentication code was generated at least in part by the first UE and the second message authentication code was generated at least in part by the relay UE; and means for transmission between the wireless device and the relay UE, an indication of at least a second portion of the data using a second data routing path, wherein the first data routing path and the second data routing path are different.

22. The apparatus of claim 21, wherein the wireless device comprises a network access device.

23. The apparatus of claim 22, and further comprising:
means for determining, based at least in part on a third security key used to communicate with a second relay UE, that the first message authentication code was generated at least in part by the second relay UE, the second relay UE configured to relay data from the first UE to the wireless device along the data routing path.

24. The apparatus of claim 23, wherein the determination that the first message authentication code was generated at least in part by the second relay UE is further based at least in part on: a combination of a first counter value written in a header of the data packet by the first UE, and a flow identifier written in the header of the data packet by the first UE; a combination of the first counter value and a locally-stored identifier at the second relay UE associated with a data radio bearer (DRB) over which the data packet is received by or transmitted from the second relay UE; a second counter value written in the header of the data packet by the second relay UE; or some combination thereof.

25. The apparatus of claim 24, wherein the header is an enhanced Packet Data Convergence Protocol (ePDCP) header, a security header, or a Layer 2 (L2) header.

26. The apparatus of claim 22, and further comprising: means for configuring the data routing path; means for transmitting, to the first UE, an indication of at least a first portion of the data routing path using a first direct connection between the wireless device and the first UE.

27. The apparatus of claim 21, wherein the data routing path comprises a plurality of relay UEs including the relay UE, and further comprising:
   means for transmitting a set of one or more security keys used to communicate with each of the plurality of relay UEs.

28. The apparatus of claim 27, and further comprising:
   means for determining, based at least in part on a third security key used to communicate with a second relay UE configured to relay data from the wireless device to the first UE along the data routing path, that the first message authentication code was generated at least in part by the second relay UE.

29. The apparatus of claim 28, wherein the determination that the first message authentication code was generated at least in part by the second relay UE is further based at least in part on: a combination of a first counter value written in an enhanced Packet Data Convergence Protocol (ePDCP) header of the data packet and a flow identifier written in the ePDCP header of the data packet, a combination of the first counter value and a locally-stored identifier at the second relay UE associated with a data radio bearer (DRB) over which the data packet is received by or transmitted from the second relay UE, a second counter value written in the ePDCP header of the data packet by the second relay UE; or some combination thereof.

30. The apparatus of claim 21, and further comprising:
   means for receiving an integrity-protected status report indicating receipt of the data packet at the first UE.

\* \* \* \* \*